US010037304B2

(12) United States Patent
Smith et al.

(10) Patent No.: US 10,037,304 B2
(45) Date of Patent: Jul. 31, 2018

(54) SIDE-BY-SIDE DIESEL UTILITY VEHICLE

(71) Applicant: POLARIS INDUSTRIES INC., Medina, MN (US)

(72) Inventors: Jeremy C Smith, Chisago City, MN (US); Adam J Schlangen, Rush City, MN (US); Richard D Ripley, Rush City, MN (US); Shawn D Peterson, East Bethel, MN (US); Kurt E Stenberg, Greenbush, MN (US); Anthony J Kinsman, Wyoming, MN (US); Angus M Morison, Blaine, MN (US); David A Elia, North Branch, MN (US); Matthew S Kmecik, Chisago City, MN (US); Eric J Czechowski, Hugo, MN (US); David J Hicke, Hugo, MN (US); Aaron J Nysse, Stacy, MN (US); Matthew J Kaldor, Bismarck, ND (US); Robert R Lacher, Bismarck, ND (US); Brian P Dehnert, Mandan, ND (US)

(73) Assignee: Polaris Industries Inc., Medina, MN (US)

( * ) Notice: Subject to any disclaimer, the term of this patent is extended or adjusted under 35 U.S.C. 154(b) by 1291 days.

(21) Appl. No.: 13/725,328

(22) Filed: Dec. 21, 2012

(65) Prior Publication Data
US 2014/0065936 A1 Mar. 6, 2014

Related U.S. Application Data

(60) Provisional application No. 61/696,519, filed on Sep. 4, 2012.

(51) Int. Cl.
*B60H 1/00* (2006.01)
*G06F 17/00* (2006.01)
(Continued)

(52) U.S. Cl.
CPC .............. *G06F 17/00* (2013.01); *B60G 9/02* (2013.01); *B60G 9/022* (2013.01); *B60G 21/052* (2013.01);
(Continued)

(58) Field of Classification Search
CPC ............ B60H 1/00378; B60H 1/00207; B60H 1/00407; B60H 2001/00242; G06F 17/00;
(Continued)

(56) References Cited

U.S. PATENT DOCUMENTS 3,001,600 A 9/1961 MacPherson
3,487,451 A 12/1969 Fontaine
(Continued)

FOREIGN PATENT DOCUMENTS

DE 102006011416 9/2007
FR 2623776 6/1989
(Continued)

OTHER PUBLICATIONS

International Search Report and Written Opinion issued by the European Patent Office, dated Mar. 17, 2014, for related International Application No. PCT/US2013/057819; 16 pages.
(Continued)

*Primary Examiner* — Gregory Huson
*Assistant Examiner* — Dana Tighe
(74) *Attorney, Agent, or Firm* — Faegre Baker Daniels LLP

(57) ABSTRACT

A utility vehicle comprises a plurality of ground engaging members and a frame supported by the plurality of ground engaging members. The frame includes a front frame portion, a mid-frame portion, and a rear frame portion. The utility vehicle further comprises an attachment supported at the front frame portion. Additionally, the utility vehicle includes an operator area supported by the frame and
(Continued)

including an operator seat and an adjacent passenger seat spaced apart from the operator seat. The operator seat and the passenger seat are in a side-by-side arrangement. The utility vehicle also comprises an auxiliary power assembly having an attachment shaft configured to be operably coupled to the attachment. The attachment shaft extends in a generally longitudinal direction of the utility vehicle and projects outwardly from the front frame portion.

27 Claims, 59 Drawing Sheets

(51) Int. Cl.
| | |
|---|---|
| *B60K 17/34* | (2006.01) |
| *B60G 21/05* | (2006.01) |
| *B60W 10/00* | (2006.01) |
| *B60K 28/04* | (2006.01) |
| *B60G 9/02* | (2006.01) |
| *B62D 21/18* | (2006.01) |
| *B60K 26/02* | (2006.01) |
| *B60W 10/30* | (2006.01) |
| *B60W 30/188* | (2012.01) |
| *E02F 3/96* | (2006.01) |
| *E02F 9/08* | (2006.01) |
| *E02F 9/26* | (2006.01) |
| *B60K 23/08* | (2006.01) |
| *E02F 9/20* | (2006.01) |
| *B60K 11/02* | (2006.01) |
| *B60K 13/02* | (2006.01) |
| *B60K 17/22* | (2006.01) |
| *B60K 25/04* | (2006.01) |

(52) U.S. Cl.
CPC ..... *B60H 1/00207* (2013.01); *B60H 1/00407* (2013.01); *B60K 17/34* (2013.01); *B60K 23/08* (2013.01); *B60K 26/02* (2013.01); *B60K 28/04* (2013.01); *B60K 41/28* (2013.01); *B60W 10/30* (2013.01); *B60W 30/1886* (2013.01); *B62D 21/18* (2013.01); *B62D 21/186* (2013.01); *E02F 3/96* (2013.01); *E02F 9/0808* (2013.01); *E02F 9/2079* (2013.01); *E02F 9/2087* (2013.01); *E02F 9/265* (2013.01); *E02F 9/267* (2013.01); *B60G 2200/21* (2013.01); *B60G 2200/22* (2013.01); *B60G 2200/31* (2013.01); *B60G 2200/314* (2013.01); *B60G 2200/32* (2013.01); *B60G 2206/141* (2013.01); *B60G 2206/16* (2013.01); *B60G 2206/20* (2013.01); *B60G 2300/124* (2013.01); *B60G 2300/13* (2013.01); *B60H 2001/00242* (2013.01); *B60K 11/02* (2013.01); *B60K 13/02* (2013.01); *B60K 17/22* (2013.01); *B60K 25/04* (2013.01); *E02F 9/2025* (2013.01)

(58) Field of Classification Search
CPC ........ B60G 9/02; B60G 9/022; B60G 21/052; B60G 2200/21; B60G 2200/22; B60G 2200/31; B60G 2200/32; B60G 2200/314; B60G 2206/141; B60G 2206/16; B60G 2206/20; B60G 2300/124; B60G 2300/13; B60K 17/34; B60K 41/28; B60K 28/04; B60K 26/02; B60K 23/08; B60K 11/02; B60K 13/02; B60K 17/22; B60K 25/04; B62D 21/18; B62D 21/186; B60W 10/30; B60W 30/1886; E02F 3/96; E02F 9/0808; E02F 9/265; E02F 9/2079; E02F 9/2087; B60Y 2410/111

USPC ............................... 454/69; 62/239; 280/781
See application file for complete search history.

(56) References Cited

U.S. PATENT DOCUMENTS

| | | | |
|---|---|---|---|
| 3,952,512 A | 4/1976 | Feller | |
| 4,041,702 A | 8/1977 | Habiger | |
| 4,041,703 A | 8/1977 | Knapp | |
| 4,415,179 A | 11/1983 | Marinelli | |
| 4,796,013 A | 1/1989 | Yasuda et al. | |
| 4,995,363 A | 2/1991 | Terazawa et al. | |
| 5,109,945 A | 5/1992 | Koga | |
| 5,119,718 A * | 6/1992 | Wagner | B60H 1/00378 296/208 |
| 5,203,440 A | 4/1993 | Peterson et al. | |
| 5,273,340 A * | 12/1993 | Nelson | B62D 33/06 296/190.03 |
| 5,307,645 A * | 5/1994 | Pannell | B60H 1/00364 454/144 |
| 5,308,279 A * | 5/1994 | Grinberg | B60H 1/00378 454/139 |
| 5,542,493 A | 8/1996 | Jacobson et al. | |
| 6,226,902 B1 | 5/2001 | Heyne | |
| 6,585,223 B1 | 7/2003 | VanDenberg | |
| 6,622,837 B2 | 9/2003 | Ochab et al. | |
| 6,857,647 B2 | 2/2005 | Johnsman et al. | |
| 7,337,866 B2 | 3/2008 | Nishi et al. | |
| 7,503,417 B2 | 3/2009 | Lichtinger et al. | |
| 7,819,220 B2 | 10/2010 | Sunsdahl et al. | |
| 7,857,086 B2 | 12/2010 | Wakuta et al. | |
| 8,126,618 B2 | 2/2012 | Yamada et al. | |
| 8,269,512 B2 | 9/2012 | Ootaka | |
| 2002/0109325 A1 | 8/2002 | Purick | |
| 2003/0020323 A1 | 1/2003 | Smith | |
| 2003/0073400 A1* | 4/2003 | Dahl | B60H 1/00378 454/139 |
| 2004/0007843 A1 | 1/2004 | Reineck | |
| 2004/0195034 A1* | 10/2004 | Kato | B60K 17/34 180/312 |
| 2006/0037805 A1 | 2/2006 | Muraro | |
| 2006/0186699 A1* | 8/2006 | Davis | B60G 3/06 296/187.01 |
| 2007/0214818 A1* | 9/2007 | Nakamura | B60H 1/00378 62/239 |
| 2008/0023249 A1 | 1/2008 | Sunsdahl | |
| 2008/0201044 A1 | 8/2008 | Yamada et al. | |
| 2009/0302590 A1* | 12/2009 | Van Bronkhorst | B60G 15/063 280/756 |
| 2010/0087975 A1 | 4/2010 | Dower | |
| 2011/0074447 A1 | 3/2011 | Ootaka | |
| 2011/0240394 A1 | 10/2011 | Hurd | |
| 2012/0009860 A1* | 1/2012 | Wihinen | B60H 1/243 454/152 |
| 2012/0175177 A1* | 7/2012 | Lee | B60K 1/04 180/68.5 |
| 2012/0217078 A1 | 8/2012 | Kinsman et al. | |
| 2012/0223500 A1 | 9/2012 | Kinsman et al. | |
| 2012/0234620 A1 | 9/2012 | Boyarski et al. | |
| 2013/0033070 A1 | 2/2013 | Kinsman et al. | |
| 2013/0066525 A1 | 3/2013 | Tomik et al. | |

FOREIGN PATENT DOCUMENTS

| | | | |
|---|---|---|---|
| GB | 2471506 A * | 1/2011 | ............... B60H 1/02 |
| WO | WO 2011/0127138 | 10/2011 | |

OTHER PUBLICATIONS

International Preliminary Report on Patentability issued by the International Searching Authority, dated May 10, 2016, for related

(56) References Cited

OTHER PUBLICATIONS

International Patent Application No. PCT/US2013/057818, 12 pages.

* cited by examiner

US 10,037,304 B2

SIDE-BY-SIDE DIESEL UTILITY VEHICLE

BACKGROUND OF THE DISCLOSURE

The present disclosure generally relates to side-by-side utility vehicles and, more particularly, to side-by-side utility vehicle configured to support at least front-end attachments.

Generally, all terrain vehicles and utility vehicles are used to carry one or two passengers and cargo over a variety of terrains. Typically, the cargo is carried in a rear cargo box of such vehicles. Alternatively, BOBCAT brand utility vehicles include a hydraulic system having a RAPID LINK brand hydraulic attachment system which couples attachments to a front end of the utility vehicle. Utility vehicles also may include a winch or hitch assembly to carry additional loads.

Exemplary utility vehicles configured to support at least one passenger and cargo are available from Polaris Industries Inc. of Medina, Minn., and are disclosed in U.S. Pat. No. 7,819,220, issued on Oct. 26, 2010; U.S. Provisional Patent Application No. 61/442,071, filed on Feb. 11, 2011; U.S. patent application Ser. No. 13/370,139, filed on Feb. 9, 2012; U.S. patent application Ser. No. 13/464,603, filed on May 4, 2012; U.S. patent application Ser. No. 13/492,589, filed on Jun. 8, 2012; and International Patent Application No. PCT/US2011/031376, filed on Apr. 6, 2011, the complete disclosures of which are expressly incorporated by reference herein.

SUMMARY OF THE DISCLOSURE

In one embodiment described herein, a utility vehicle comprises a plurality of ground engaging members and a frame supported by the plurality of ground engaging members. The frame includes a front frame portion, a mid-frame portion, and a rear frame portion. The utility vehicle further comprises an attachment supported at the front frame portion. Additionally, the utility vehicle includes an operator area supported by the frame and including an operator seat and an adjacent passenger seat spaced apart from the operator seat. The operator seat and the passenger seat are in a side-by-side arrangement. The utility vehicle also comprises an auxiliary power assembly having an attachment shaft configured to be operably coupled to the attachment. The attachment shaft extends in a generally longitudinal direction of the utility vehicle and projects outwardly from the front frame portion.

A further embodiment of the present disclosure includes a cab of a utility vehicle comprising a plurality of ground engaging members and a frame supported by the ground engaging members. The frame includes a front frame portion and a rear frame portion. Additionally, the utility vehicle comprises an attachment supported by the front frame portion and an engine supported by the rear frame portion. The utility vehicle further comprises an auxiliary power assembly including an attachment shaft operably coupled to the attachment and to the engine. The engine is configured to directly transmit power to the attachment shaft to operate the attachment.

Another illustrative embodiment of the present disclosure includes a cab assembly of a utility vehicle comprises a plurality of ground engaging members and a frame supported by the ground engaging members. The frame includes a front frame portion and a rear frame portion. Additionally, the utility vehicle comprises an engine supported by the frame and an operator area supported by the frame. The operator area includes an operator seat and a passenger seat. The utility vehicle also comprises a shear panel positioned forward of the operator area and coupled to the front frame portion. The utility vehicle further comprises a heating, ventilation, and air condition ("HVAC") system supported by the frame and positioned rearward of the shear panel.

The above mentioned and other features of the invention, and the manner of attaining them, will become more apparent and the invention itself will be better understood by reference to the following description of embodiments of the invention taken in conjunction with the accompanying drawings.

DETAILED DESCRIPTION OF THE DRAWINGS

Figure 1:
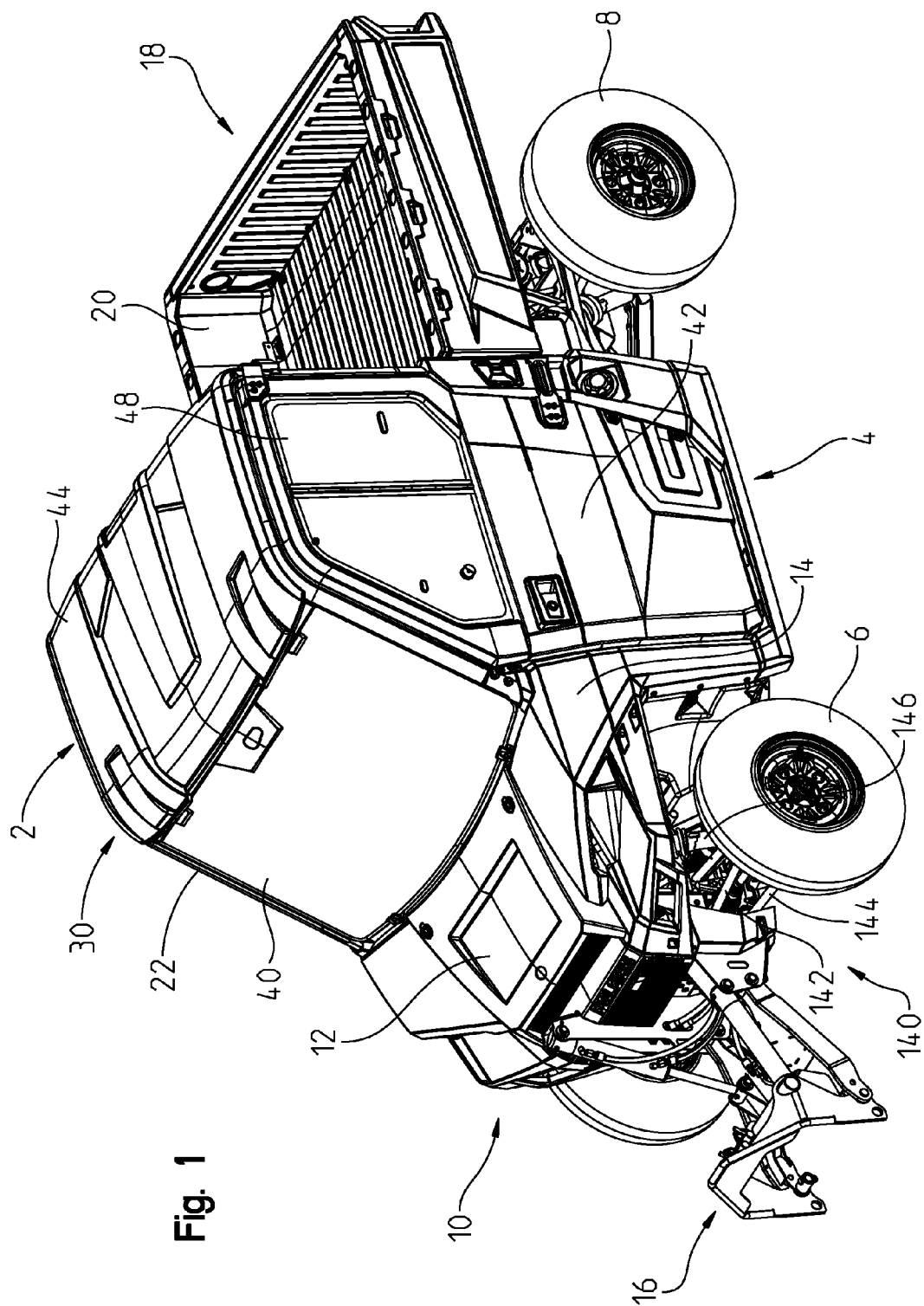
FIG. 1 is a front left perspective view of an exemplary utility vehicle of the present disclosure.

Corresponding reference characters indicate corresponding parts throughout the several views. Unless stated otherwise the drawings are proportional. The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as all-terrain vehicles, motorcycles, watercraft, snowmobiles, people movers, and golf carts.

With reference to FIGS. 1-6, a utility vehicle 2 generally includes a frame assembly 4 supported by a plurality of ground engaging members, for example front wheels 6 and rear wheels 8. Utility vehicle 2 includes a front end 10 having a hood 12 and side body panels 14. Utility vehicle 2 also may include an attachment 16 supported at front end 10, as is detailed further herein. A rear end 18 of utility vehicle 2 includes a utility cargo box 20.

Attachment 16 may be a mower, a winch, a snowblower, a sweeper, forks, a bucket, a digging device, or other devices for ground maintenance and/or agricultural and construction uses. Attachment 16 may be easily removed from utility vehicle 2 in order to mount another attachment thereto. As such, utility vehicle 2 is versatile and may be appropriate for various uses. Attachment 16 may be powered by an auxiliary power system 300, for example when attachment 16 is a mower or a blower. Alternatively, attachment 16 may be mechanically operated without input from auxiliary power system 300, such as when attachment 16 includes forks or a bucket.

Figure 3:
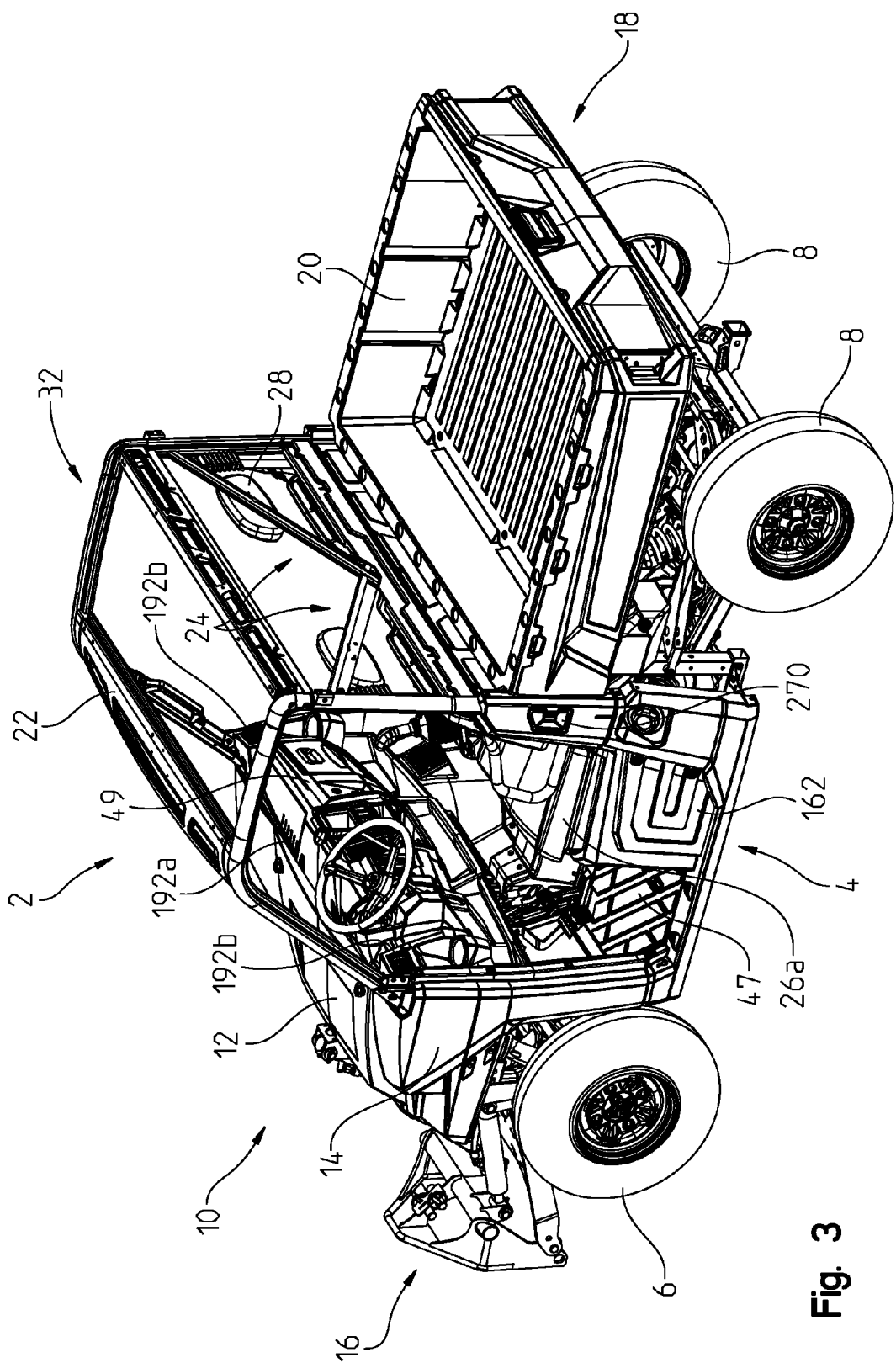
FIG. 3 is a rear left perspective view of the vehicle of FIG. 1.
Figure 4:
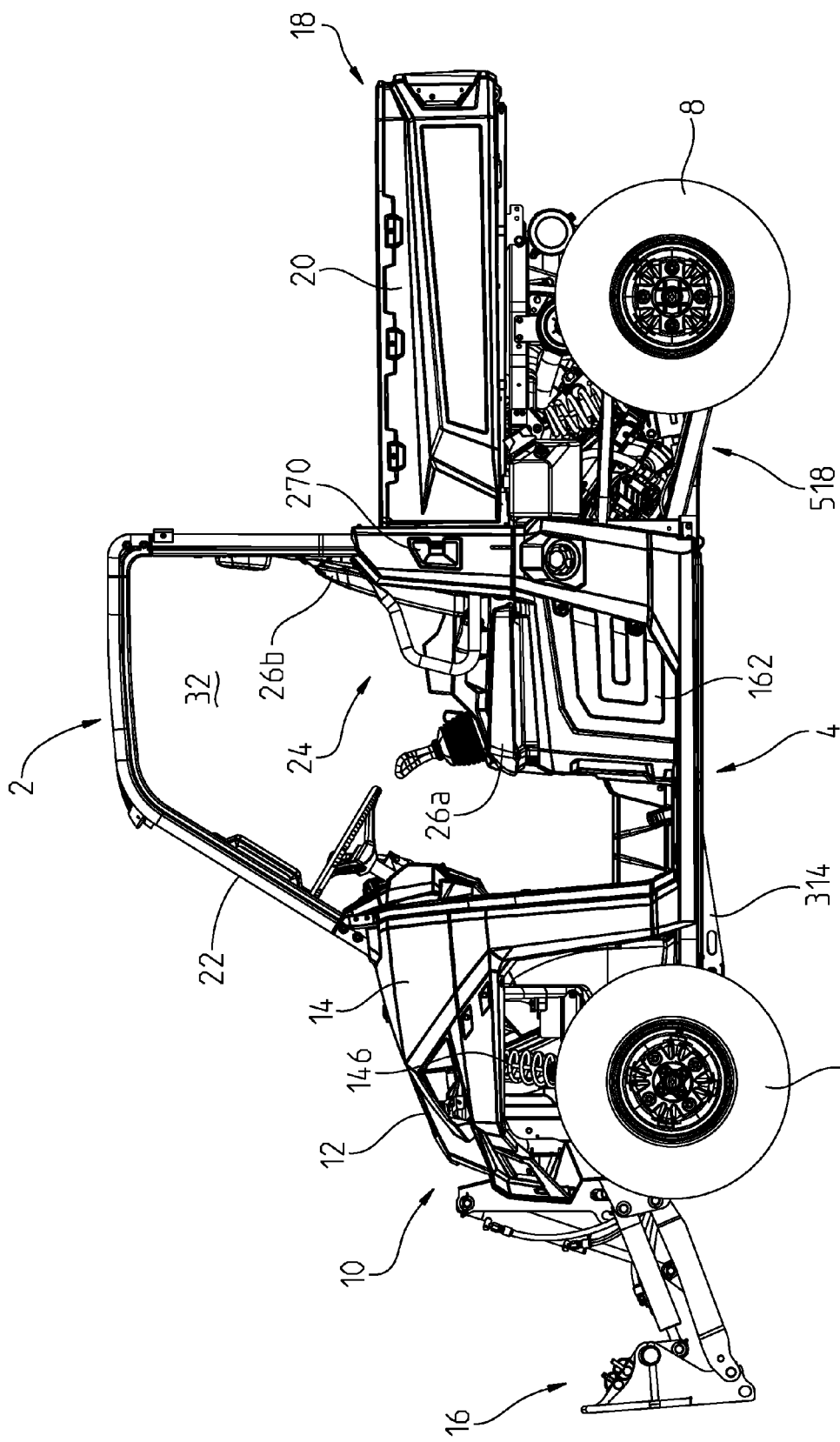
FIG. 4 is a left side view of the vehicle of FIG. 1.
Figure 5:
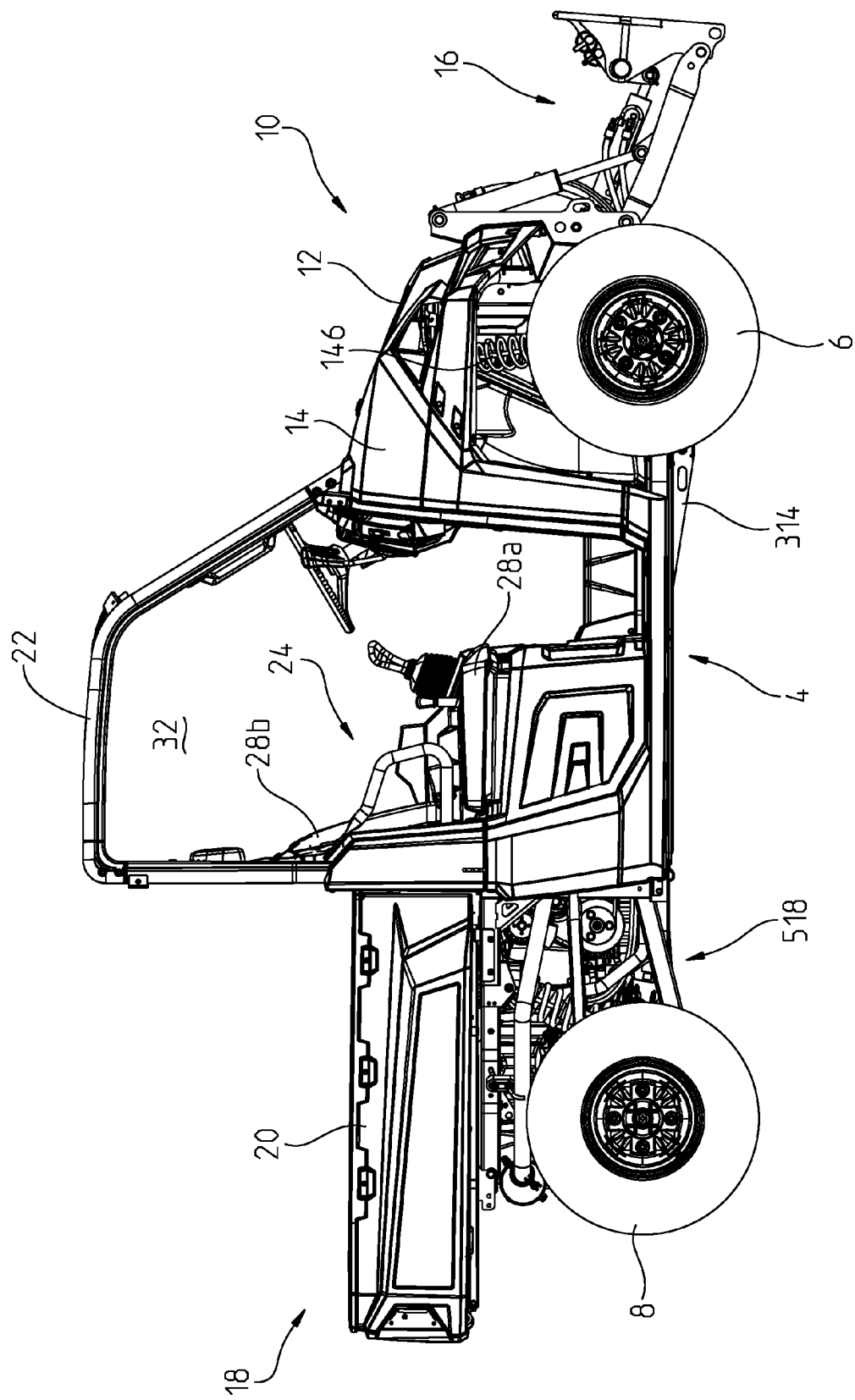
FIG. 5 is a right side view of the vehicle of FIG. 1.
Figure 6:
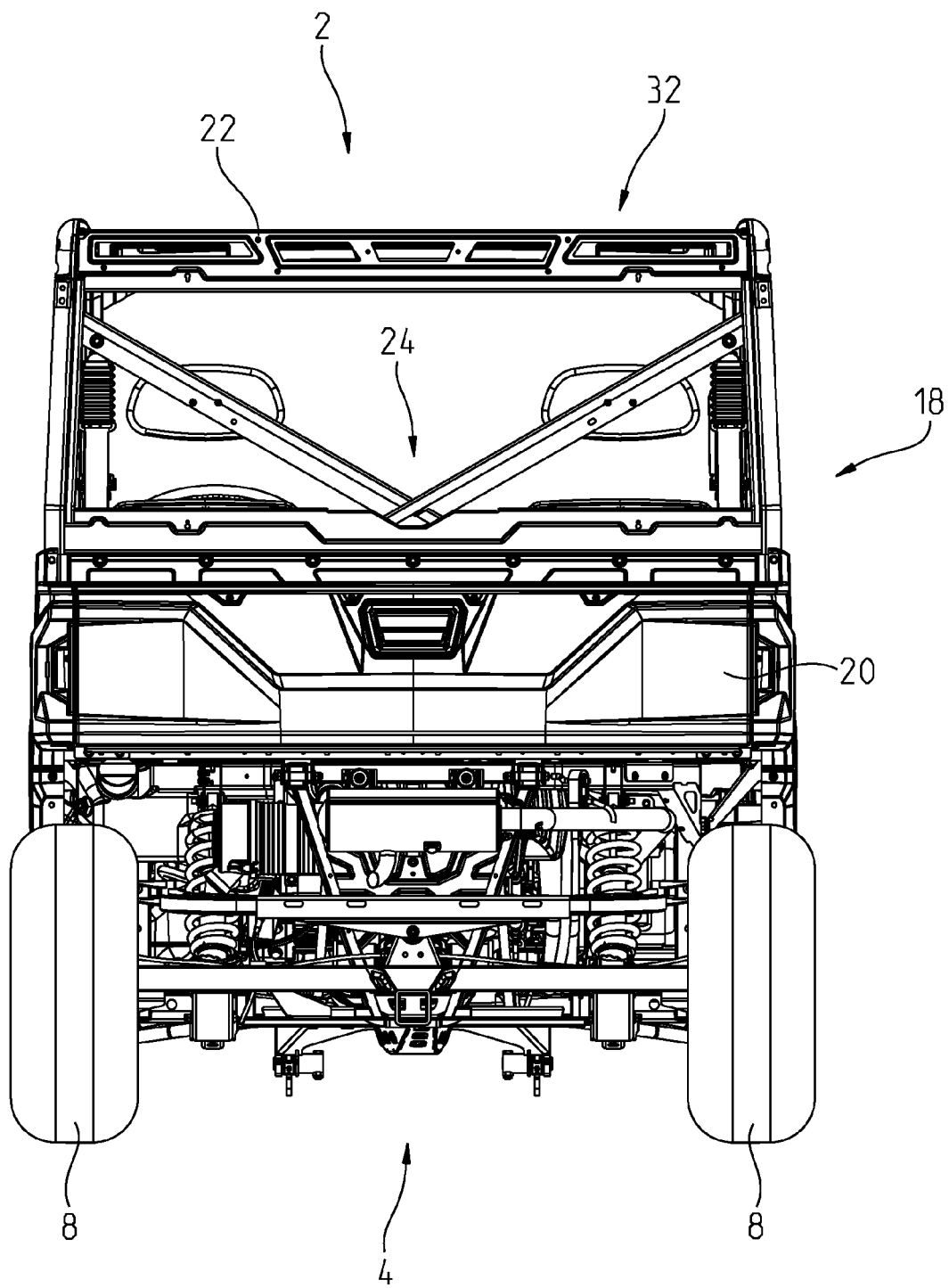
FIG. 6 is a rear view of the vehicle of FIG. 1.

An integrated operator cab 30 is supported on frame assembly 4 between front end 10 and rear end 18 and illustratively encloses an operator area 32 (FIGS. 3-5). A roll cage 22 surrounds operator cab 30 and may support a front windshield 40, doors 42, a roof 44, and a rear windshield 46, all of which may be removably coupled from roll cage 22. Additional components may be included for the comfort of the driver, such a windshield wiper (not shown), speakers and/or lighting (not shown) on an inner surface of roof 44, and windows 48 on doors 42. Additional features of operator cab 30 and roll cage 22 are disclosed in U.S. Provisional Patent Application No. 61/442,071, filed on Feb. 11, 2011; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

Figure 25:
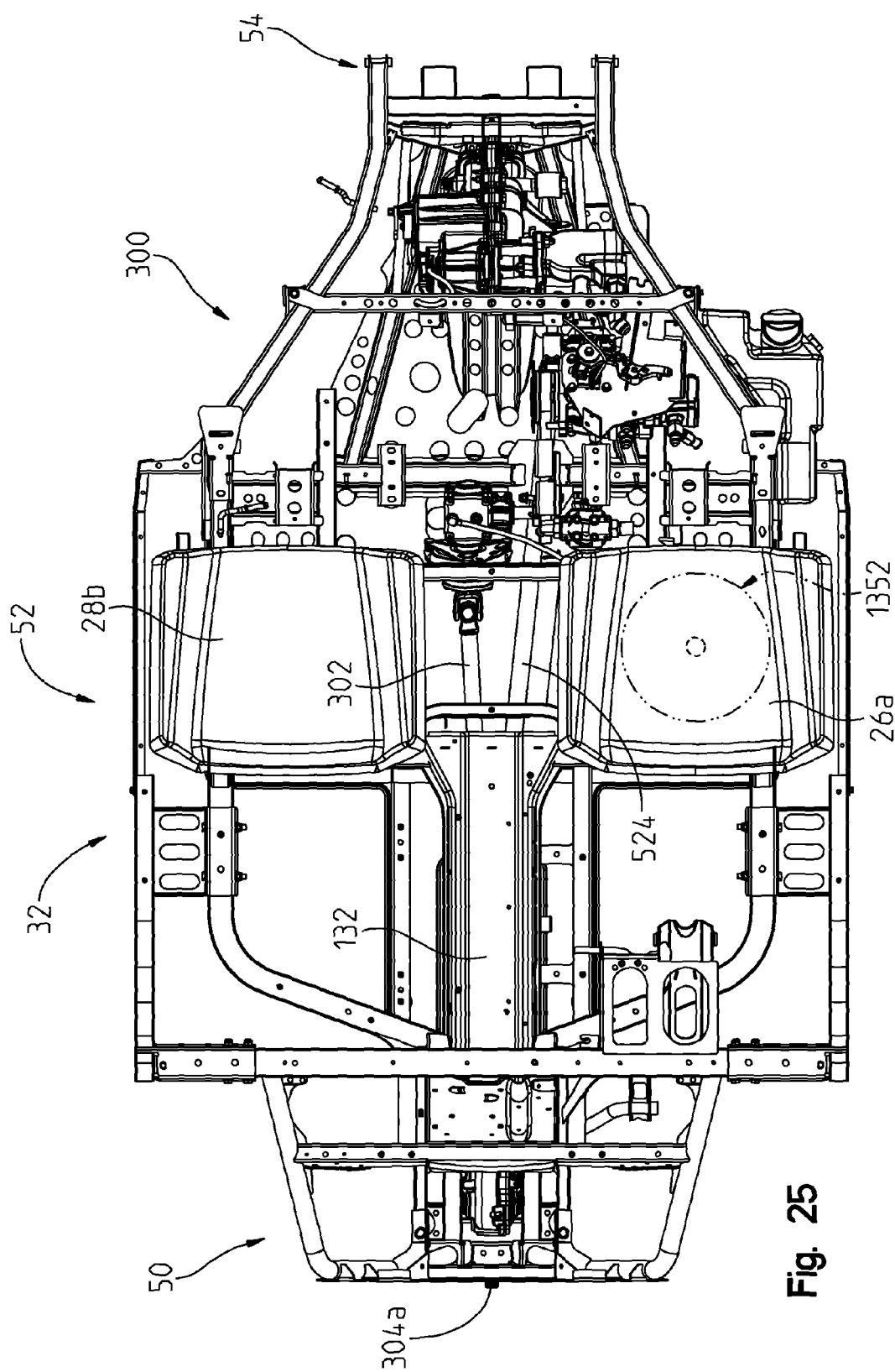
FIG. 25 is a top plan view of the frame assembly, a portion of the powertrain system, and the auxiliary power system of FIG. 24.

Operator area 32 comprises a seating assembly 24 having at least an operator seat 26 and a passenger seat 28 in a side-by-side arrangement (shown best in FIG. 25). Operator seat 26 includes a seat bottom 26a and a seat back 26b, and passenger seat 28 includes a seat bottom 28a and a seat back 28b. Storage containers (not shown) may be positioned under operator seat 26 and/or passenger seat 28.

Figure 7:
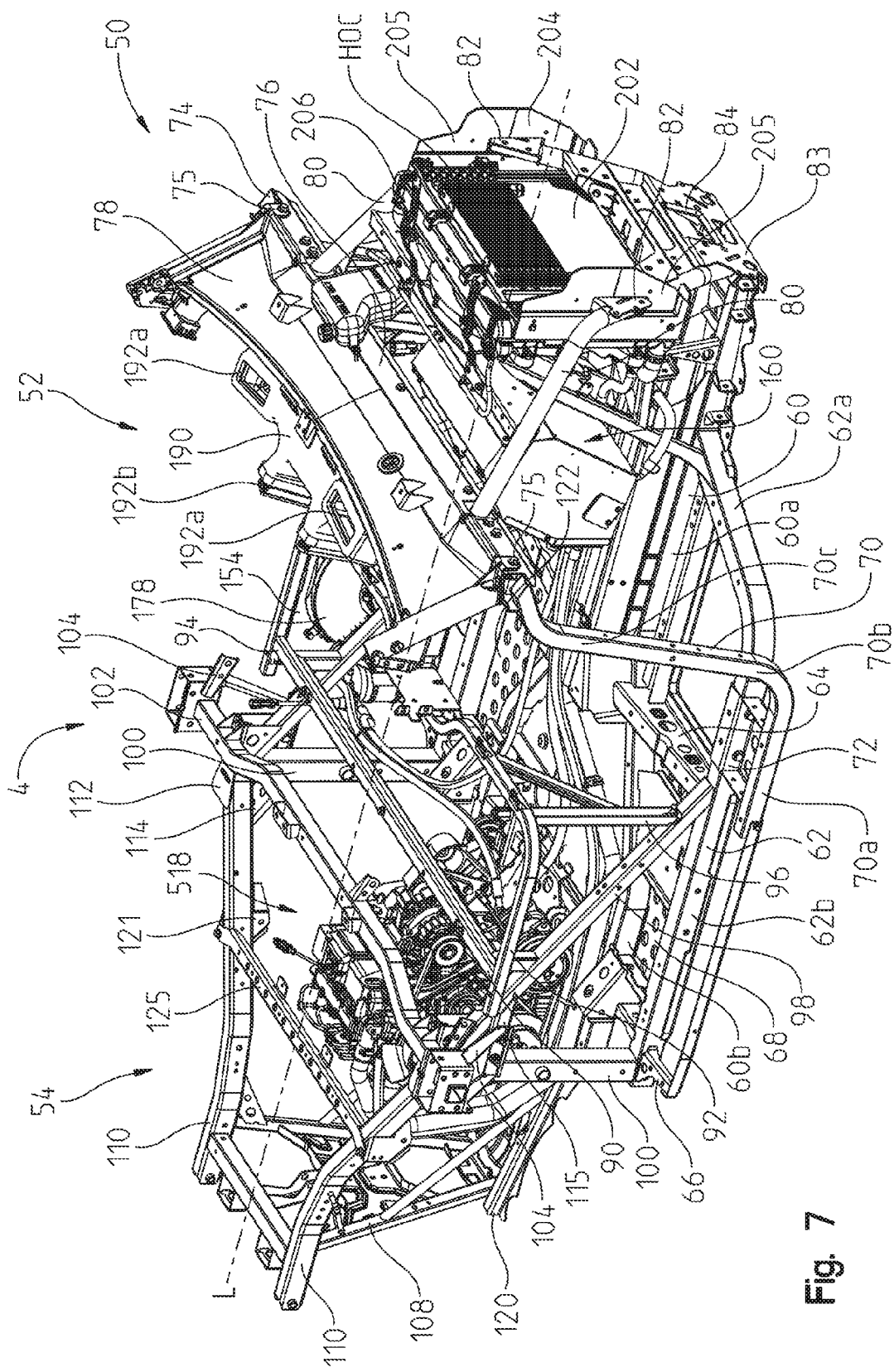
FIG. 7 is a right front perspective view of a frame assembly of the vehicle of FIG. 1, supporting at least a heating, ventilation, and air conditioning system, and a powertrain system.

Operator controls, such as a steering wheel and throttle controls, are supported within cab 30, as is further detailed herein. The operator controls may be positioned on and within a dashboard 49 of operator cab 30. The operator controls are configured to monitor, operate, and control the various systems of utility vehicle 2, such as a heating, ventilation, and air conditioning ("HVAC") system 150 (FIGS. 15-18), an auxiliary power system 300 (FIGS. 23-29), a powertrain system 518 (FIG. 7), a hydraulic system 500 (FIG. 30), and an electrical system 1300 (FIG. 56).

Figure 56:
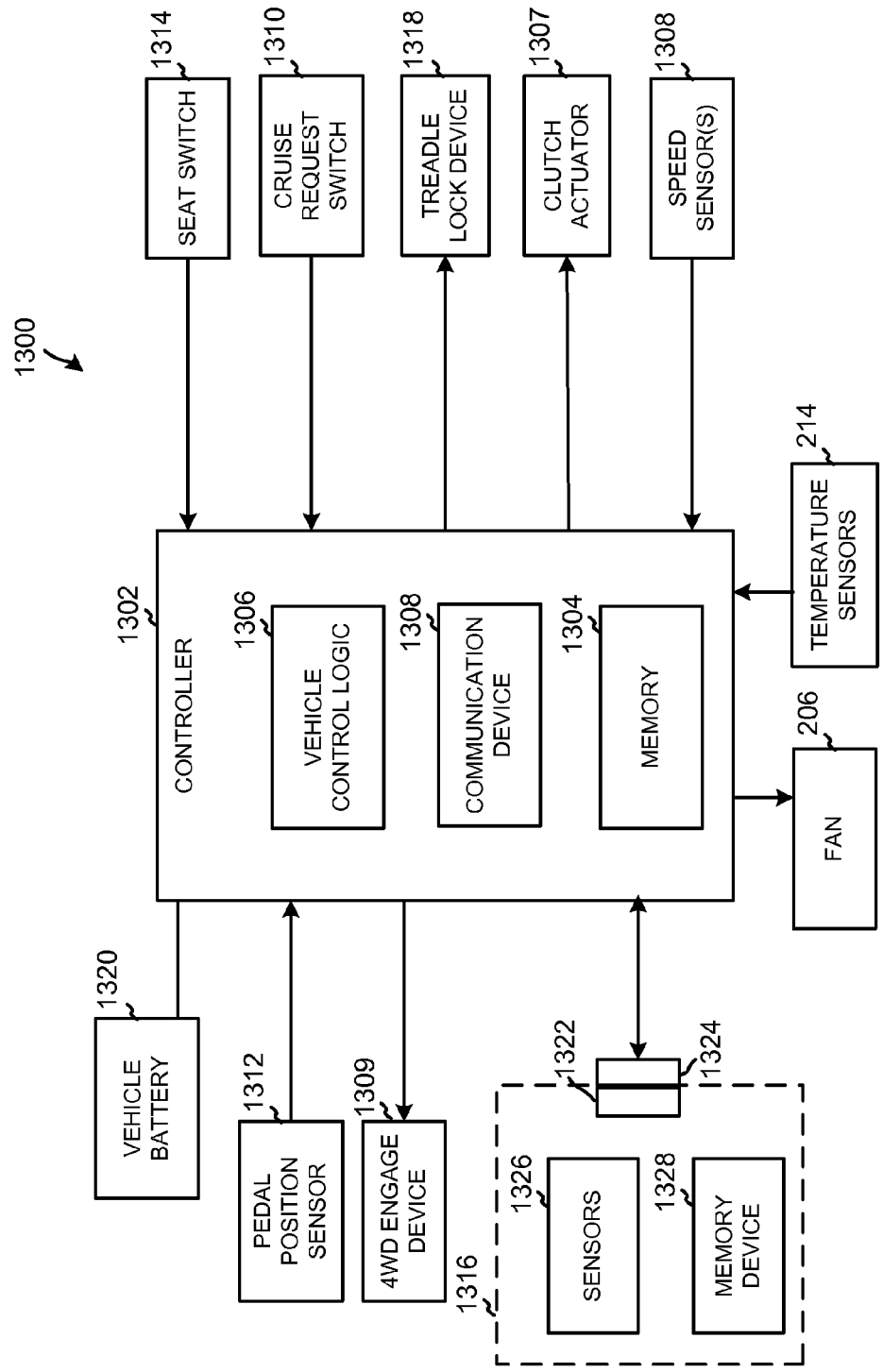
FIG. 56 is a block diagram of an exemplary electrical system of the vehicle of FIG. 1 including a vehicle controller.

Referring to FIGS. 7-14, frame assembly 4 supports the systems of utility vehicle 2, such as HVAC system 150 (FIGS. 15-18), a cooling system 200 (FIGS. 16 and 17), an air intake system 250 (FIGS. 20-22), powertrain system 518 (FIG. 7), auxiliary power system 300 (FIGS. 23-29), hydraulic system 500 (FIG. 30), and electrical system 1300 (FIG. 56). Frame assembly 4 further supports a front suspension assembly 140, shown in FIG. 1, which includes an upper alignment arm 142, a lower alignment arm 144, and a shock absorber 146. Shock absorber 146 may be spring coils or may be hydraulically operated. Frame assembly 4 further supports a rear suspension assembly 1000, which is further detailed herein Frame assembly 4 generally includes a front frame portion 50, a mid-frame portion 52, and a rear frame portion 54. The length along a longitudinal axis L between front frame portion 50 and rear frame portion 54 of illustrative frame assembly 4 may be approximately 84 inches. A plurality of lower longitudinal frame tubes 60 extend generally lengthwise between front frame portion 50 and rear frame portion 54. Illustratively, lower longitudinal frame tubes 60 each include a front portion 60*a* and a rear portion 60*b*, which flares outwardly from front portion 60*a*. An outer frame member 62 is positioned laterally outward from lower longitudinal frame tubes 60. More particularly, a front portion 62*a* of outer frame member 62 is adjacent to, and couples with, front portion 60*a*, and a rear portion 62*b* of outer frame member 62 is spaced apart from rear portion 60*b* of lower longitudinal frame tube 60. A cross tube 64 extends between lower longitudinal frame tubes 60 and outer frame member 62. A frame channel 66 integrally couples each longitudinal frame tube 60 with the adjacent outer frame member 62. Brackets 67 are integrally coupled to frame channel 66 as described further herein.

A removable frame portion 70 is attached to each outer frame member 62 by way of a bracket 72. As shown best in FIGS. 10-13, removable frame portion 70 has a lower frame portion 70*a*, a vertically upstanding portion at 70*b*, and an upper angled portion 70*c*. Removable frame portion 70 further includes gussets 74 and conventional fasteners 75 for coupling upper angled portions 70*c* with a front transverse brace 76. Additionally, lower rails 68 are coupled to removable frame portions 70.

Figure 8:
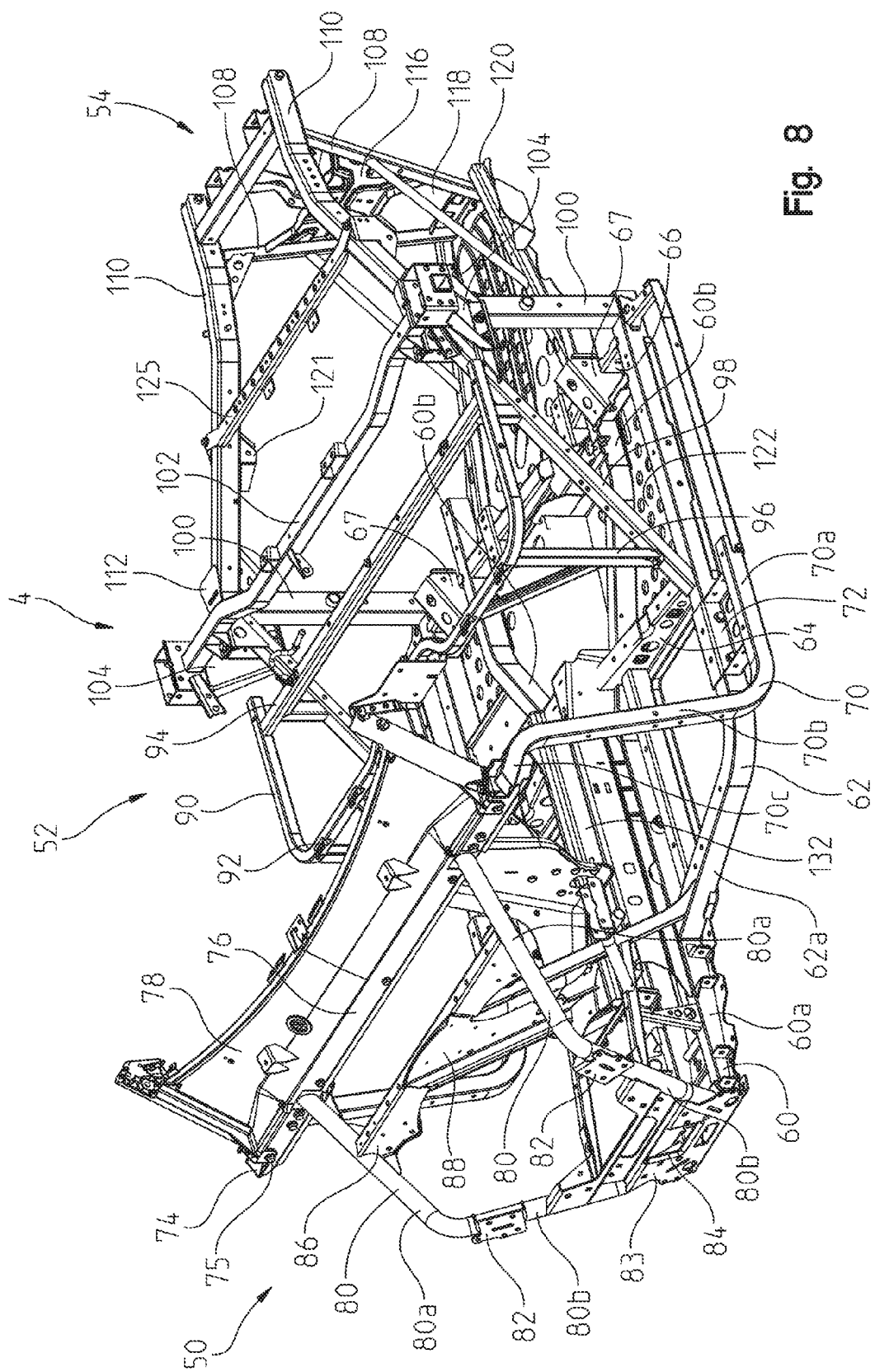
FIG. 8 is a front left perspective view of the frame assembly of FIG. 7.
Figure 9:
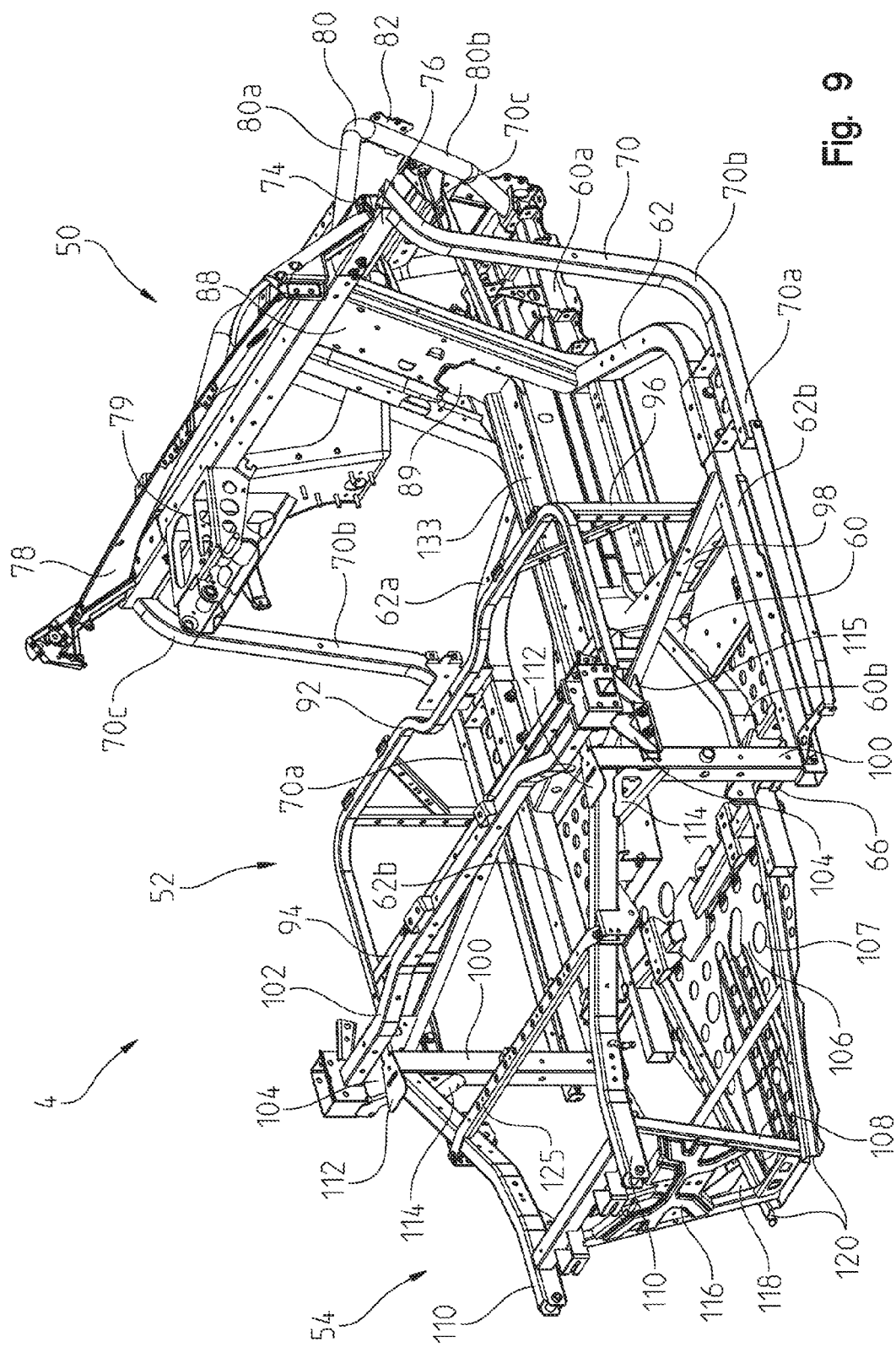
FIG. 9 is a rear right perspective view of the frame assembly of FIG. 8.
Figure 10:
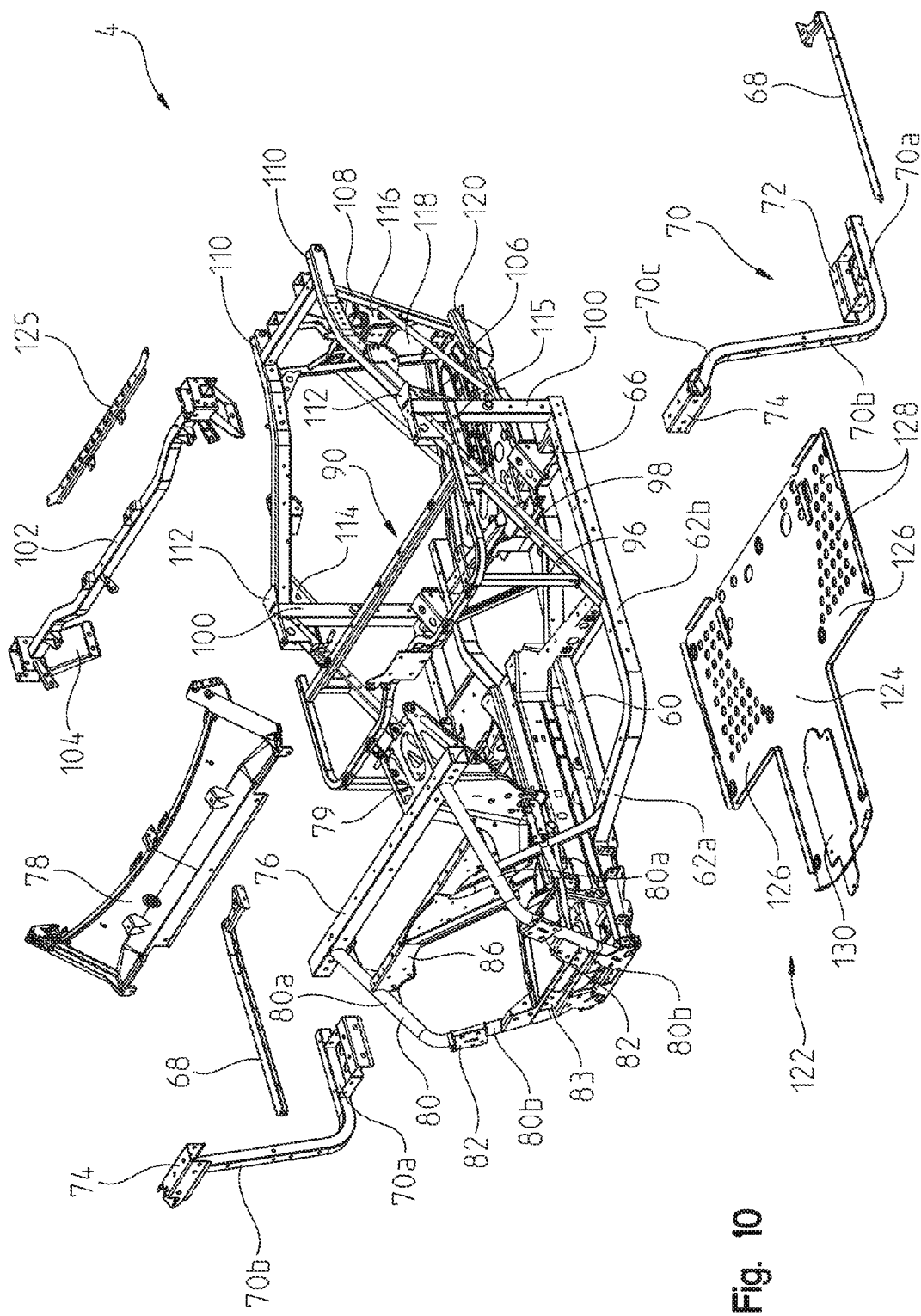
FIG. 10 is an exploded view of the frame assembly of FIG. 8.
Figure 11:
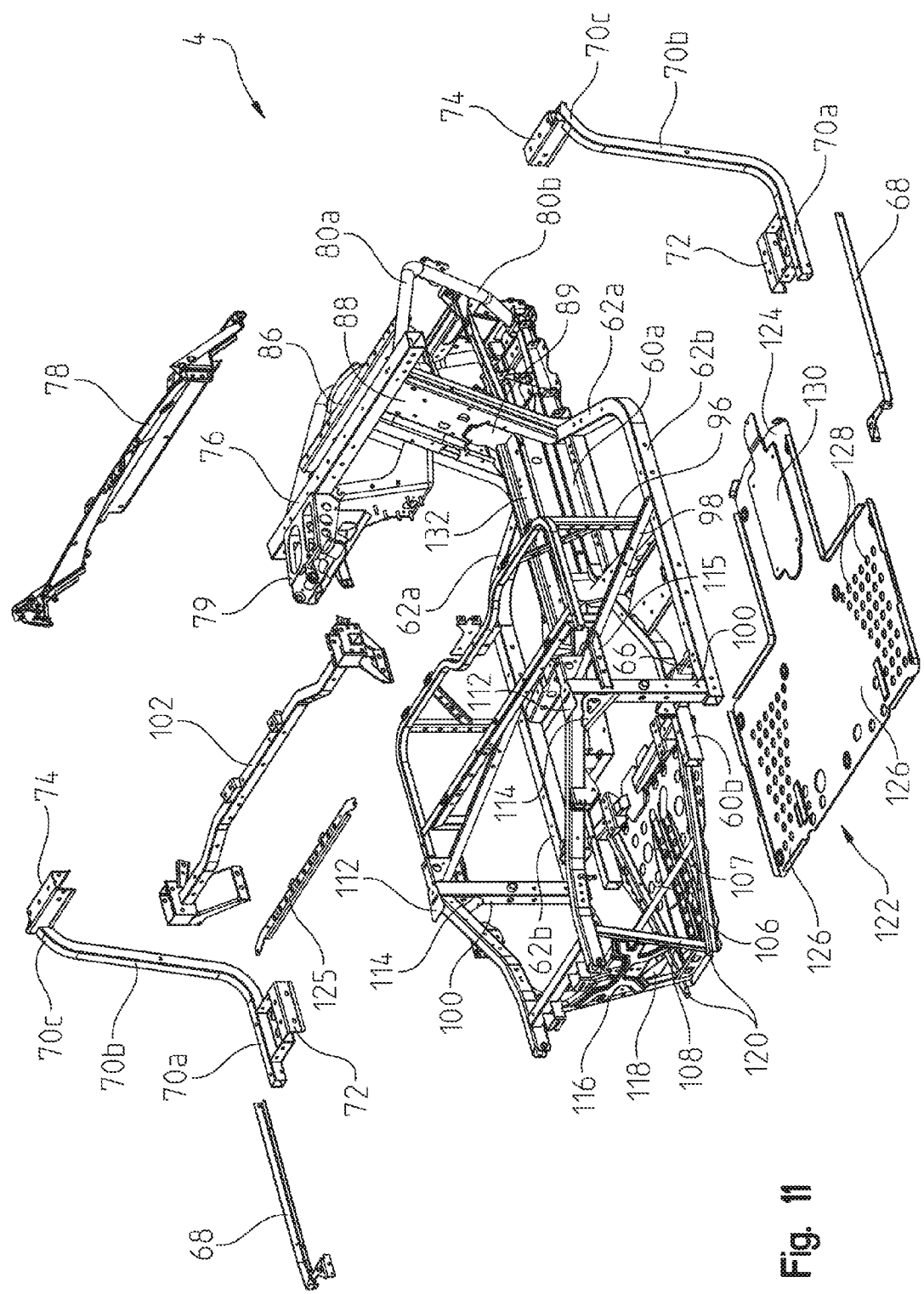
FIG. 11 is an exploded view of the frame assembly of FIG. 9.

Referring to FIGS. 8 and 9, a front panel 78 also is coupled to upper angled portions 70*c* with gussets 74 and fasteners 75. Front panel 78 may be coupled to front transverse brace 76 with additional conventional fasteners, such as bolts, welds, rivets, and/or adhesive. Roll cage 22 and windshield 40 are mounted to front panel 78. Additionally, front transverse brace 76 is coupled to a bracket 79 for supporting dashboard 49 within operator cab 30, as shown in FIGS. 10-12.

With respect to FIGS. 10-13, front transverse brace 76 further supports frame tubes 80 at front frame portion 50. As shown best in FIG. 12, frame tubes 80 extend in a forward direction from brace 76 and include a generally horizontal portion 80*a* and a generally vertical portion 80*b*. In particular, horizontal portion 80*a* is coupled to brace 76 and generally vertical portion 80*b* extends downwardly and couples with lower longitudinal frame tubes 60. Frame tubes 80 include gussets 82 for removably mounting attachment 16. A front support plate 83, having an opening 84, is mounted to frame tubes 80 and lower longitudinal frame tubes 60 to further support attachment 16.

Figure 12:
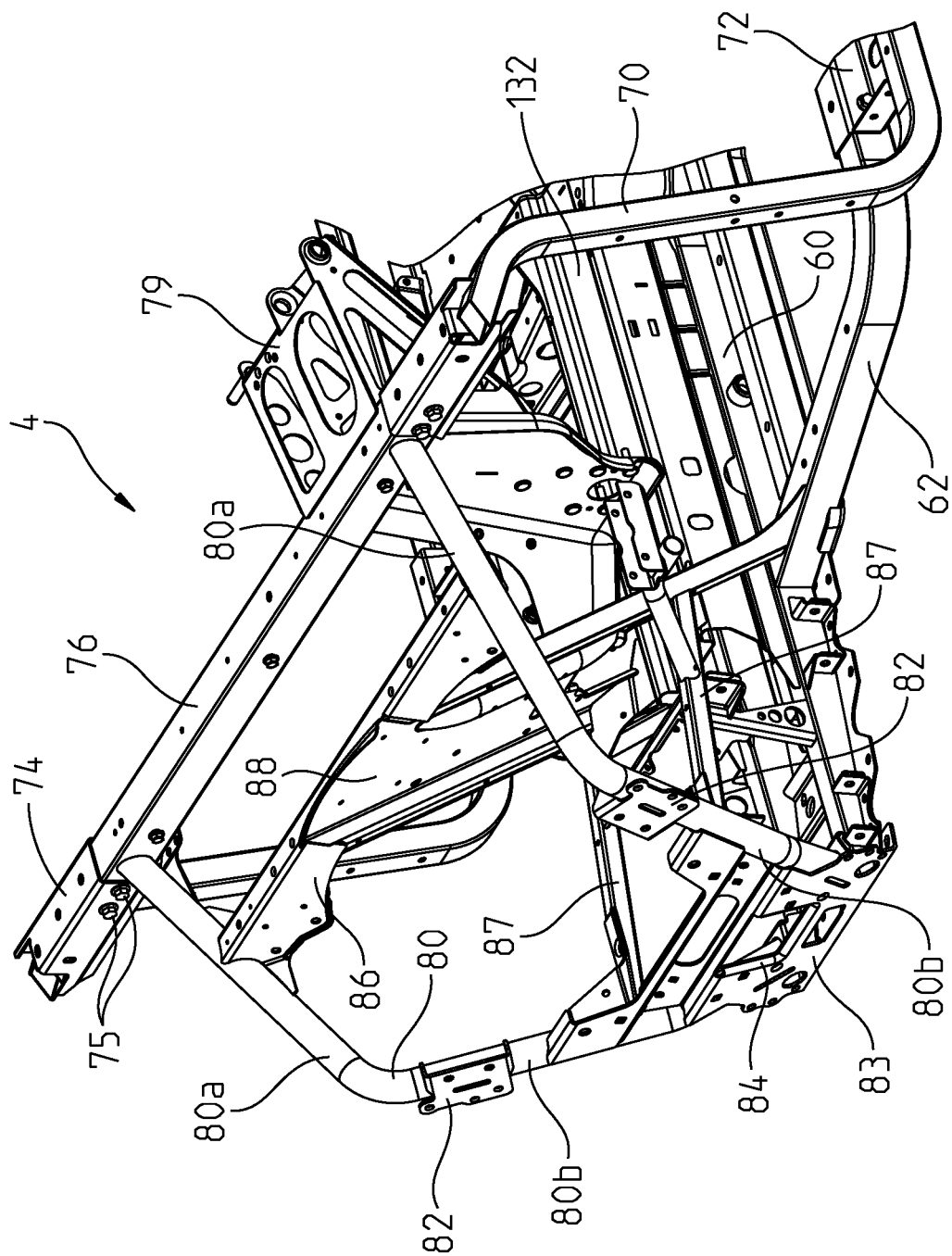
FIG. 12 is a front left perspective view of a front portion of the frame assembly of FIG. 8, including a shear panel.
Figure 13:
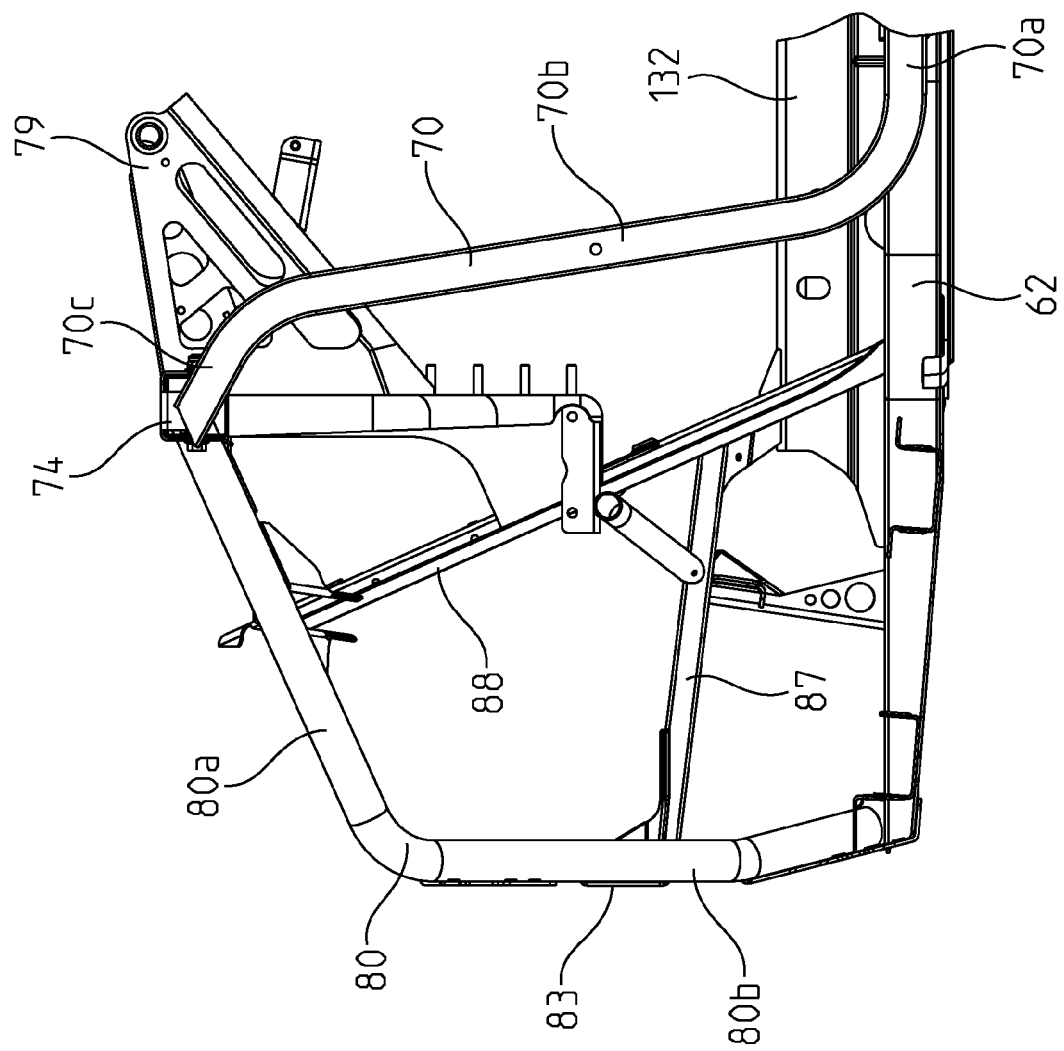
FIG. 13 is a left side view of the front portion of the frame assembly and the shear panel of FIG. 12.

As shown in FIG. 12, a cross-member 86 extends between frame tubes 80 and illustratively is positioned forward of front transverse brace 76 and rearward of front support plate 83. As shown best in FIGS. 12-14, a shear panel 88, having an opening 89, couples with cross-member 86 and is angled rearwardly therefrom. The lower portion of shear panel 88 couples with lower longitudinal frame tubes 60 and/or outer frame members 62. Shear panel 88 also couples with support plate 83 through braces 87 (FIG. 13). By coupling shear panel 88 between frame tubes 80, the torsional stiffness of frame assembly 4 is increased. Additionally, by angling shear panel 88 downwardly, as shown in FIG. 13, heat is deflected away from cab 30. Illustrative shear panel 88 is flat, stamped sheet metal that increases the rigidity and strength of frame assembly 4 in at least one direction. Shear panel 88 also may partition wiring of electrical system 1300 on the outside of utility vehicle 2 from wiring on the inside of utility vehicle 2. Opening 89 may allow wires, cooling tubes, hydraulic hoses, and other conduits to pass to and from front end 10 of utility vehicle 2.

As detailed above, gussets 82 and cross-member 86 provide a mounting surface for attachment 16. Therefore, with respect to FIG. 12, it is apparent that shear panel 88 is rearward of gussets 82 and also is rearward of attachment 16 when mounted to front frame portion 50. Shear panel 88 may support at least a portion of the load of attachment 16. Additionally, shear panel 88 may support a portion of HVAC system 150, as is further described herein.

Figure 14:
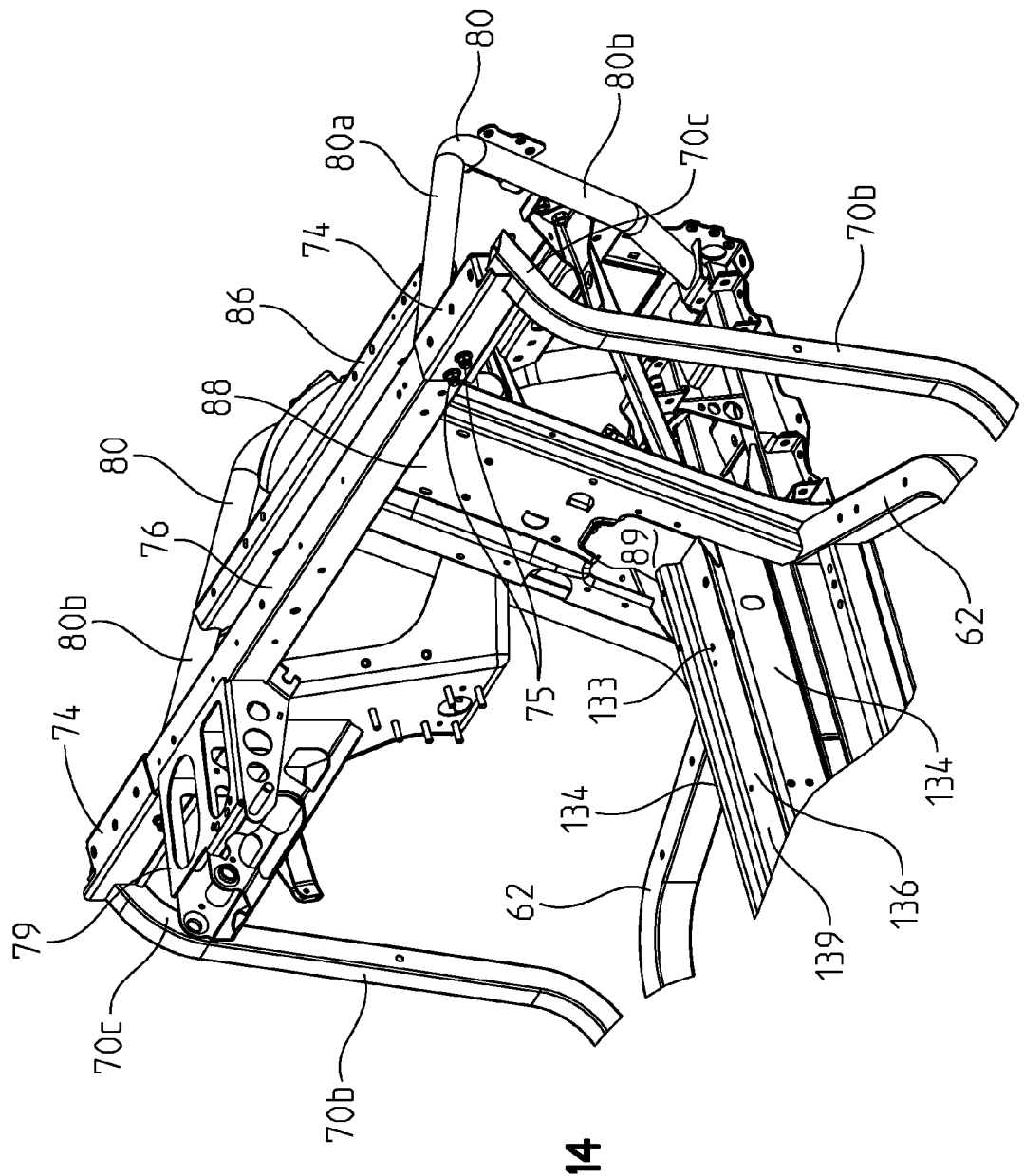
FIG. 14 is a rear right perspective view of the front portion of the frame assembly and the shear panel of FIG. 12.

As shown in FIG. 14, a tunnel member 132 is coupled to shear panel 88 and cross tubes 64 (FIG. 10). Tunnel member 132 includes walls 134 and a top surface 136. Walls 134 are coupled to top surface 136 to define a lower channel 138 below top surface 136, as is detailed further herein in FIG. 26. Additionally, walls 134 extend above top surface 136 to define an upper channel 139 above top surface 136. Upper channel 139 supports a wiring harness, cooling tubes, hydraulic hoses, and other conduits, as is detailed further herein and in U.S. Provisional Patent Application No. 61/442,071, filed on Feb. 11, 2011; U.S. patent application Ser. No. 13/1370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are incorporated by reference herein. Additionally, tunnel member 132 includes a symbol 133 on top surface 136 that indicates a starting point for the wiring harness or the other tubes and hoses that are supported in upper channel 139. Symbol 133 may be an opening in tunnel member 132, or may be an etched or notched portion of top surface 136 of tunnel member 132. When the initial wiring harness is coupled to tunnel member 132 at symbol 133, the remainder of the wiring harness and/or other wiring harnesses is easily aligned with the initial wiring harness. Illustratively, symbol 133 is a stamped triangle, however, symbol 133 may be any indication that assists the assembly process of utility vehicle 2.

Referring to FIGS. 8-11, mid-frame portion 52 of frame assembly 4 includes a seat frame portion 90 having transversely extending frame tubes 92 and 94 supported by upstanding braces 96 and diagonal braces 98. Seat frame portion 90 supports operator seat 26 and passenger seat 28 within operator area 32. Adjacent seat frame portion 90, support posts 100 extend upwardly from outer frame members 62 and are coupled to a transverse beam 102. Support posts 100 also couple with diagonal braces 98 through braces 115. Transverse beam 102 is removable from post 100 and also includes an upper mounting area or flange 104.

Figure 2:
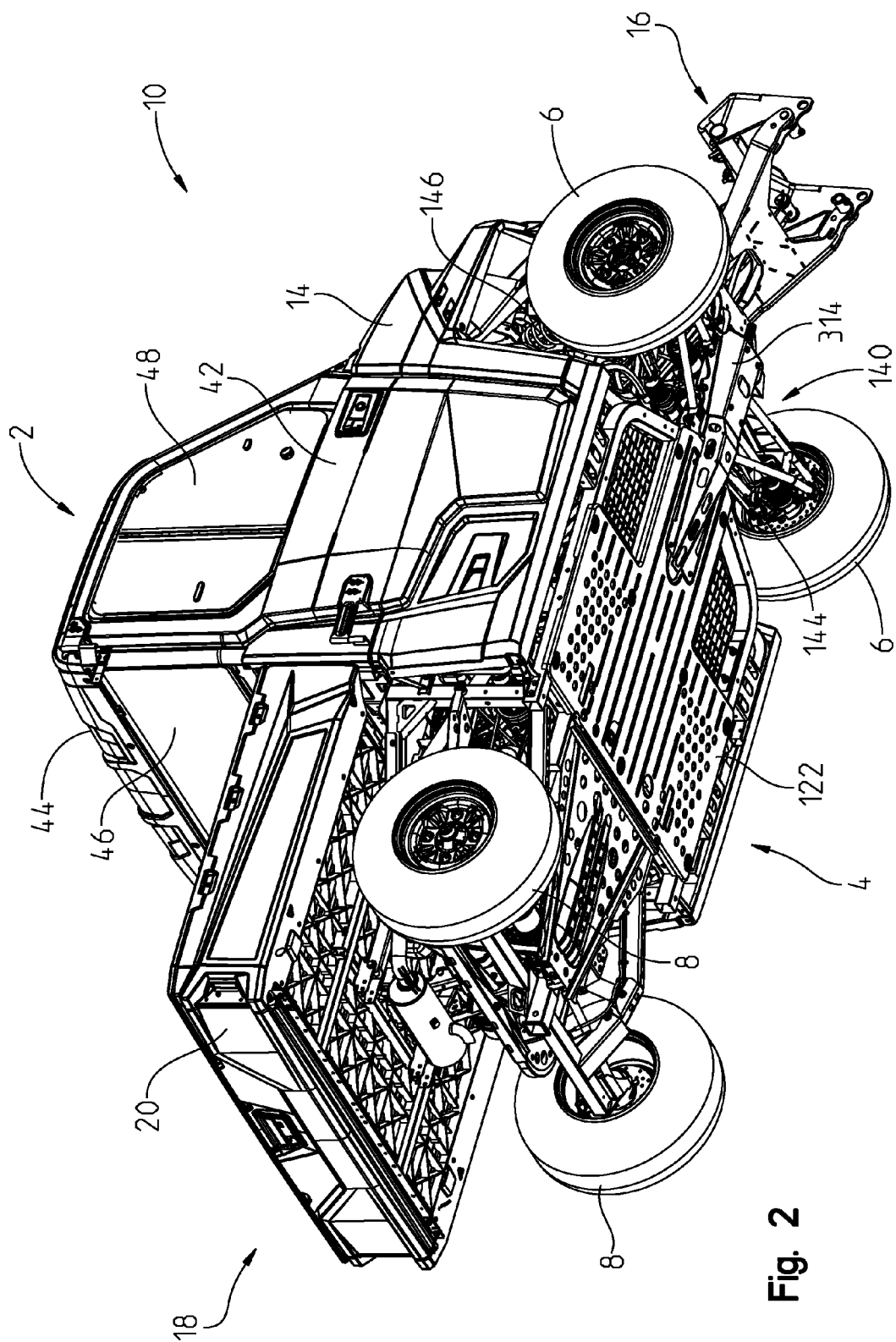
FIG. 2 is a rear right perspective view of the vehicle of FIG. 1.

As best shown in FIG. 2, mid-frame portion 52 of frame assembly 4 further includes a skid plate 122 that extends between outer frame members 62. Skid plate 122 includes a center portion 124 and laterally extending side panels 126 integrally coupled thereto. Center portion 124 couples with front portion 60a of lower longitudinal frame tubes 60, and side panels 126 couple with outer frame members 62. Side panels 126 include a plurality of apertures 128, which reduce the weight of frame assembly 4 and allow heat from powertrain system 518 to dissipate from utility vehicle 2. Center portion 124 includes a channel member 130 that extends forward toward front frame portion 50 and is positioned below tunnel member 132, as is detailed further herein.

With respect now to FIGS. 9 and 11, rear frame portion 54 includes an engine pan 106 extending from channel 68 and lower longitudinal frame tubes 60. Pan 106 defines the support platform for powertrain system 518 of utility vehicle 2 and is supported by lower frame members 120. Illustratively, pan 106 is integrally coupled with lower frame members 120 through a stamping process. Alternatively, pan 106 and lower frame members 120 may be separate components coupled together through conventional joining methods (bolts, welds, adhesive, rivets, etc.). A brace 125 positioned above engine pan 106 may be removed in order to couple powertrain system 518 with frame assembly 4. Illustrative pan 106 includes a plurality of apertures 107, which reduce the weight of frame assembly 4 and allow heat from powertrain system 518 to dissipate from utility vehicle 2. Illustrative powertrain system 518 includes a transmission 520; however, the configuration of rear frame portion 54 and powertrain system 518 may include alternative components, for example a continuously variable transmission.

Lower frame members 120 are coupled with channels 66 and/or rear portion 60b of lower longitudinal frame tubes 60. Vertically extending tubes 108 extend upwardly from pan 106 and support upper frame arms 110. Upper frame arms 110 are coupled to posts 100 with mounting flanges 112, brackets 114, and conventional fasteners (not shown). Rear frame portion 54 further includes a rear support plate 116, having an opening 118, coupled to vertically extending tubes 108 and lower frame members 120. Rear frame portion 54 further includes brackets 121 coupled to upper frame arms 110.

Figure 15:
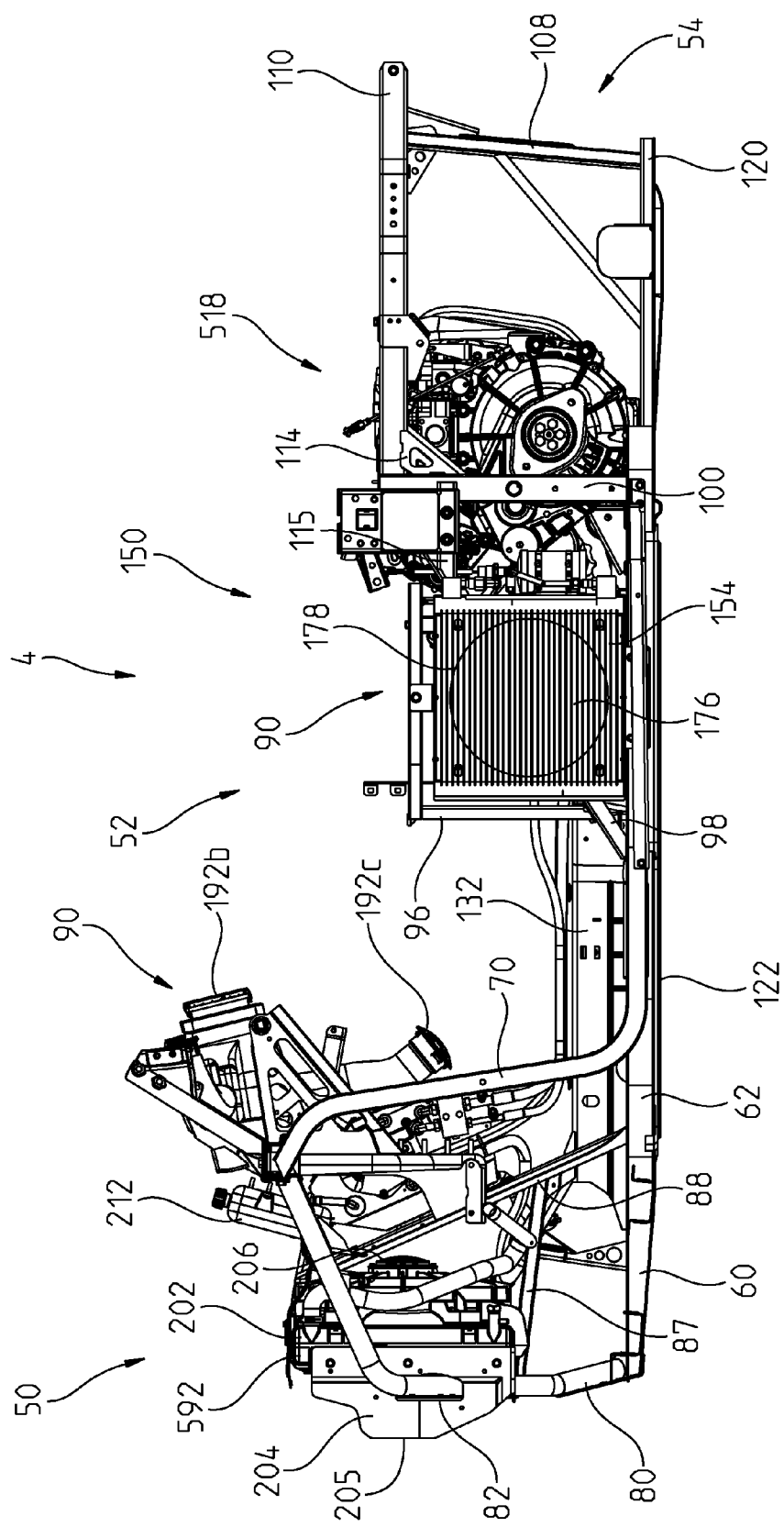
FIG. 15 is a left side view of the frame; the heating, ventilation, and air conditioning system; and the powertrain system of FIG. 7.
Figure 16:
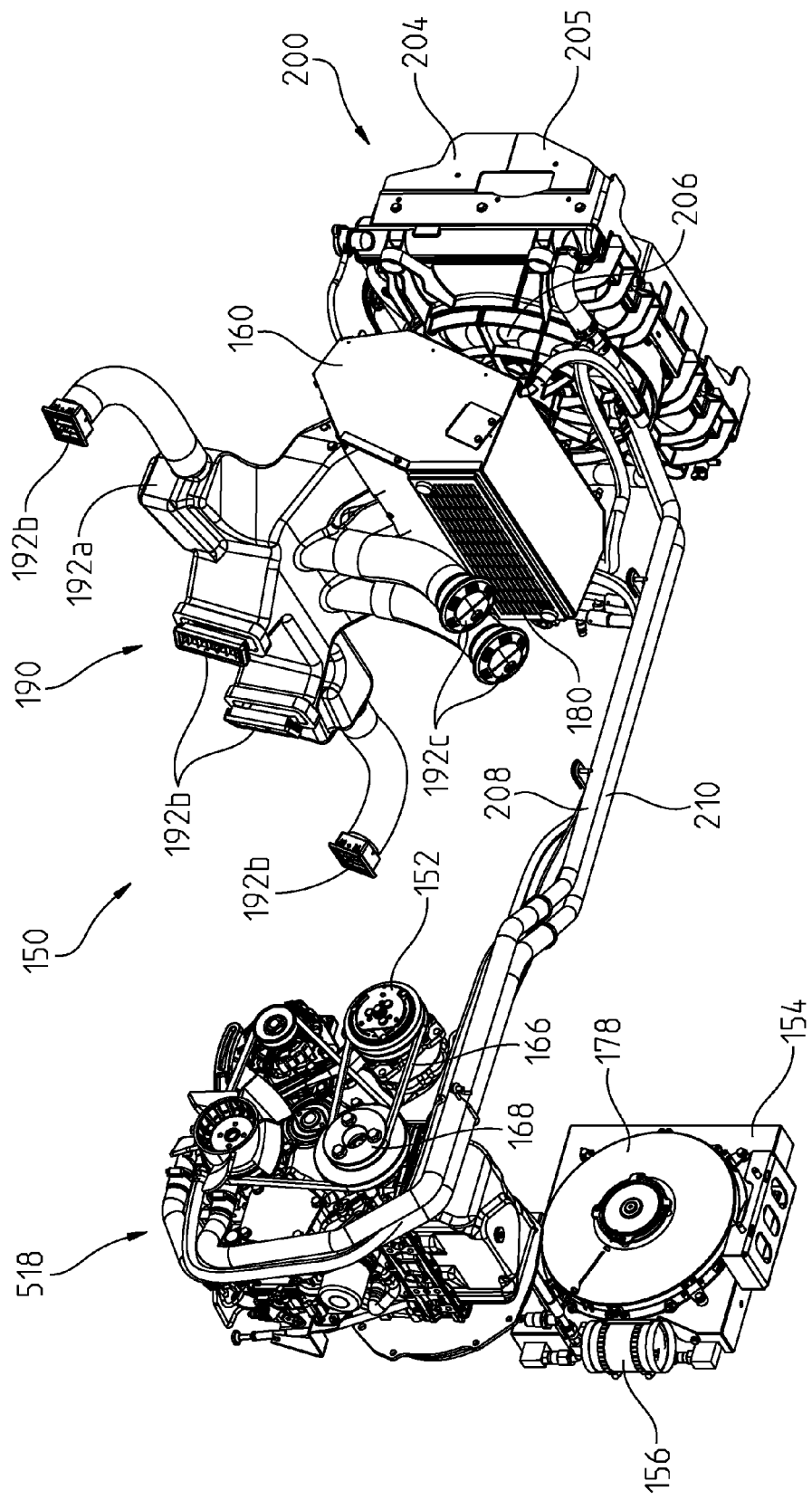
FIG. 16 is a right rear perspective view of the heating, ventilation, and air conditioning system of FIG. 15.
Figure 17:
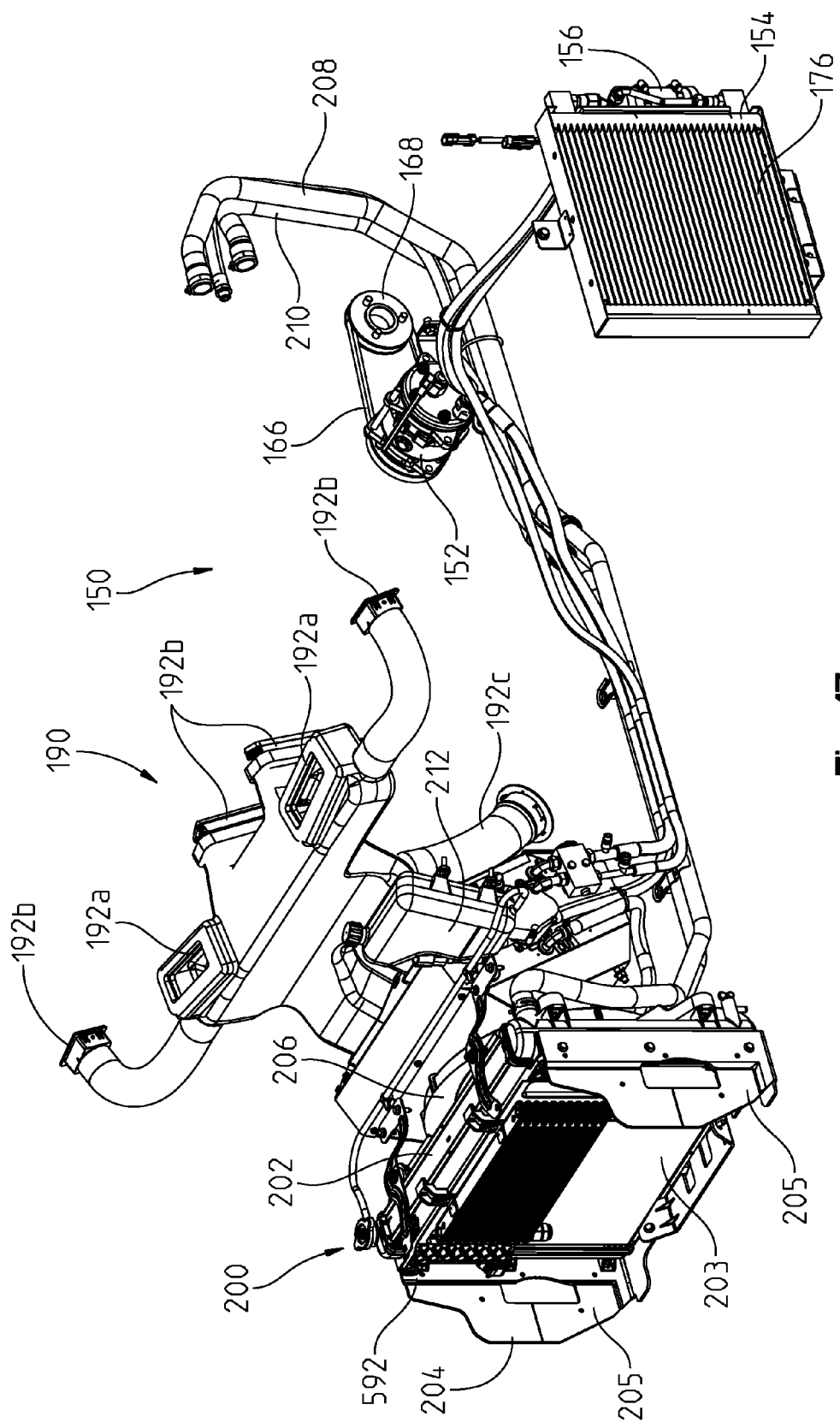
FIG. 17 is a front left perspective view of the heating, ventilation, and air conditioning system of FIG. 16.
Figure 18:
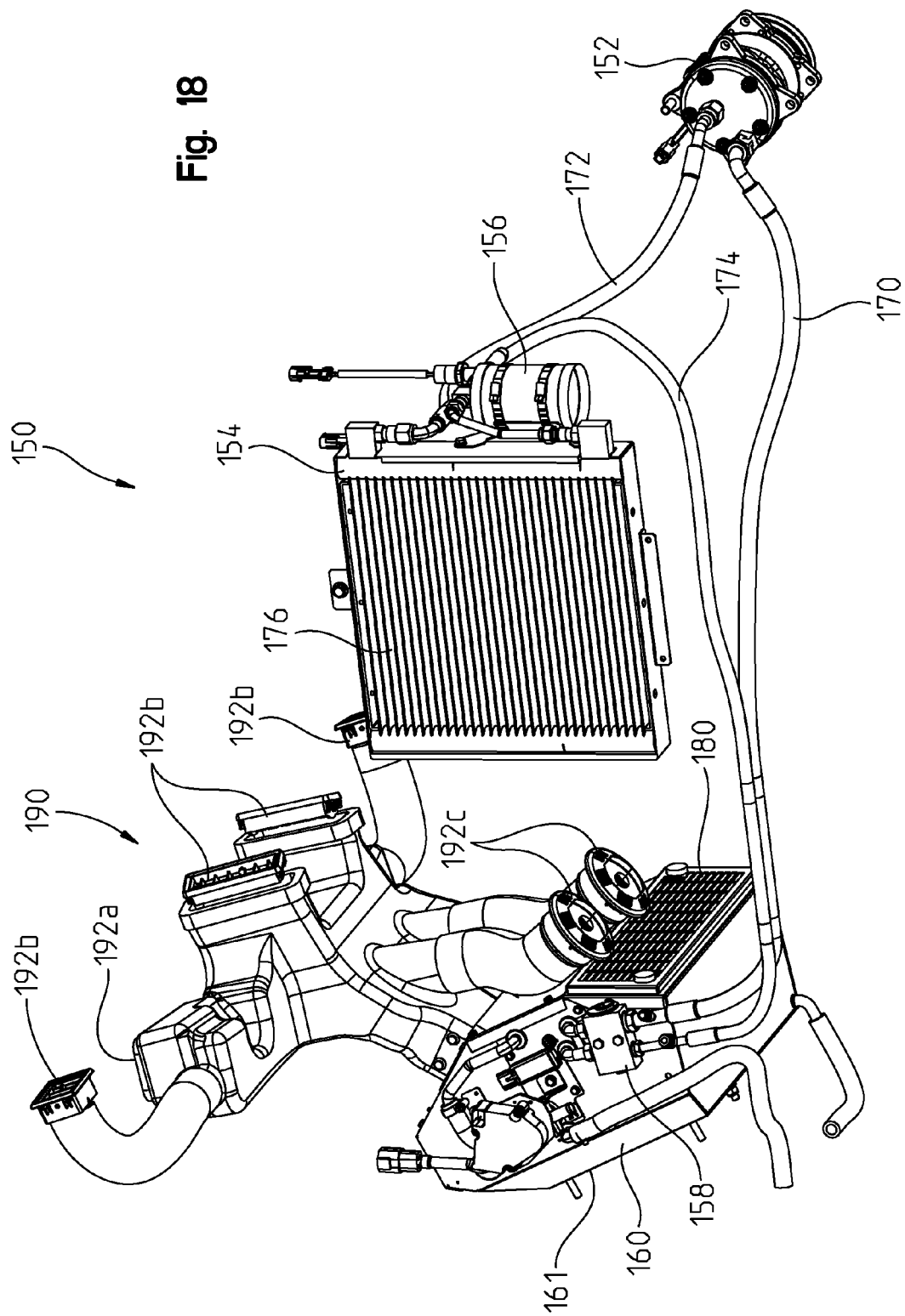
FIG. 18 is a rear left perspective view of the heating, ventilation, and air conditioning system of FIG. 17.
Figure 19:
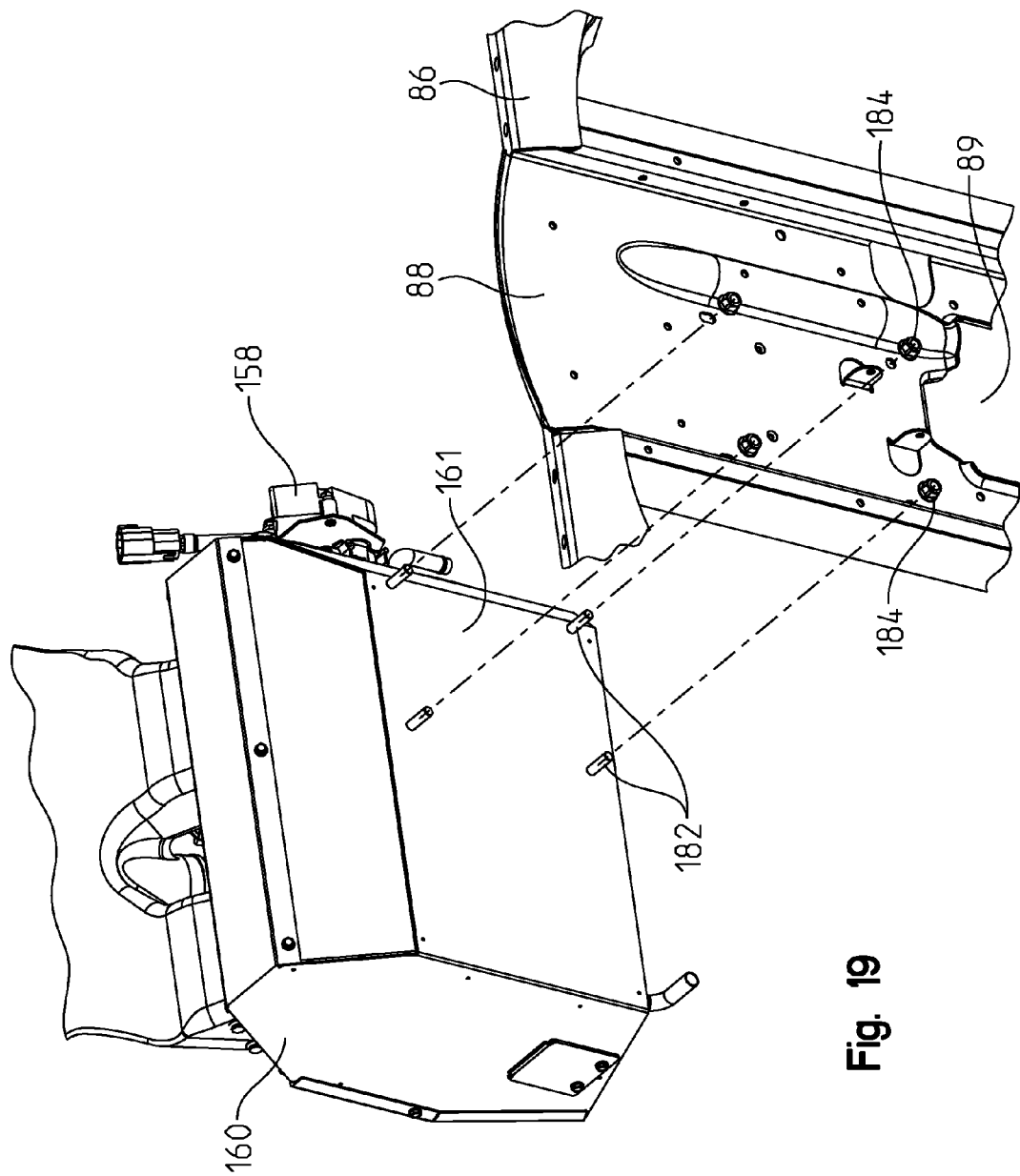
FIG. 19 is an exploded view of the shear panel of FIG. 12 and an evaporator of the heating, ventilation, and air conditioning system of FIG. 18.

Referring to FIGS. 15-19, HVAC system 150 is supported on frame assembly 4 and illustratively includes modular components, such as a compressor 152, a condenser 154, a receiver-drier 156, a metering device 158, an evaporator 160, a blower (not shown), an intake filter 180, a plenum 190, and at least one output vent 192. As shown best in FIG. 16, compressor 152 is operably coupled to an engine 600 of powertrain system 518 through a belt 166 and a pulley 168. Referring to FIGS. 17 and 18, compressor 152 is rearward of evaporator 160 and is fluidly coupled thereto via input hose 170. Similarly, compressor 152 is rearward of condenser 154 and is fluidly coupled thereto via output hose 172.

Condenser 154 is comprised of a plurality of cooling coils 176 to cool refrigerant from compressor 152. To facilitate cooling, condenser 154 is coupled to a fan 178 that is positioned inwardly therefrom, as shown in FIG. 16. Fan 178 increases air flow through condenser 154 and also provides additional cooling across engine 600. More particularly, fan 178 draws ambient air from outside of utility vehicle 2 into condenser 154 to cool the refrigerant in condenser 154. Referring to FIG. 15, fan 178 also moves any stagnant air under operator seat 26. Skid plate 122 of frame assembly 4 may "retain" the air flowing through condenser 154 and fan 178 within frame assembly 4 such that the air flows across engine 600. Alternative embodiments of utility vehicle 2 may be configured to operate fan 178 when HVAC system 150-is not engaged or when utility vehicle 2 is turned off. For example, it may be desirable to operate fan 178 in order to move stagnant air away from engine 600.

Referring to FIG. 18, condenser 154 is fluidly coupled to evaporator 160. More particularly, illustrative condenser 154 is coupled to evaporator 160 via receiver-drier 156. Condenser 154 is coupled to receiver-drier 156, which is fluidly coupled to evaporator 160 via hose 174. Illustratively, metering device 158 also is fluidly coupled to input hose 170, hose 174, and evaporator 160.

Condenser 154 is illustratively positioned below operator seat 26 and may include a pre-filter screen 162, as shown in FIGS. 3 and 4. Pre-filter screen 162 prevents grass, dirt, stones, and other debris from entering condenser 154. Pre-filter screen 162 is comprised of stamped metal and is removable from utility vehicle 2 to facilitate cleaning and maintenance thereof and of HVAC system 150 generally. By positioning condenser 154 under operator seat 26 and away from front frame portion 50, there is sufficient space at front frame portion 50 to accommodate portions of powertrain system 518, auxiliary power system 300, and attachment 16.

Referring to FIGS. 16-19, evaporator 160 is positioned at front frame portion 50. As shown best in FIG. 19, a rear surface 161 of evaporator 160 is coupled to shear panel 88 with conventional fasteners, such as bolts 182 and nuts 184. Evaporator 160 is positioned above opening 89 of shear panel 88. As such, evaporator 160 is positioned toward operator area 32. Evaporator 160 includes internal coils (not shown), the blower (not shown), and a filter 180. The blower draws air from operator cab 30 into evaporator 160 and across the coils therein. Filter 180 prevents particulates and other debris in the air from entering evaporator 160. The blower also allows air from evaporator 160 to flow into operator area 32 through vents 192, as is detailed further herein. Alternatively, evaporator 160 may be configured with air ducts positioned under hood 12 and configured to draw outside air into operator cab 30.

Evaporator 160 is fluidly coupled to plenum 190 in order to provide warm or cool air to operator area 32. More particularly, plenum 190 is positioned above evaporator 160 and is supported within dashboard 49 (FIG. 3). As such, evaporator 160 is positioned below dashboard 49. Vents 192 also are positioned within dashboard 49 but are open to operator area 32. Illustratively, HVAC system 150 includes two upper vents 192a positioned adjacent windshield 40, four operator vents 192b extending across dashboard 49 (FIG. 3) and directed toward an operator and a passenger, and two lower vents 192c directed toward floorboards 47 of operator cab 30. More particularly, upper vents 192a defrost front windshield 40, while operator vents 192b and lower vents 192c are generally positioned for providing warm or cool air directly to operator area 32. Illustrative plenum 190 and vents 192 are comprised of a moldable polymeric material. Other embodiments of HVAC system 150 may include other arrangements and quantities of vents 192. Each vent 192a, 192b, and 192c is engaged during operating of HVAC system 150. As such, air flows simultaneously from vents 192a, 192b, and 192c. Alternative embodiments of HVAC system 150 may be configured to selectively operate a portion of vents 192.

In operation, when an operator initiates HVAC system 150, for example by turning on the air conditioning from the operator controls, compressor 152 is engaged. More particularly, engine 600 rotates pulley 168 to drive compressor 152 through belt 166. Refrigerant gas from evaporator 160 flows through input hose 170 and into compressor 152, where it is compressed, and transferred to condenser 154 via output hose 172. Within condenser 154, the ambient air flows through pre-filter screen 162 to transform the refrigerant gas into liquid refrigerant. The air through pre-filter screen 162 exits condenser 154 and fan 178 and flows across engine 600. The liquid refrigerant then flows through receiver-drier 156, hose 174, and metering device 158 before flowing into evaporator 160. Warm air from operator area 32 flows into evaporator 160 through filter 180 which causes the refrigerant to vaporize and absorb the heat from the air. As such, the air is cooled and flows back into operator area 32 via vents 192. The refrigerant vapor then may flow back to compressor 152 through input hose 170 in order to provide continuous cooling to operator area 32. Electrical system 1300 may be configured to turn off compressor 152 if the load on engine 600 is at a predetermined threshold while utility vehicle 2 is idling.

Evaporator 160 also is configured to flow warm air into operator area 32 if the operator has turned on the heat from the operator controls. More particularly, a diverter valve may be used to draw warm air from a radiator 202 of cooling system 200 into operator area 32 through evaporator 160.

With reference to FIGS. 16 and 17, cooling system 200 extends from front end 10 of utility vehicle 2 to engine 600 in order to cool at least a portion of powertrain system 518. Cooling system 200 includes at least one heat exchanger, illustratively radiator 202, a shroud 204, a fan 206, coolant supply lines 208, 210, and a coolant supply, illustratively a bottle 212. Coolant supply lines 208, 210 extend rearward from radiator 202 and are coupled to engine 600 in order to cool the engine oil. Additionally, cooling system 200 may be used to introduce hot coolant into supply lines 208, 210 in order to pre-heat engine 600.

Radiator 202 may be coupled to a hydraulic oil cooler 592 of hydraulic system 500, as is detailed further herein. With respect to FIG. 17, illustrative hydraulic oil cooler 592 is directly coupled to radiator 202, such that a rear surface (not shown) of hydraulic oil cooler 592 is proximate a front surface 203 of radiator 202. By positioning hydraulic oil cooler 592 in close proximity to radiator 202, forced air generated when utility vehicle 2 is moving may flow through both hydraulic oil cooler 592 and radiator 202.

As shown best in FIG. 15, radiator 202 is mounted to front frame portion 50. For example, radiator 202 may be coupled to frame tubes 80 and/or shear panel 88 with conventional fasteners (not shown). Illustratively, fan 206 is positioned behind radiator 202 and hydraulic oil cooler 592 may be positioned in front of shear panel 88. Radiator 202 is generally surrounded by radiator shroud 204, which extends in a generally forward direction, to facilitate air flow in the direction of radiator 202. Illustrative shroud 204 includes openings (not shown) that receive frame tubes 80. As such, it is apparent from FIG. 7 that shroud 204 is integrally coupled with frame tubes 80. Side portions 205 of shroud 204 are configured as living hinges. Additional features of radiator shroud 204 may be disclosed in U.S. Provisional Patent Application No. 61/442,071, filed on Feb. 11, 2011; U.S. patent application Ser. No. 13/370,139, filed on Feb. 9, 2012; U.S. patent application Ser. No. 13/464,603, filed on May 4, 2012; and U.S. patent application Ser. No. 13/492,589, filed on Jun. 8, 2012, the complete disclosures of which are expressly incorporated by reference herein.

In one embodiment, fan 206 is controlled by the vehicle controller 1302 of electrical system 1300 (see FIG. 56). Temperature sensors 214 (FIG. 56) in communication with controller 1302 measure the coolant temperature level of cooling system 200 as well as the oil temperature level of the hydraulic oil cooler 592. Based on the detected temperature levels, vehicle controller 1302 turns on fan 206 to cool both the coolant of cooling system 200 and the oil of hydraulic oil cooler 592. In one embodiment, the cooling system 200 has a first temperature threshold and the hydraulic oil cooler 592 has a second temperature threshold. When the detected temperature of the coolant of cooling system 200 increases to the first temperature threshold, or when the detected temperature of the oil of hydraulic oil cooler 592 increases to the second temperature threshold, controller 1302 activates fan 206 to thereby cool both systems. When the respective fluid temperatures of either or both the cooling system 200 and hydraulic oil cooler 592 drop to a respective low temperature threshold, controller 1302 deactivates fan 206.

Figure 20:
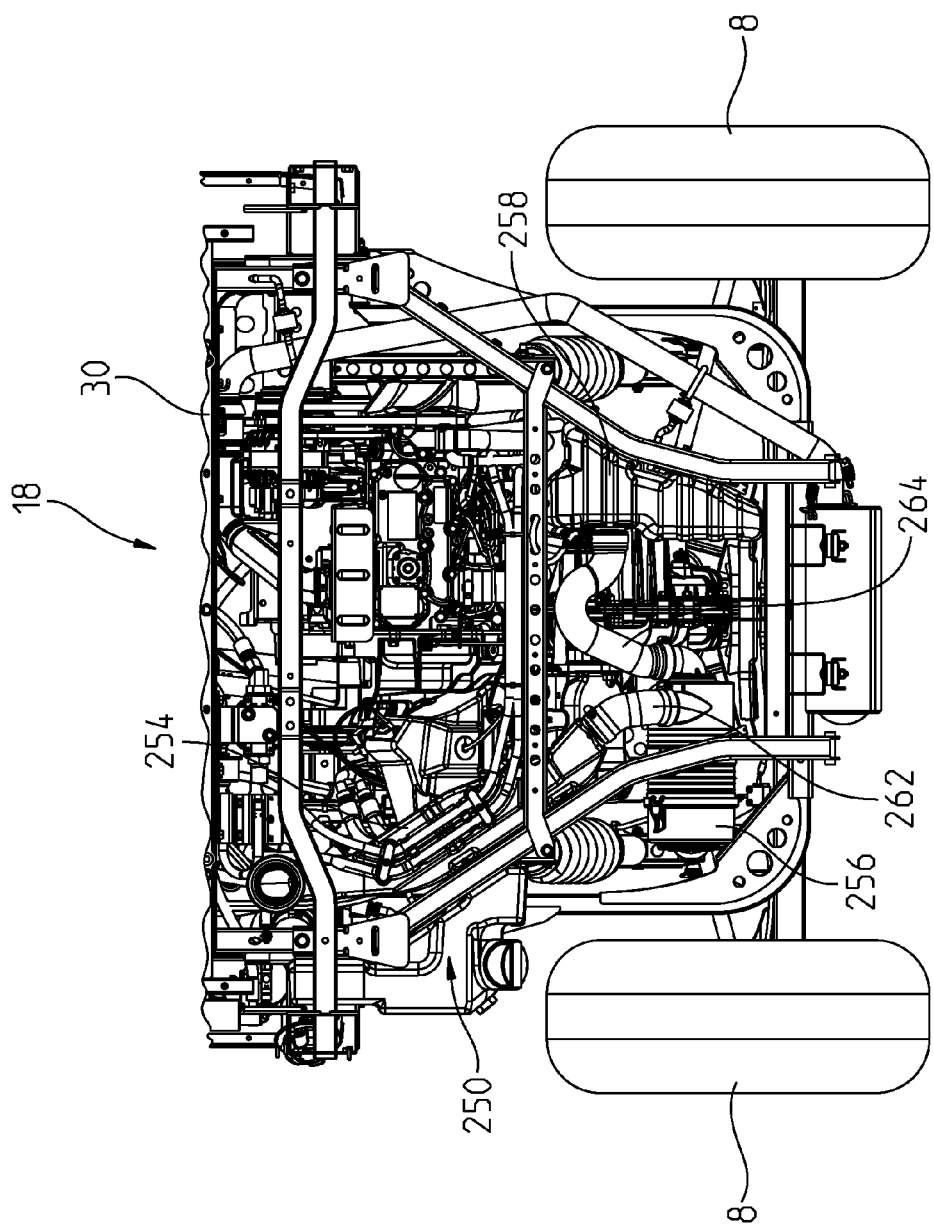
FIG. 20 is a top plan view of a rear end of the vehicle of FIG. 6, including a rear suspension assembly, a portion of the powertrain system, and an air intake system.
Figure 21:
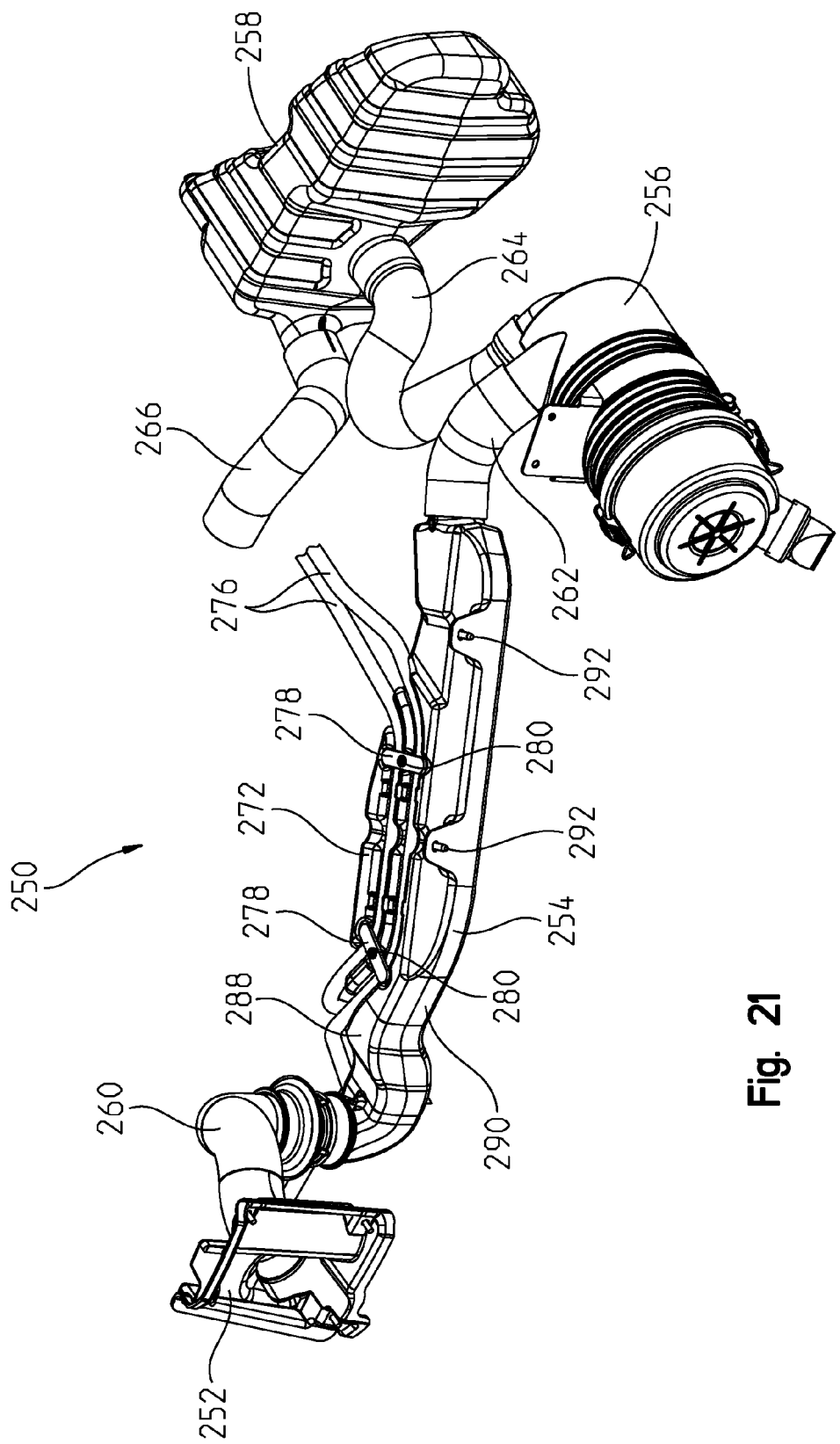
FIG. 21 is a rear left perspective view of the air intake system of FIG. 20.
Figure 22:
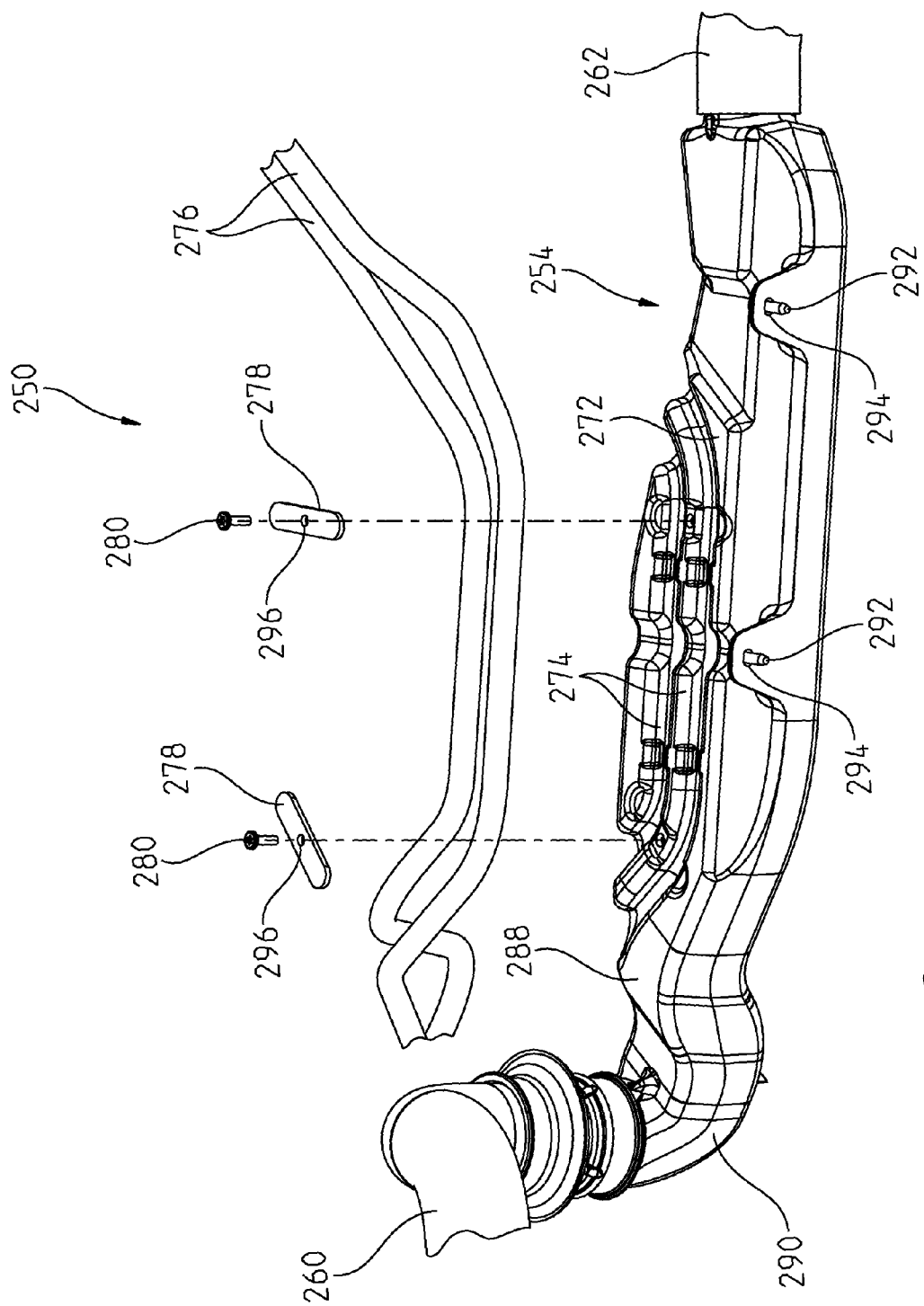
FIG. 22 is a front perspective view of an air box of the air intake system of FIG. 20.

Referring to FIGS. 20-22, air intake system 250 is positioned rearward of operator cab 30 and is fluidly coupled to engine 600. In particular, air intake system 250 draws air into engine 600 to facilitate combustion. As shown in FIG. 21, air intake system 250 includes an intake port 252, an air box 254, an air filter or cleaner 256, a baffle box 258, and hoses 260, 262, 264, and 266. As shown best in FIG. 1, intake port 252 is supported on cab 30 adjacent operator seat 26. A filter 270 may be positioned over intake port 252 and is supported on cab 30. Intake port 252 is configured to draw ambient air into air intake system 250.

Intake port 252 is fluidly coupled to air box 254 via hose 260. Air box 254 is coupled to air cleaner 256 with hose 262. Air cleaner 256 is fluidly coupled to baffle box 258 through hose 264. Additionally, baffle box 258 is coupled to engine 600 through hose 266 in order to supply air to engine 600 to facilitate combustion therein.

With reference to FIG. 22, air box 254 may be comprised of a polymeric material, for example polypropylene, and has a top portion 288 and a bottom portion 290. Top portion 288 may be coupled to bottom portion 290 through pins 292. Pins 292 are received within apertures 294 of bottom portion 290. Alternatively, top portion 288 may be integrally formed with bottom portion 290 such that air box 254 is a single component. Top portion 288 includes a profiled top surface 272, which includes a plurality of channels 274. Channels 274 are configured to route lines 276, which may be fuel lines, electrical wires, or other lines and hoses. Lines 276 are secured to top surface 272 with clips or brackets 278 and conventional couplers 280. In particular, clips 278 are positioned over of lines 276 and include apertures 296 for receiving fasteners 280. Fasteners 280 may be threadedly coupled or otherwise secured within apertures 282 of top surface 272.

During operation of engine 600, ambient air enters intake port 252, through filter 270. Air flows through hose 260 and into air box 254. The air enters hose 262 from air box 254 and flows into air cleaner 256. The air in air cleaner 256 flows through hose 264 and into baffle box 258. Air exits baffle box 258 and enters engine 600 to facilitate combustion. Air box 254 and/or baffle box 258 is configured to quiet or muffle the sound of the intake air. For example, illustrative air intake system 250 is a calculated volume of space that may reduce the intake noise by approximately 2-3 decibels.

Referring to FIGS. 23-27, auxiliary power system 300 is supported by frame assembly 4 and extends from rear frame portion 54 to front frame portion 50. Illustrative auxiliary power system 300 is a power take-off system having an attachment shaft 302, a clutch assembly 310, and a gearbox assembly 330. Attachment shaft 302 includes a first portion 304, having a forward end 304a and a rearward end 304b. Additionally, attachment shaft 302 includes a second portion 306 having a forward end 306a and a rearward end 306b. First portion 304 is rotatably coupled to second portion 306 through a joint 312, illustratively a U-joint. Joint 312 could also be a CV joint, a Love-joy joint, or other similar component. In particular, rearward end 304b and forward end 306a are coupled to joint 312. Forward end 304a of first portion 304 includes splines 308, which may be operably coupled to a complimentary portion of attachment 16 (not shown). As such, attachment shaft 302 is configured to provide power to attachment 16.

Figure 26:
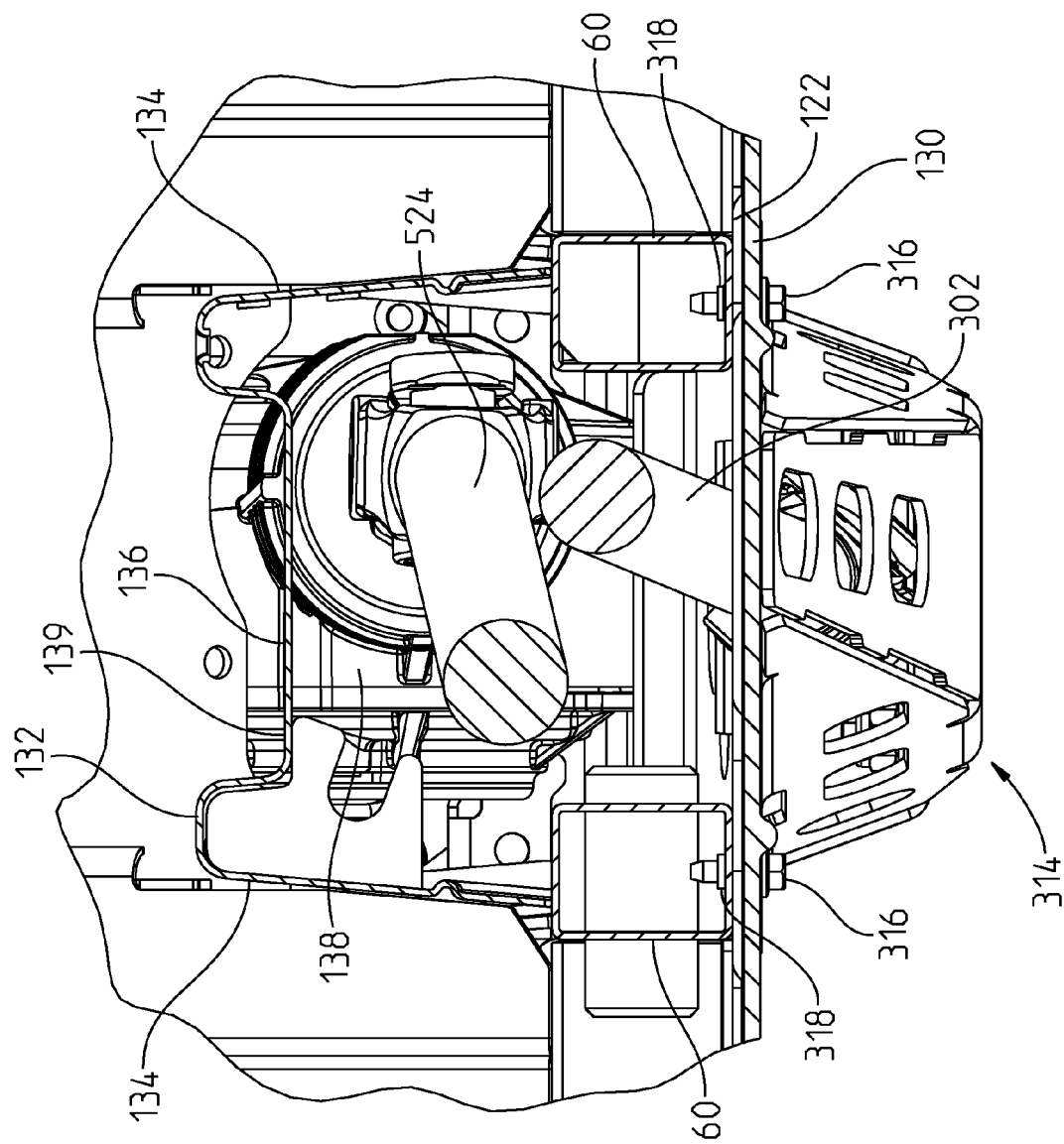
FIG. 26 is a cross-sectional view of an attachment shaft of the auxiliary power system and a drive shaft of the powertrain system.
Figure 27:
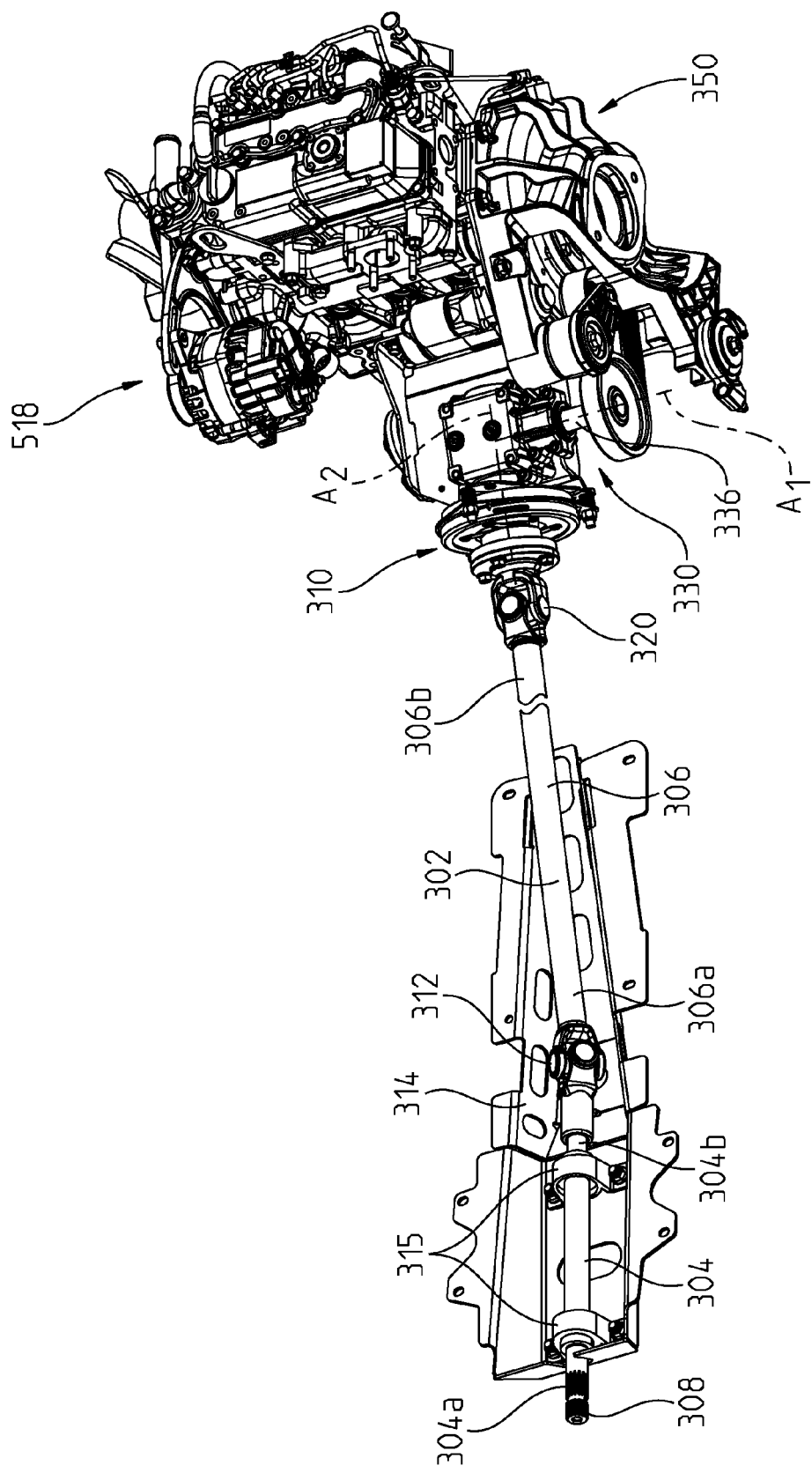
FIG. 27 is a left front perspective view of the auxiliary power system of FIG. 25.

Referring to FIGS. 26 and 27, attachment shaft 302 is mounted to a support member 314 that couples with channel member 130 (via bolts 316 and nuts 318) and extends below skid plate 122. As such, attachment shaft 302 extends below frame assembly 4, which allows additional space above attachment shaft 302 and skid plate 122 for supporting additional components of utility vehicle 2, such as drive shaft 524, radiator 202, hydraulic oil cooler 592, and evaporator 160. As shown in FIG. 27, bearings 315 may be used to mount first portion 304 to support member 314 in order to stabilize attachment shaft 302 when coupled to attachment 16. Bearings 315 allow first portion 304 to rotate in order to operate attachment 16. While illustrative utility vehicle 2 includes attachment shaft 302 at front end 10, alternative embodiments may position attachment shaft 302 at rear end 18, or may include at least two attachment shafts 302—one at front end 10 and one at rear end 18 of utility vehicle 2.

As shown in FIGS. 23-26, attachment shaft 302 extends under tunnel member 132 and extends from front frame portion 50. Additionally, drive shaft 524 of powertrain system 518 also extends under tunnel member 132 in close proximity to attachment shaft 302 of auxiliary power system 300. More particularly, and as shown in FIG. 26, both attachment shaft 302 and drive shaft 524 are positioned between walls 134 of tunnel member 132, and are positioned within lower channel 138 of tunnel member 132. Attachment shaft 302 is positioned below drive shaft 524 and extends at a downward angle below skid plate 122.

Second portion 306 of attachment shaft 302 is coupled to clutch assembly 310 via a joint 320, illustratively a U-joint. Clutch assembly 310 is configured to engage attachment shaft 302 with gearbox assembly 330 when operating attachment 16. Clutch assembly 310 may be an electronic clutch assembly, however, alternative clutch assemblies may be used. The illustrative auxiliary power system 300 allows engine 600 to directly and mechanically drive attachment 302 through clutch assembly 310, as is detailed further herein; however, alternative embodiments of auxiliary power system 300 may be electronically or hydraulically operated.

Figure 28:
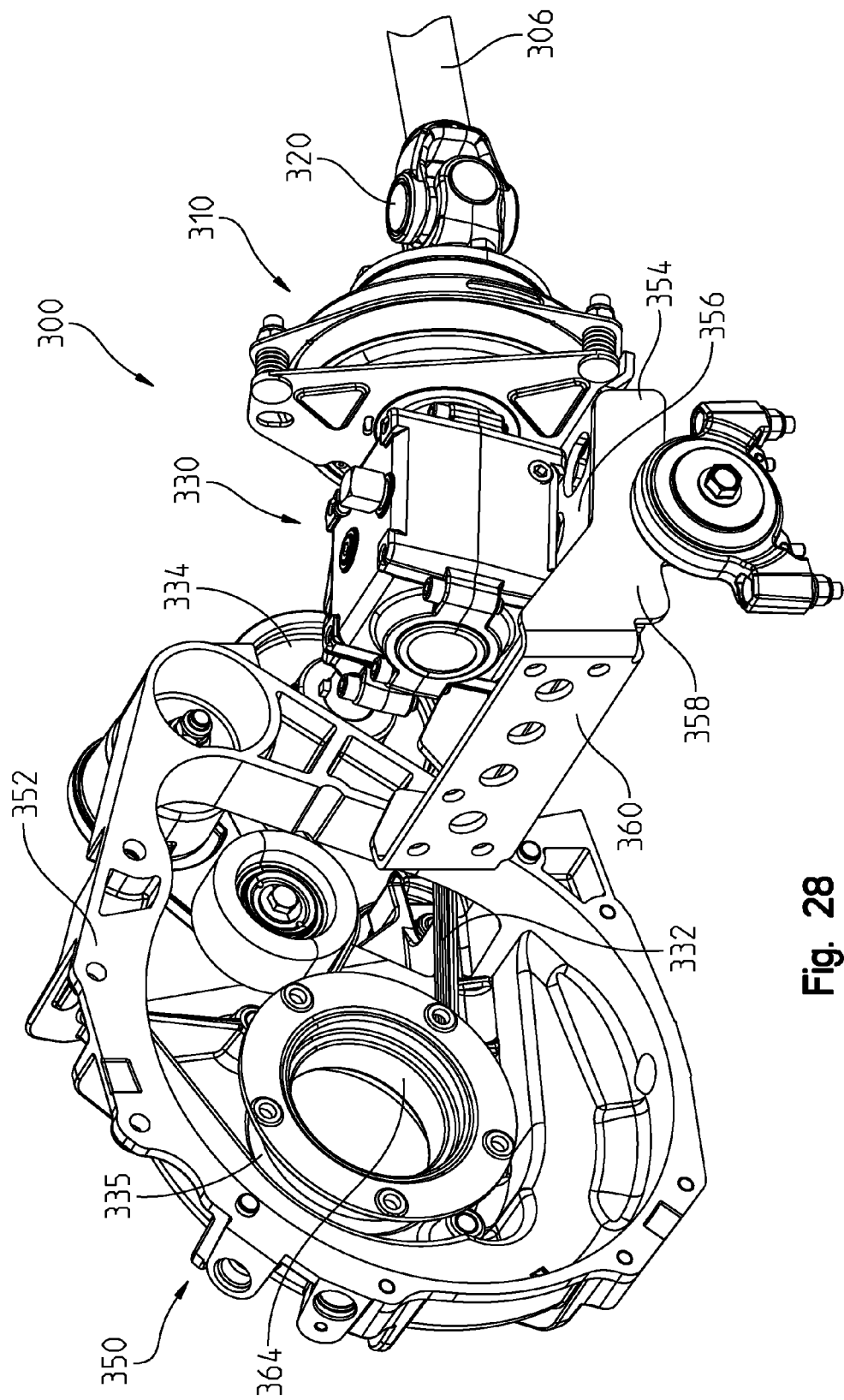
FIG. 28 is a rear right perspective view of a bell housing assembly for supporting the powertrain system and the auxiliary power system.
Figure 29:
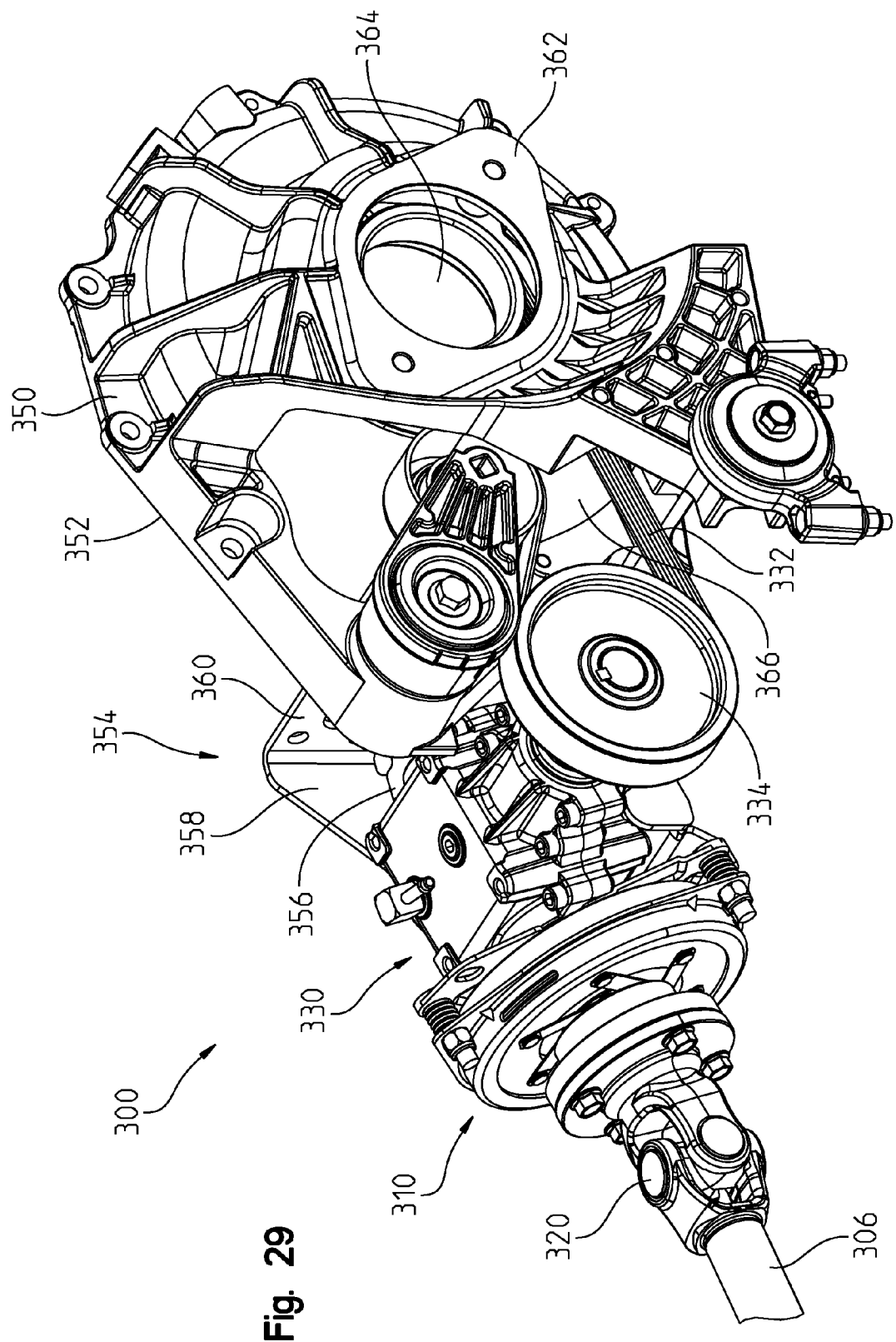
FIG. 29 is a front left perspective view of the bell housing of FIG. 27.

With reference to FIGS. 27-29, gearbox assembly is coupled to engine 600 by way of a support plate 354. In particular, support plate 354 is coupled to the crankcase of engine 600 and supports gearbox assembly 330 forward of engine 600. Gearbox assembly 330 is coupled to a generally flat surface 356 of support plate 354. Side walls 358 and rear wall 360 of support plate 354 extend upwardly from surface 356.

Engine 600 directly drives gearbox assembly 330 through a belt 332. Alternatively, a chain or other similar device may be used to couple gearbox assembly 330 with engine 600. Engine flywheel 620 (FIG. 35) rotates a pulley 334 and a pulley 335 via belt 332 in order to mechanically operate gearbox assembly 330 and attachment shaft 302. When utility vehicle 2 is turned on, engine flywheel 620 is continuously engaging belt 332 and pulleys 334 and 335 because engine 600 is continuously operating. As such, gearbox assembly 330 is continuously engaged. However, gearbox assembly 330 does not continuously engage attachment shaft 302. Rather, gearbox assembly 330 cooperates with clutch assembly 310 when the operator selectively engages attachment shaft 302. More particularly, attachment shaft 302 is engaged when an operator is positioned on operator seat 26, as is detailed further herein, and selects to engage attachment shaft 302 in order to operate attachment 16.

Referring to FIG. 27, gearbox assembly 330 has an input shaft 336 that is positioned at approximately 90° from the output of gearbox assembly 330. The output of gearbox assembly 330 engages clutch assembly 310. In particular, input shaft 336 extends along axis $A_1$ and is rotated by pulley 334 and belt 332. Input shaft 336 is operably coupled at approximately 90° with the output of gearbox assembly 330, which extends along an axis $A_2$. As is apparent from FIG. 27, axis $A_1$ is approximately perpendicular to axis $A_2$.

In operation, when an operator desires to use attachment 16, the operator engages auxiliary power system 300. Gearbox assembly 330 is continuously operating because it is coupled with engine 600 via belt 332 and pulleys 334, 335. However, when the operator selectively engages attachment 16, clutch assembly 310 is engaged in order to rotate attachment shaft 302 via gearbox assembly 330. Gearbox assembly 330 and clutch assembly 310 rotate second portion 306 of attachment shaft 302 via joint 320. The rotation of second portion 306 causes first portion 304 to rotate via joint 312. As such, forward end 304a rotates to operate attachment 16, which is operably coupled to forward end 304a through splines 308. Illustrative attachment shaft 302 may be mechanically driven by engine 600 at approximately 2000 rpm.

Referring to FIGS. 28 and 29, a bell housing 350 is configured as a three-way mount to support engine 600, hydraulic pump 554, and a portion of auxiliary power system 300. Illustrative bell housing 350 is comprised of cast aluminum. An inner surface 352 of bell housing 350 couples with engine 600 through conventional fasteners, such as bolts (not shown). As such, engine 600 is positioned rearward of gearbox assembly 330. An opposing outer surface 362 provides a mounting surface for hydraulic pump 554. As such, hydraulic pump 554 is outwardly spaced apart from engine 600. However, hydraulic pump 554 is operably coupled to engine 600 through aperture 364, as is detailed further herein.

Bell housing 350 further supports drive pulley 335 and includes an opening 366 to allow belt 332 to couple with pulley 335 and engine 600 in order to drive pulley 334. As such, belt 332 is positioned intermediate inner surface 352 and outer surface 362 of bell housing 350. Pulley 335 also is positioned intermediate inner surface 352 and outer surface 362.

Figure 30:
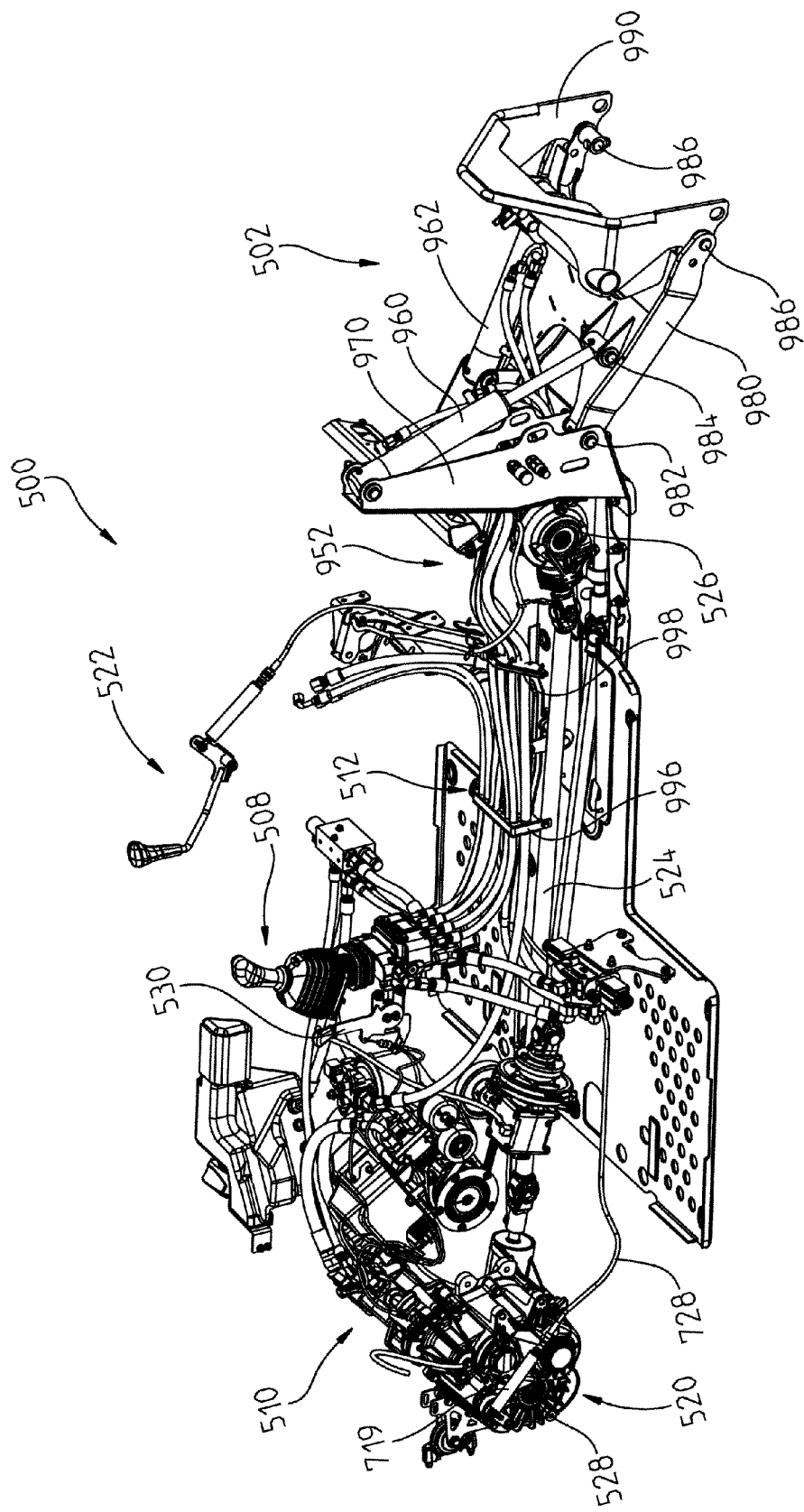
FIG. 30 is a front right perspective view of the hydraulic system, less the steering system.
Figure 31:
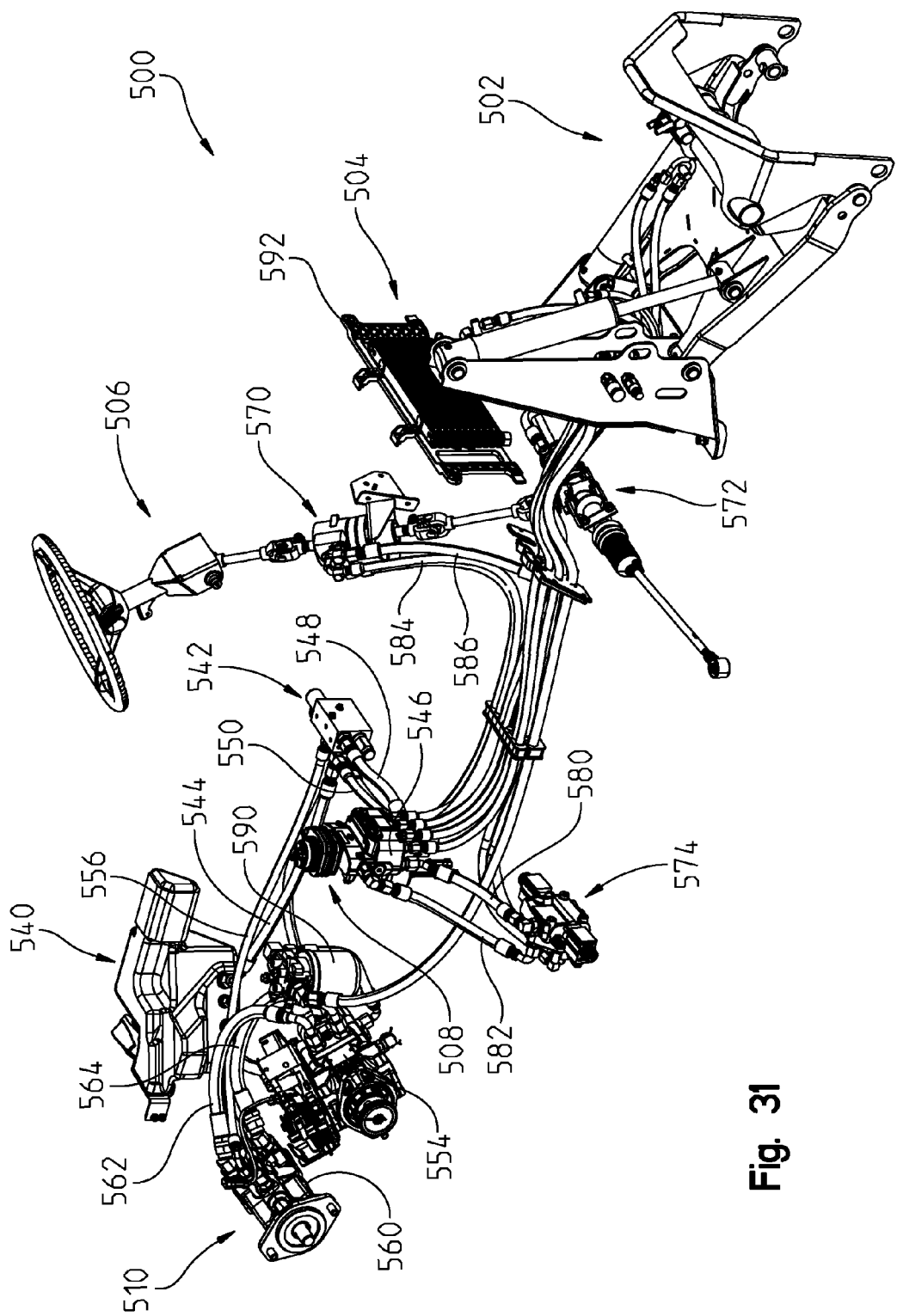
FIG. 31 is a front right perspective view of the major components of the hydraulic system.
Figure 32:
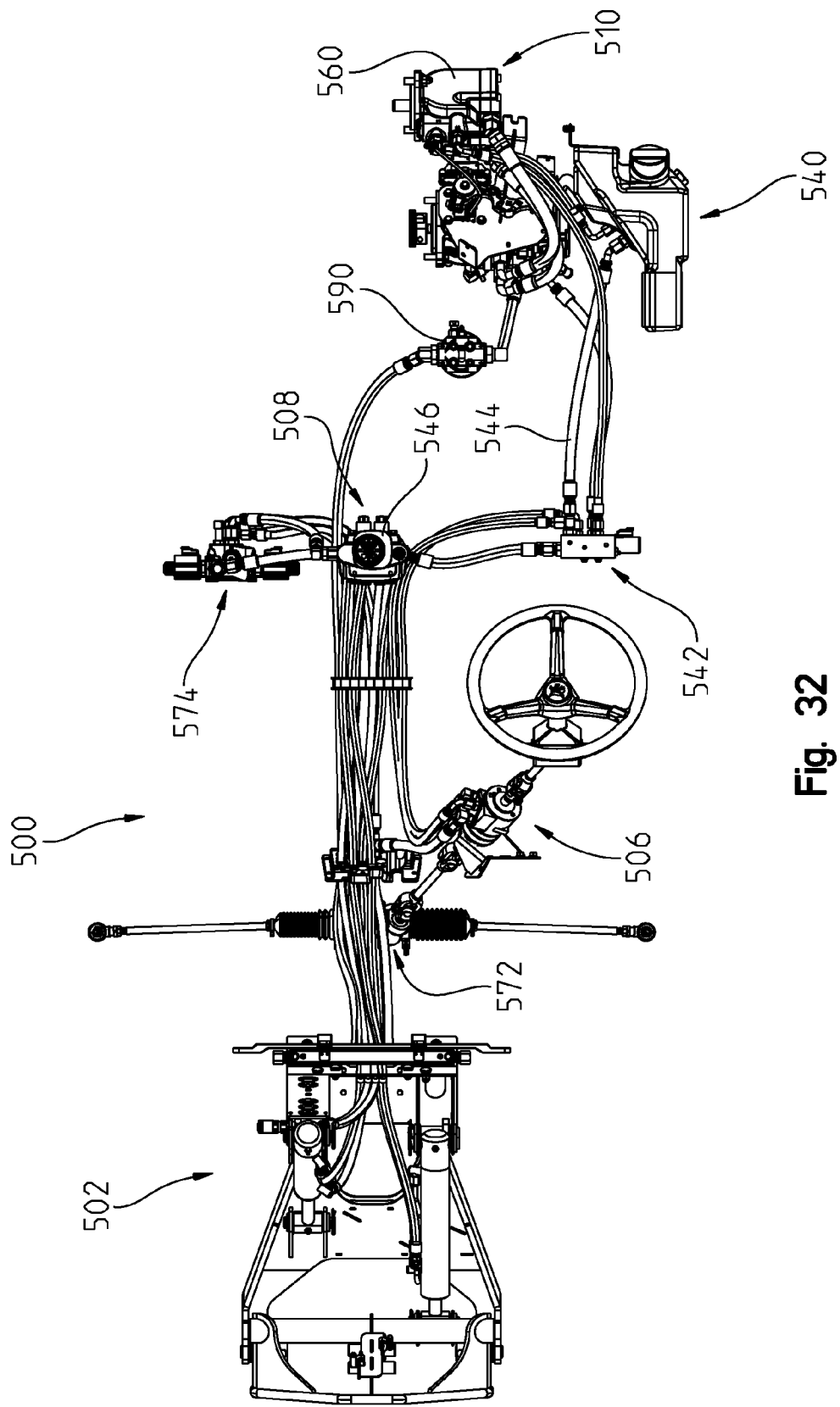
FIG. 32 is a top view showing the hydraulic system of FIG. 31.

With reference now to FIGS. 30-32, the hydraulic system will be described. The hydraulic system is shown generally at 500 and includes hydraulic implements 502, hydraulic cooling 504 (FIG. 31), hydraulic steering 506, hydraulic controls 508, hydraulic drive 510 and hydraulic drive control 512. FIGS. 30-32 also show a powertrain system 518, which in addition to hydraulic drive 510, would include transmission 520, drive shaft 524, front differential 526, and rear differential 528. FIGS. 30-32 also show transmission controls 522 and manual throttle 530.

As shown best in FIGS. 31 and 32, hydraulic reservoir 540 maintains the hydraulic fluid for the entire system and feeds hydraulic fluid to flow control valve 542 via hydraulic lines/hoses 544. Hydraulic fluid is fed to and from control valve 546 via hydraulic lines 548 and 550. Hydraulic fluid is supplied to hydraulic pump 554 by way of hydraulic hose 556 and hydraulic fluid is supplied to and from hydraulic motor 560 by way of hydraulic lines 562 and 564.

As also shown in FIGS. 31 and 32, steering system 506 includes hydraulic steering motor 570 coupled to a hydraulic steering gear 572 (as further described herein), and which is coupled to an electric hydraulic valve 574. Electric hydraulic valve 574 receives and returns hydraulic fluid to control valve 546 by way of hydraulic hoses 580 and 582 and supplies steering motor 570 by way of hydraulic lines 584 and 586. Other components in the hydraulic system include filter 590, and radiator 592 as part of cooling system 504.

Figure 33:
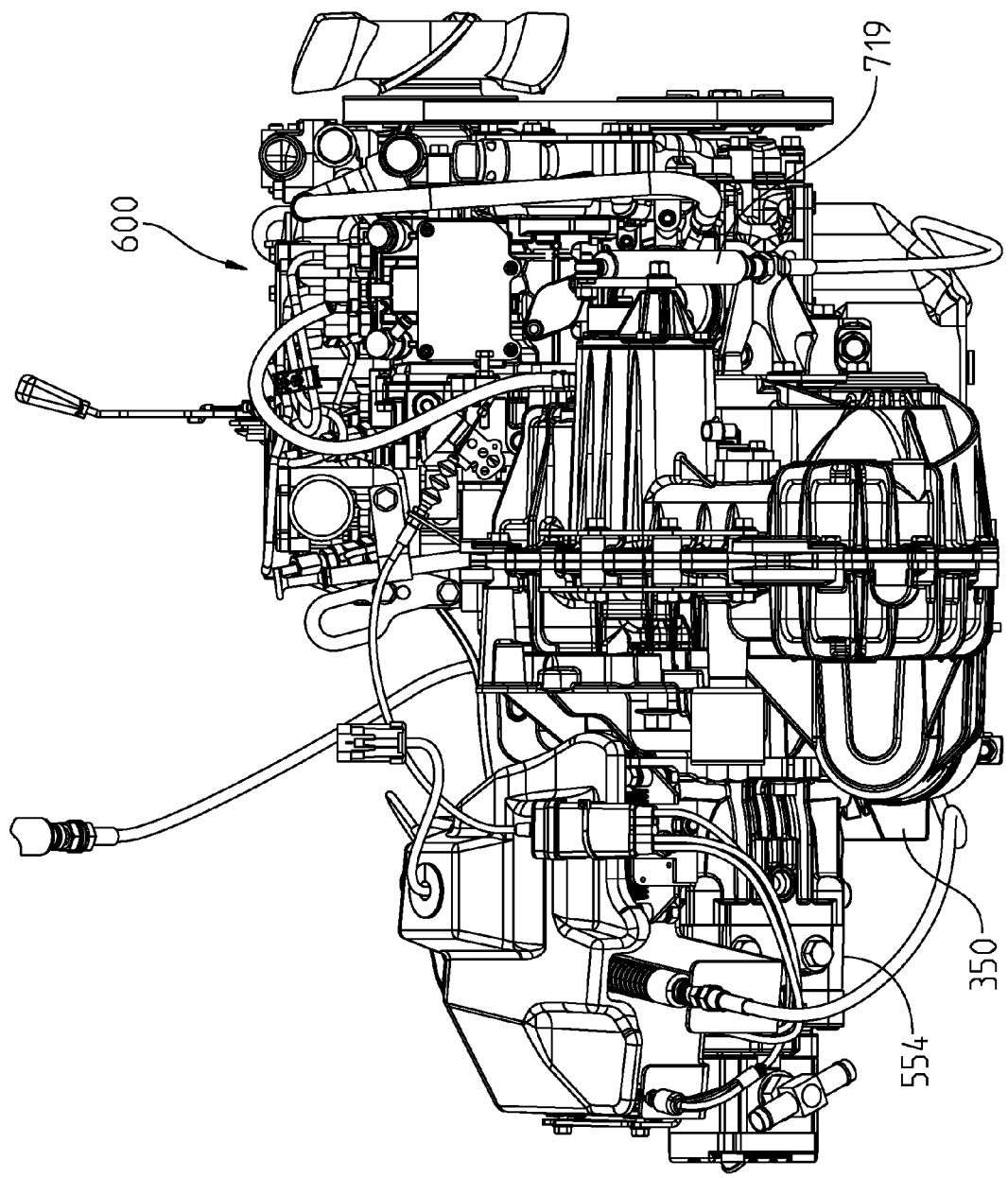
FIG. 33 is a rear view of the engine and hydraulic pump.
Figure 34:
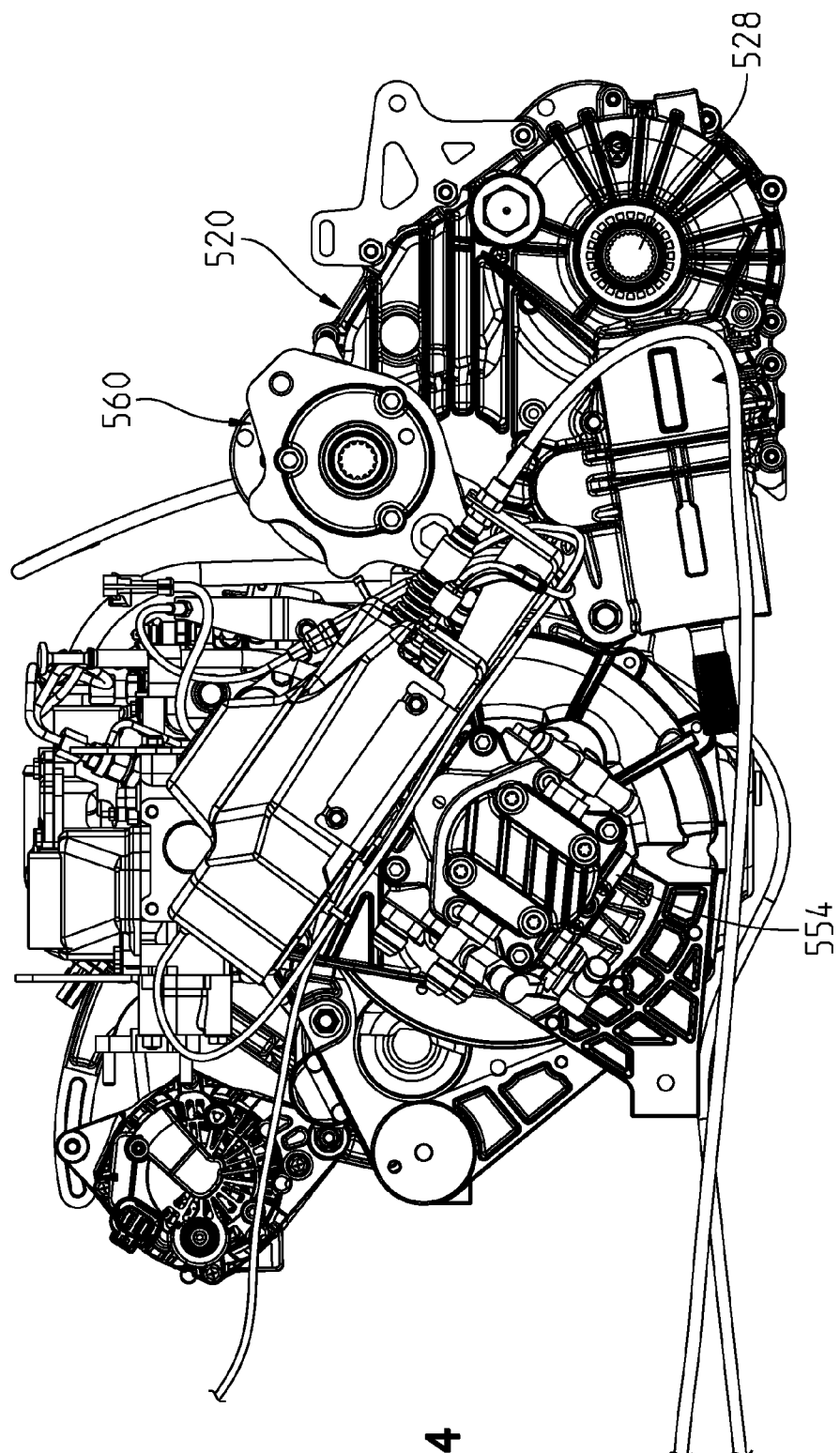
FIG. 34 is a left side view of the engine and hydraulic pump of FIG. 33.

With reference now to FIGS. 33-36, the hydraulic pump drive will be described in greater detail. As shown in FIGS. 33 and 34, engine 600 is shown coupled to hydraulic pump 554. Hydraulic motor 560 is coupled to rear transmission 520 at 602 (FIG. 34). It should be appreciated that the engine and transmission are not directly mechanically coupled together, for example by way of a continuously variables transmission (CVT), but rather engine 600 directly drives hydraulic pump 554 and hydraulic motor 560 directly drives transmission 520, with pump 554 and motor 560 of fluidly coupled hydraulically. It should also be noted, however, that the centerline distance between the drives for pump 554 and 602 correspond to the centerline distance between the drive and driven clutches of a standard CVT in the event that a user wants to convert the hydraulic to mechanical drive. It should also be noted that the transmission 520 is a mechanical transmission; similar in nature to that described in U.S. patent application Ser. No. 13/370,139, the subject matter of which is incorporated herein by reference. With respect now to FIGS. 35 and 36, the mechanical coupling between engine 600 and pump 554 will be described in greater detail.

Figure 35:
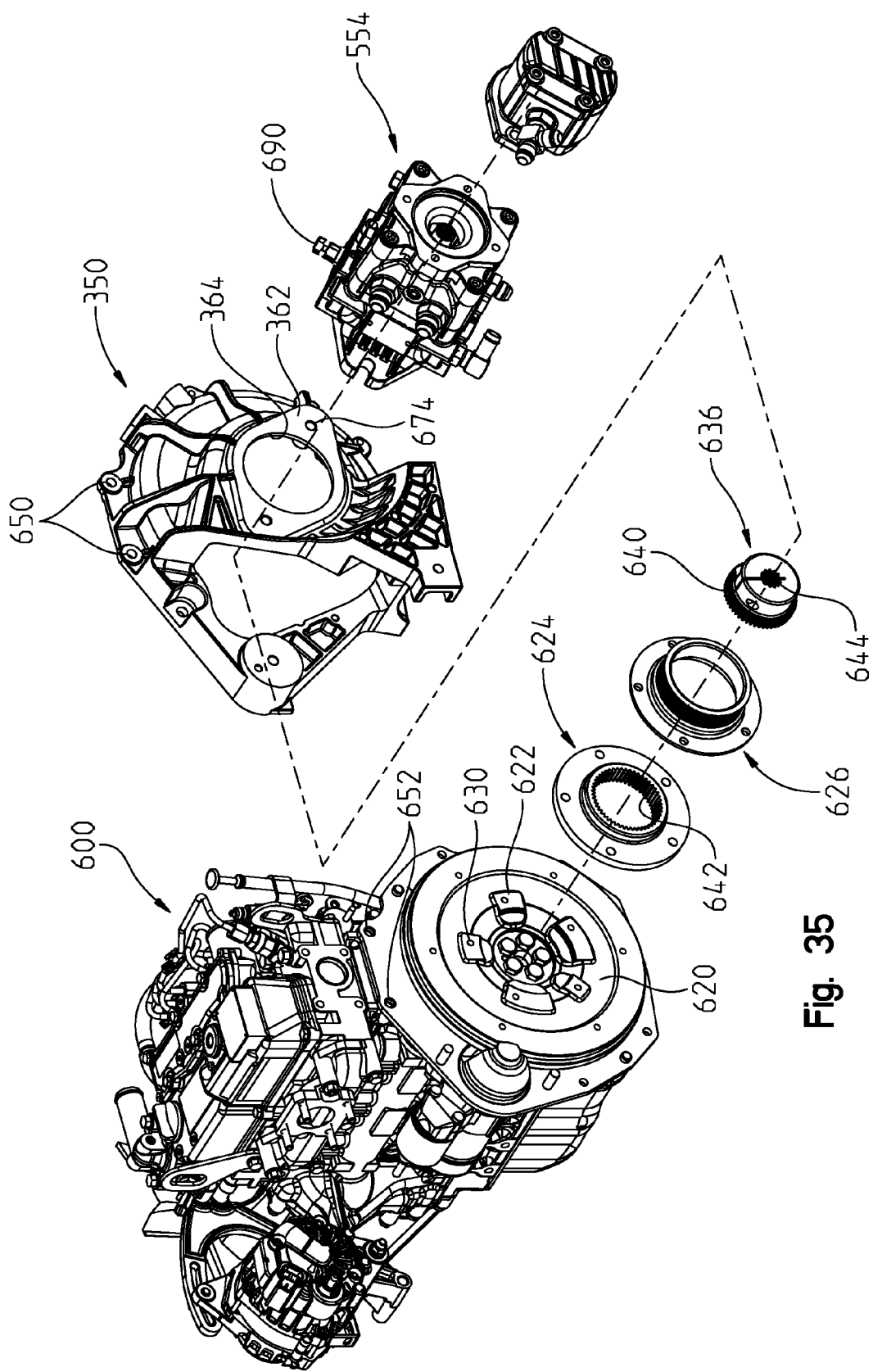
FIG. 35 is a front left exploded view of the engine and hydraulic pump.
Figure 36:
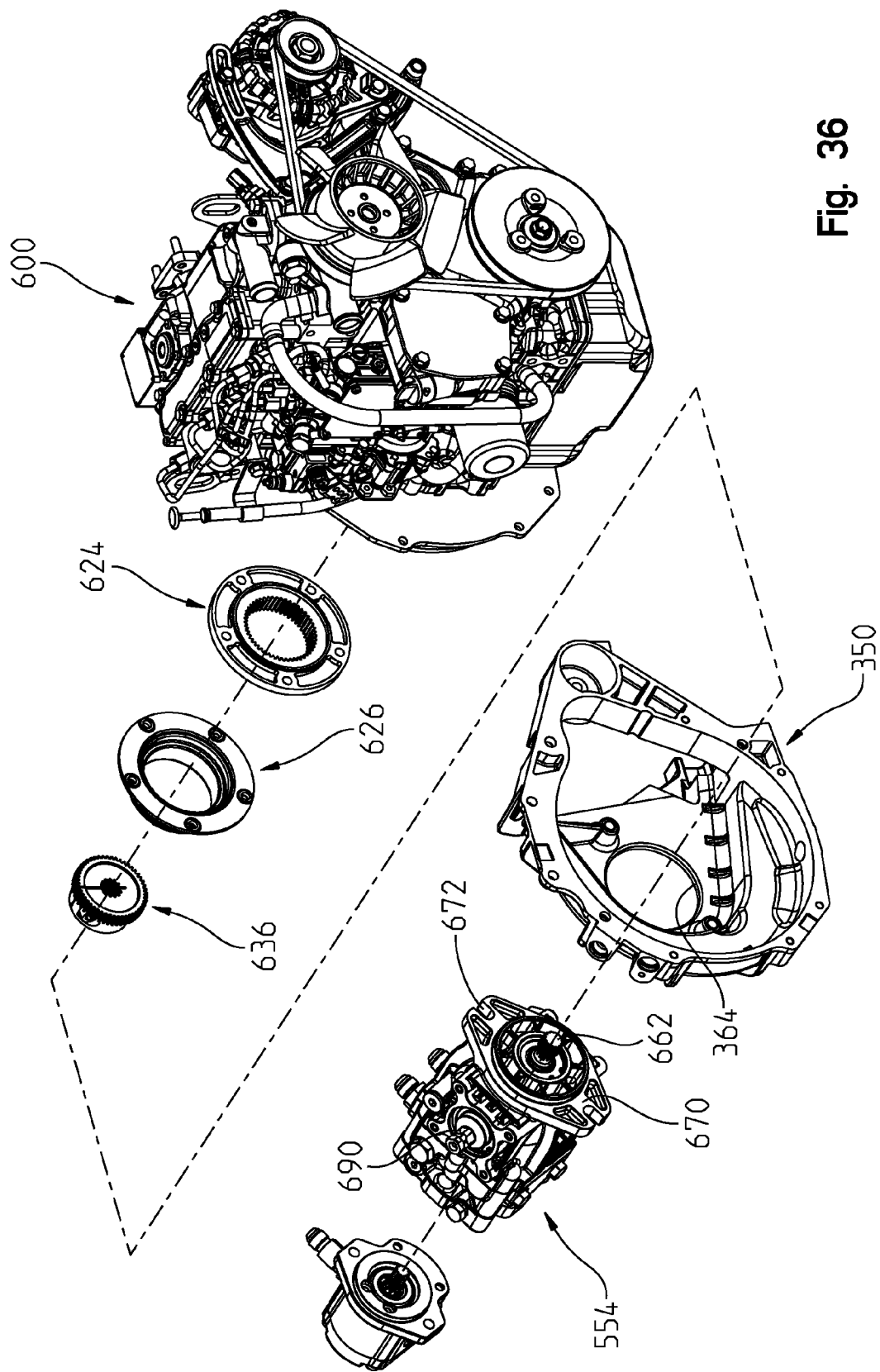
FIG. 36 is a rear right perspective view of the engine and hydraulic pump.

As shown in FIG. 35, engine 600 has a flywheel 620 on which weighted lands 622 are provided. Flange 624 is directly mounted to the lands 622 with flange 626 overlying flange 624. It should be appreciated that the flanges 624 and 626 are coupled to flywheel 620 by way of fasteners (not shown) through threaded apertures 630 in the weighted lands. It should also be appreciated that a splined coupling 636 interconnects the engine and hydraulic pump 554. Coupling 636 has external teeth 640 which couple with internal teeth 642 on flange 624. Coupling 636 further includes internal splines 644 that couple with pump 554 as described herein.

Bell housing 350 is positioned over the end of engine 600, for example by way of fasteners through apertures 650 of bell housing 350 and apertures 652 of engine 600. It should be appreciated that bell housing 350 is configured such that splined opening 644 is centered with aperture 364 of bell housing 350 and bell housing 350 defines a flat flange surface 660 around aperture 364. As shown best in FIG. 36, hydraulic pump 554 includes a splined input shaft at 662 which couples with internal splined coupling 644 (FIG. 35).

Hydraulic pump 554 also includes a flat flanged surface at 670 corresponding to surface 362 (FIG. 35) and can be held in place by way of fasteners through slots 672 of pump 554 and into threaded openings 674 (FIG. 35) of bell housing 350. In the preferred embodiment of the disclosure, hydraulic pump 554 is a swashplate variable displacement hydraulic pump and the input to pump 554 to vary the swashplate angle is by way of shaft 690.

Figure 37:
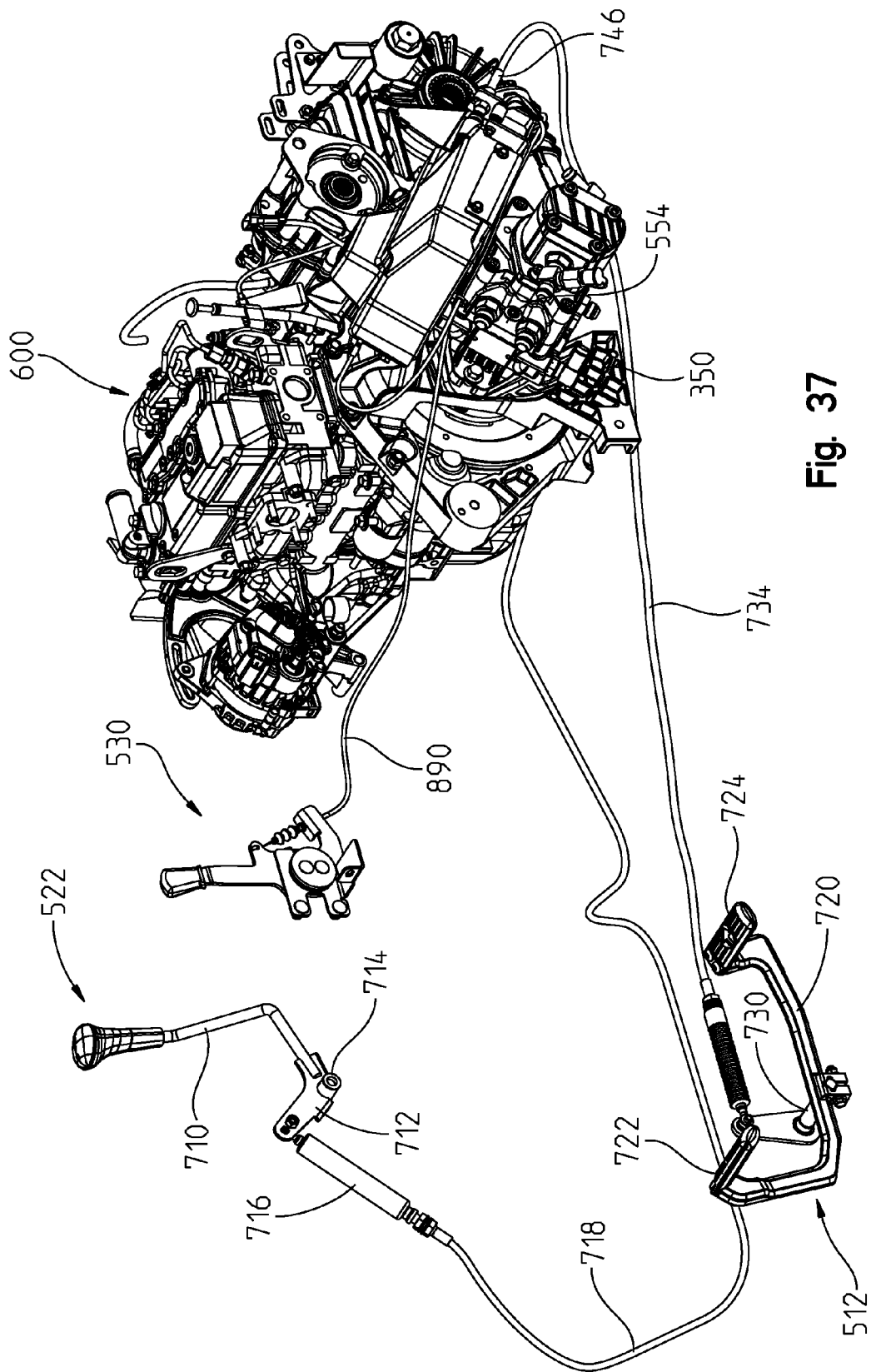
FIG. 37 is a front left perspective view of the drive control mechanism for the vehicle.
Figure 38:
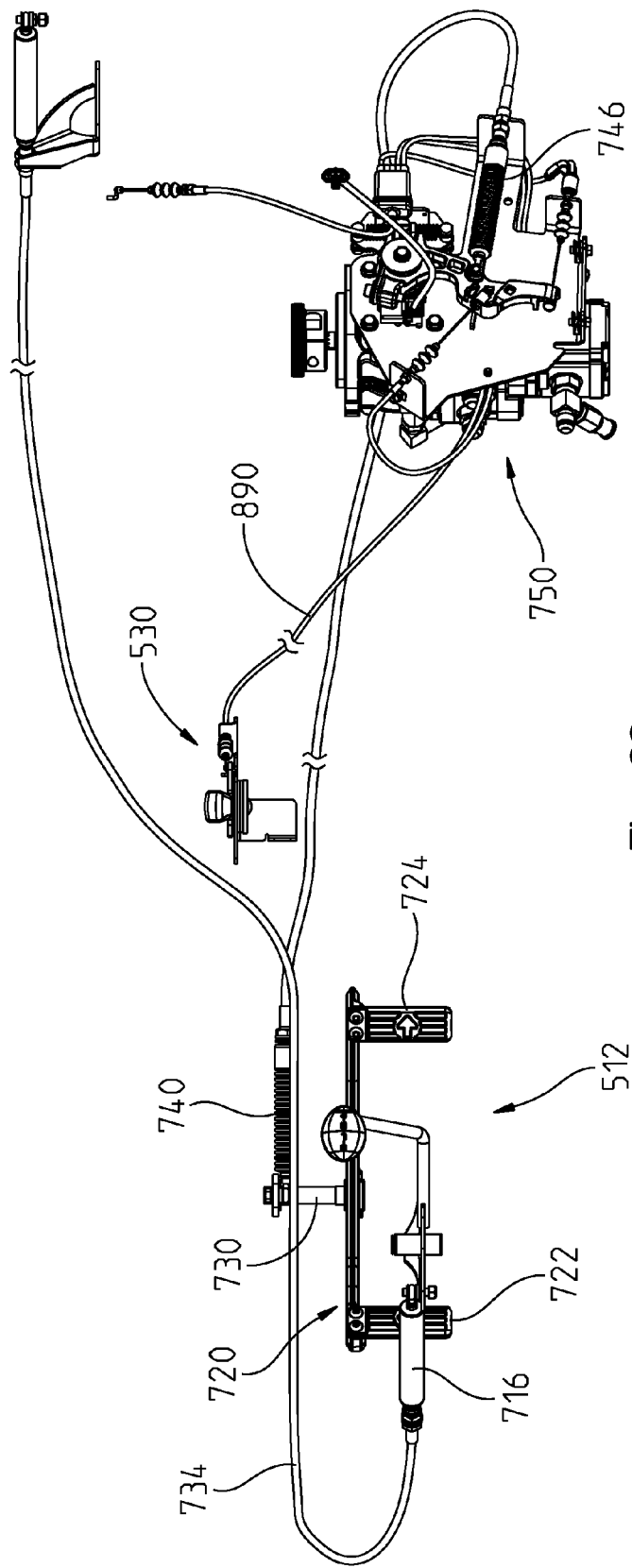
FIG. 38 shows a top perspective view of the drive control mechanism of FIG. 37 less the engine.

With reference now to FIGS. 37 thru 44, the vehicle speed and directional controls will be described in greater detail. With reference first to FIG. 37, shift mechanism 522 includes a shift lever 710 coupled to a link arm 712 pinned at 714 thereby operating push pull actuator 716 through cable 718. Cable 718 is coupled to second push pull actuator 719 (FIGS. 30 and 33), which is coupled to the transmission shifter. This is similar in design to the shift mechanism described in Applicants' prior application Ser. Nos. 13/370,139.

Figure 39:
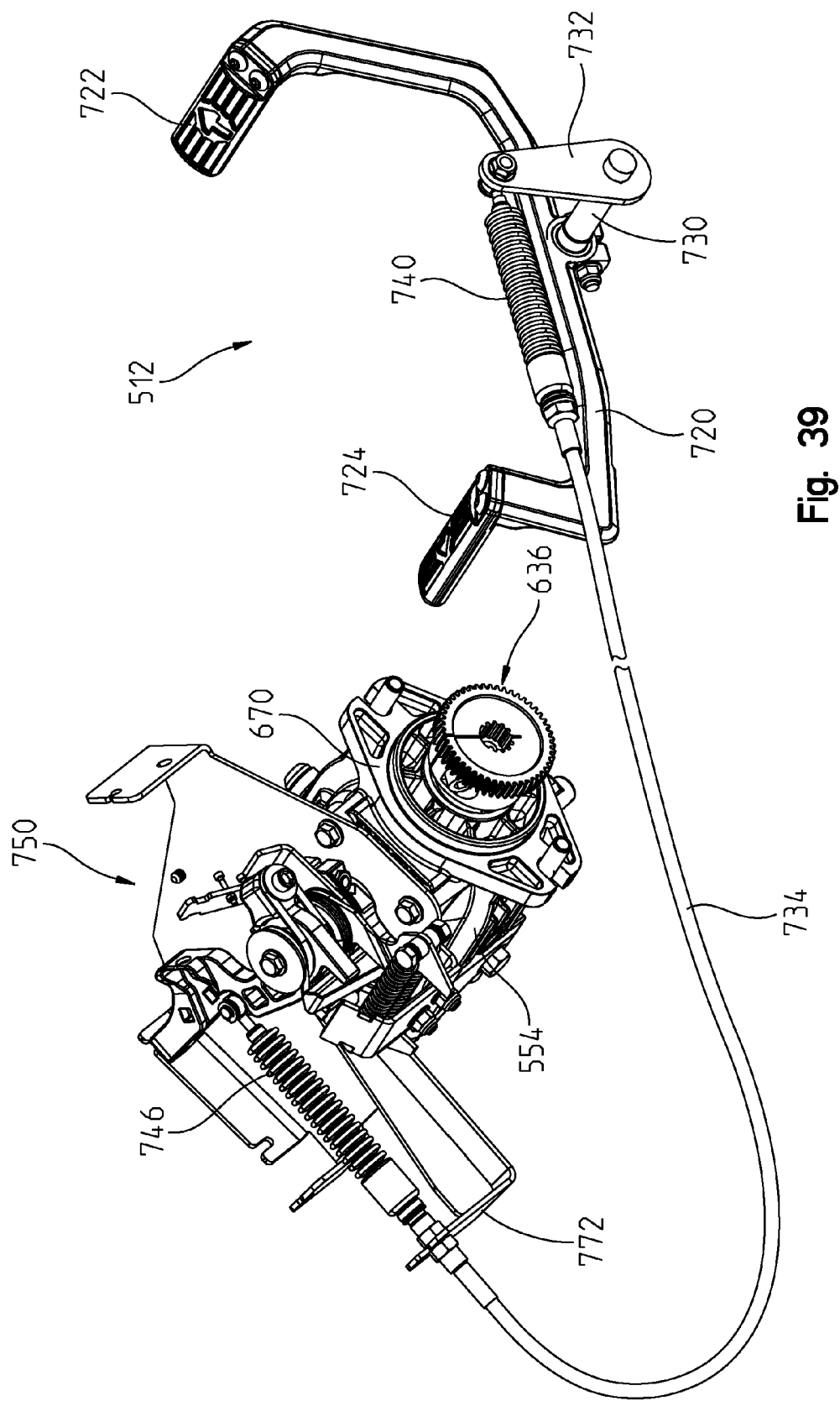
FIG. 39 is a rear right perspective view of the drive control mechanism of FIG. 38.
Figure 40:
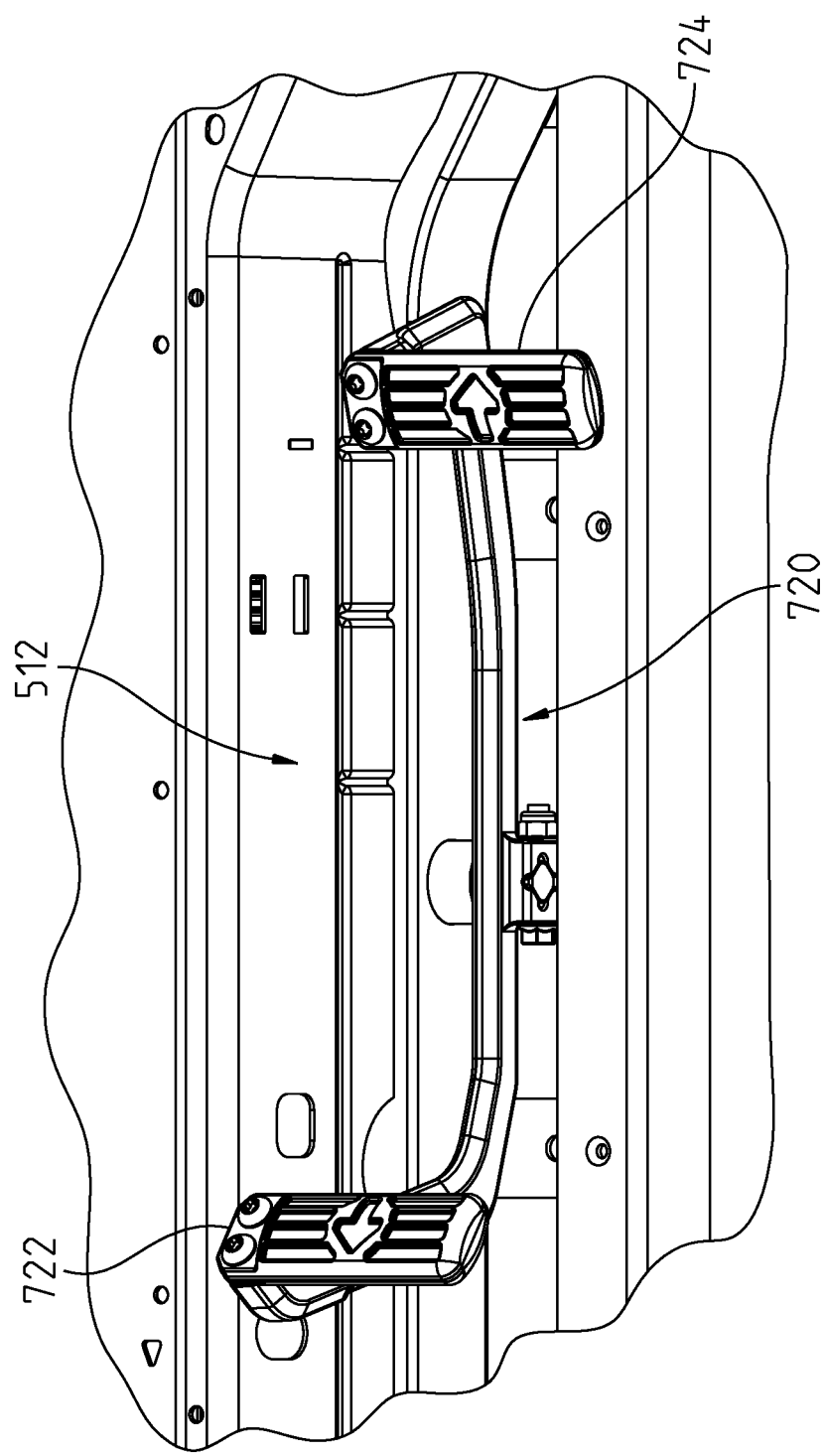
FIG. 40 shows an enlarged view of the treadle pedal attached to the frame.
Figure 41:
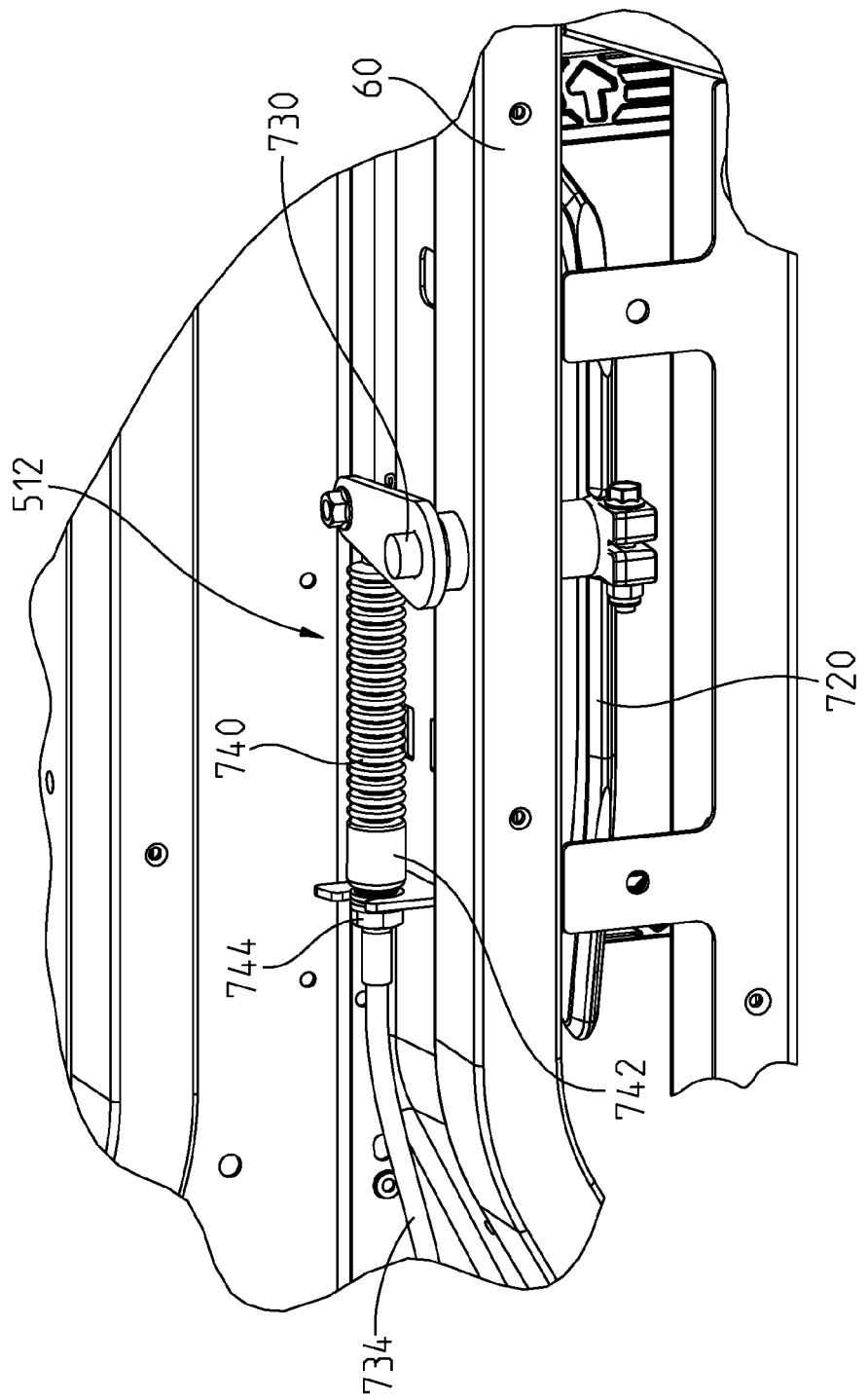
FIG. 41 shows an underside perspective view of the treadle pedal attached to the frame.
Figure 42:
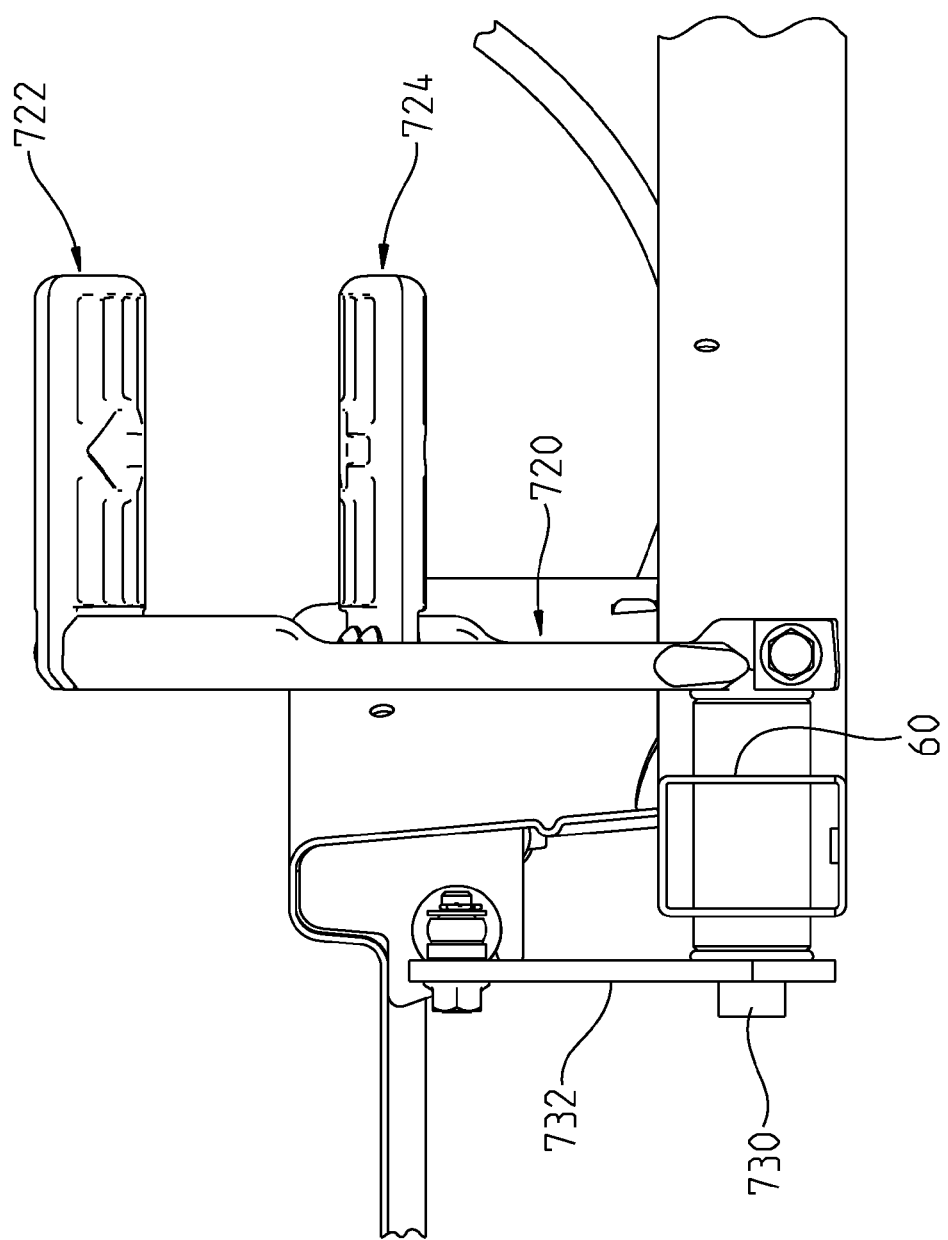
FIG. 42 shows a rear view of the treadle pedal as attached to the frame.
Figure 43:
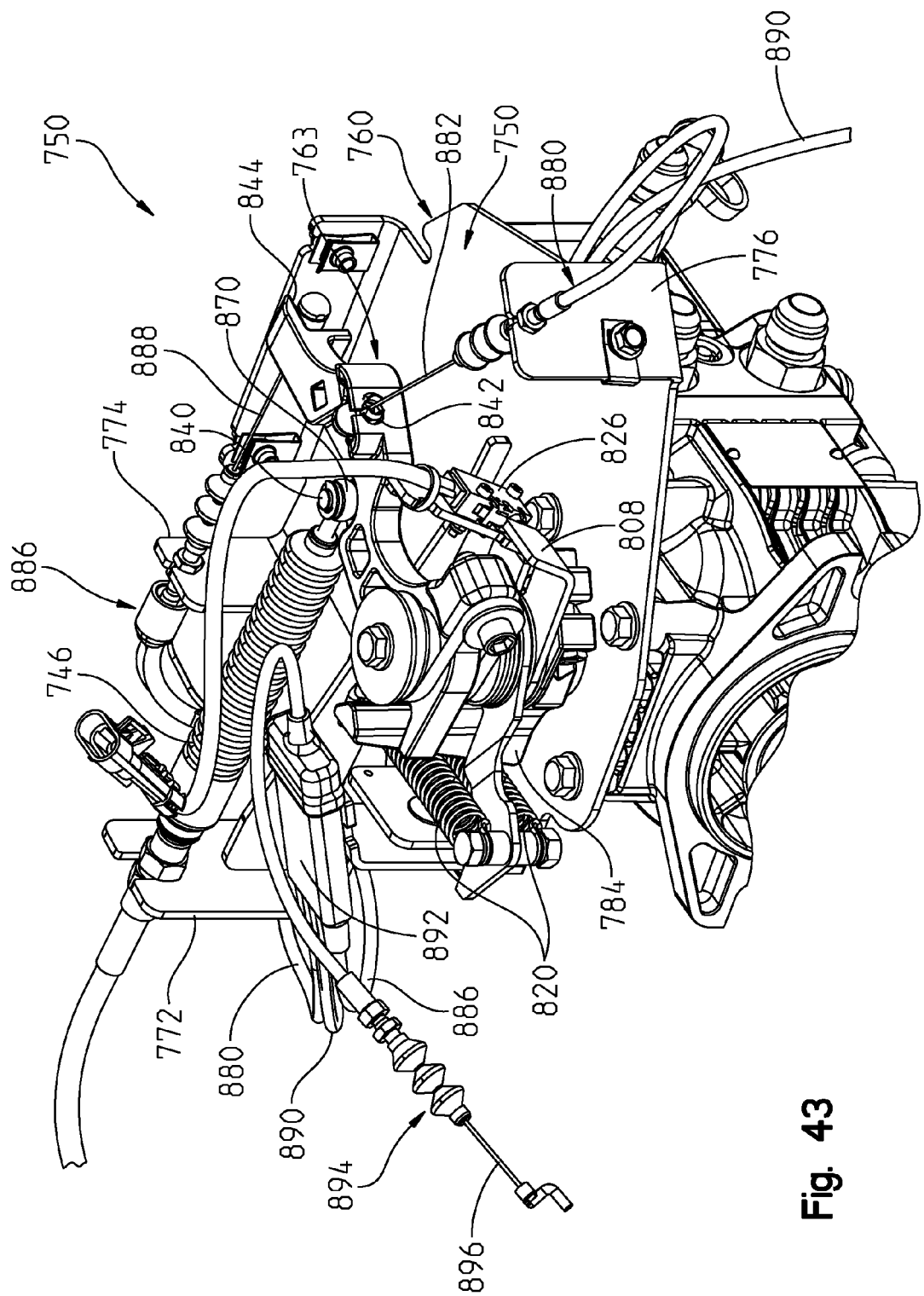
FIG. 43 shows a front right perspective view of the control mechanism for the hydraulic pump.
Figure 44:
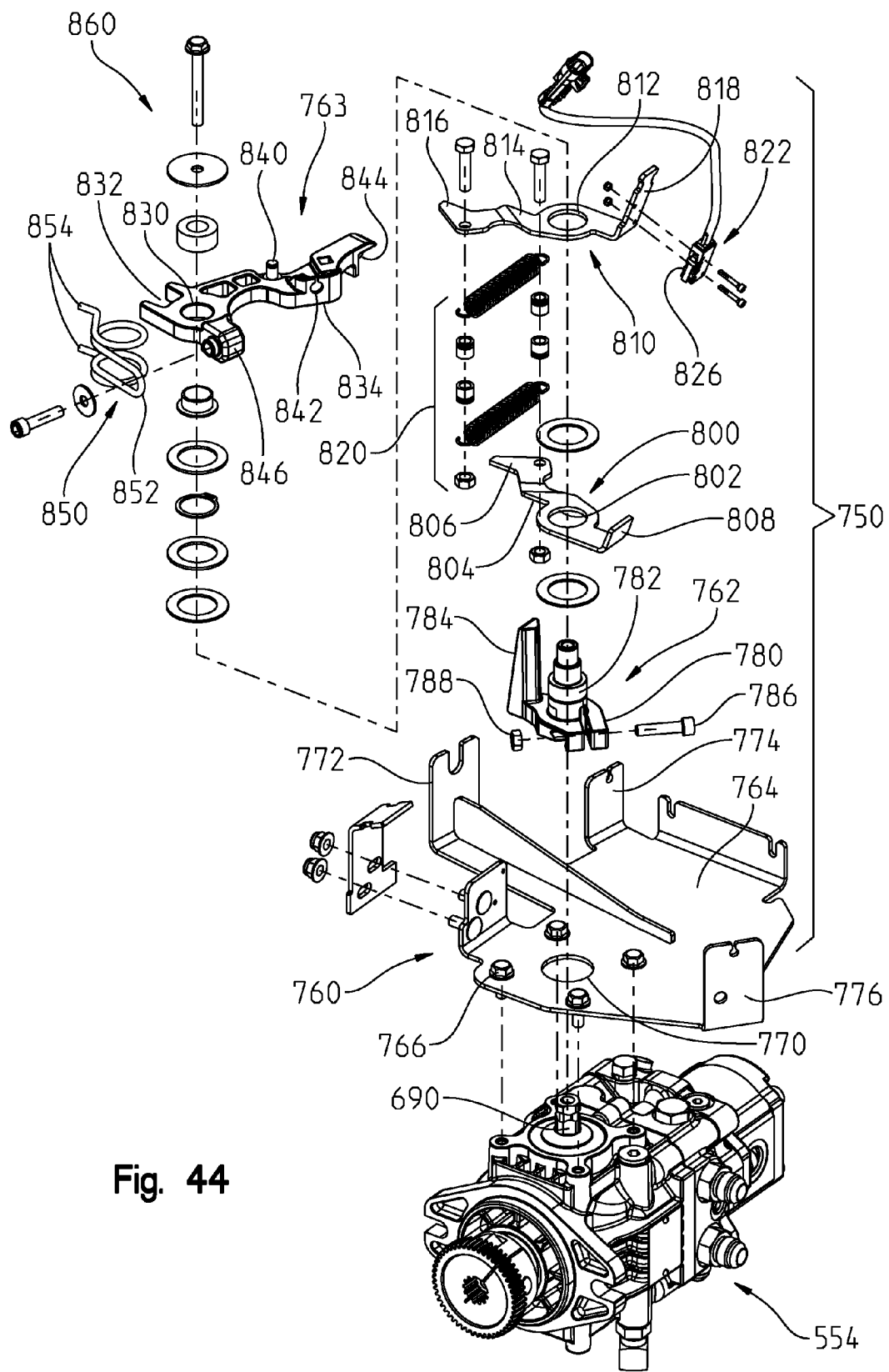
FIG. 44 shows an exploded view of the control mechanism shown in FIG. 43.

As shown in FIG. 37, vehicle speed controller 512 is shown as comprised of a treadle pedal 720 having a front foot pedal 722 and a rear heel pedal 724. Treadle pedal 720 is profiled to simultaneously receive the heel of a driver's foot on pedal portion 724 and the front portion of the operator's foot on portion 722. Treadle pedal 720 rotates around pin 730 and includes a lever 732 (FIG. 39) coupled to push pull cable 734. As shown in FIG. 42, treadle pedal 720 is coupled to frame rail 62 with pin 730 extending there through. Controller 512 further includes a push pull actuator 740 (FIG. 39) which is fixed at its end 742 (FIG. 41) by way of a lock nut 744, thus treadle pedal may operate in clockwise or counterclockwise directions of pin 730 moving a wire within cable 734 in either direction. As also shown in FIG. 39, cable 734 is operatively connected to a second push pull actuator 746, which is coupled to a pump swashplate controller 750. With reference now to FIGS. 43 and 44, swashplate controller 750 will be described in greater detail.

As shown in FIGS. 43 and 44, controller 750 generally includes a bracket 760, fitted post 762 and control lever 763. As shown, bracket includes a flat plate 764 fastened to the top of hydraulic pump 554 by way of fasteners 766 allowing the pump shaft 690 to protrude through an aperture 770 of bracket 760. Bracket 760 further includes upstanding wall 772 for attachment of push pull actuator 746; and upstanding walls 774 and 776 for attachment to Bowden cables as described herein. As shown in FIG. 44, fitted post 762 includes a clamp portion 780, post 782, and upstanding leg 784. It should be appreciated that fitted post 762 has an internal opening having a shape complementary with shaft 690, such that fitted post 762 may be slidably received over, and fixedly retained to shaft 690 by way of fasteners 786, 788, fixing clamp 780 to shaft 690. Thus a rotation of fitted post 762 rotates shaft 690 of pump 554 as well as internal swashplate in pump 554.

Controller 750 further includes a lower limit plate 800 having an aperture at 802 slidably receivable over post 782. Limiter 800 has an edge 804 that may contact upstanding leg 784 and an extension portion 806. A contact 808 arm is provided on the opposite side, as further described below. Actuator 750 also includes an upper limiter 810 having an aperture at 812, edge 114 for positioning on the opposite side of upstanding leg and an extension portion 816. Upstanding leg 818 is positioned on the opposite side. Extension portions 806 and 816 are spring loadably connected together by way of tension springs 820 connected between respective extension portions 806, 816 (FIG. 43). A limit switch 822 is attached to upstanding leg 818 whereby a limit switch contact 826 may be contacted by contact arm 808 as a speed limiter.

Meanwhile lever 763 has an aperture at 830 receivable over post 782 and a notch 832 is receivable over upstanding leg 784. Lever 763 includes a lever arm 834. Lever arm 834 includes a first connection point 840 for attachment of second push pull actuator 746 (FIG. 43) and connection points 842 and 844 as described herein. Torsion spring 850 may be positioned over aperture 830 with a first spring leg 852 attached to extension 846 and spring leg portions 854 positioned on opposite sides of upstanding leg portion 784 as best shown in FIG. 43. Finally, fastener 860 may be positioned through lever 763, limiters 800, 810 and fitted post 762 to retain the assembly to pump 554.

As best shown in FIG. 43, second push pull actuator 746 is shown attached to upstanding wall 772 with a cable end 870 positioned over connection point 840 of lever arm 763. A first Bowden cable 880 is fixed to upstanding wall 776 with a cable 882 fixed at connection point 842 of lever 763 and a second Bowden cable 886 having a second cable 888 is fixed at connection point 844 of lever 763. A third Bowden cable 890 (See FIG. 37) is attached to manual throttle 530 at a first end and hinges to a throttle linkage 892 at the opposite end. Thus Bowden cables 880, 886, and 890 act as an input while a Bowden cable 894 acts as an output with actuating wire 896 connected to the engine throttle.

Thus the engine throttle can be operated in two separate modes: wherein in a first mode the operator actuates the treadle pedal 720 (See FIG. 37) which operates second actuator 746 pushing or pulling lever 763. Rotating lever 763 changes the swashplate angle of pump 554, however, does not in and of itself change the throttle, that is the engine speed, of engine 600. However, Bowden cables 880 and 886 are also fixed to lever 763 such that in one instance, one of the cables 880 and 886 is pulled and in the other rotational sense, the other of the cables 880, 886 is pulled. Said differently, if cable end 870 of actuator 746 is pushed, the Bowden cable wire 888 is also pulled, and if cable end 870 is pulled, the Bowden cable wire 882 is also pulled. In either case, the Bowden cable 896 is appropriately moved, which adjusts the throttle position in synchronization with the swashplate angle.

Thus moving the treadle pedal 720 causes a change to both the swashplate angle as well as the throttle position. However, the actuator 750 also allows for a mode where the vehicle is not moving yet the engine speed needs to be increased to increase the pressure and or hydraulic oil flow for the implements 502. In this case, manual throttle 530 can be actuated, which actuates cable 890 (See FIGS. 37 and 43) which again actuates Bowden cable 894 and increases the throttle position.

Thus, it should be appreciated that depression of the foot pedal portion 722 causes the vehicle to proceed forward and depression of the pedal portion 724 causes the vehicle to proceed in reverse. The further pedals 722, 722 are depressed, the faster the vehicle proceeds, limited by the control mechanism 750. Also due to the hydrostatic transmission, the vehicle may toggle between forward and reverse without stopping or clutching. The only control function provided is due to the four wheel drive deactivation which is described herein. In an alternative embodiment, the swashplate of pump 554 may be controlled electronically with a drive-by-wire system.

Figure 45:
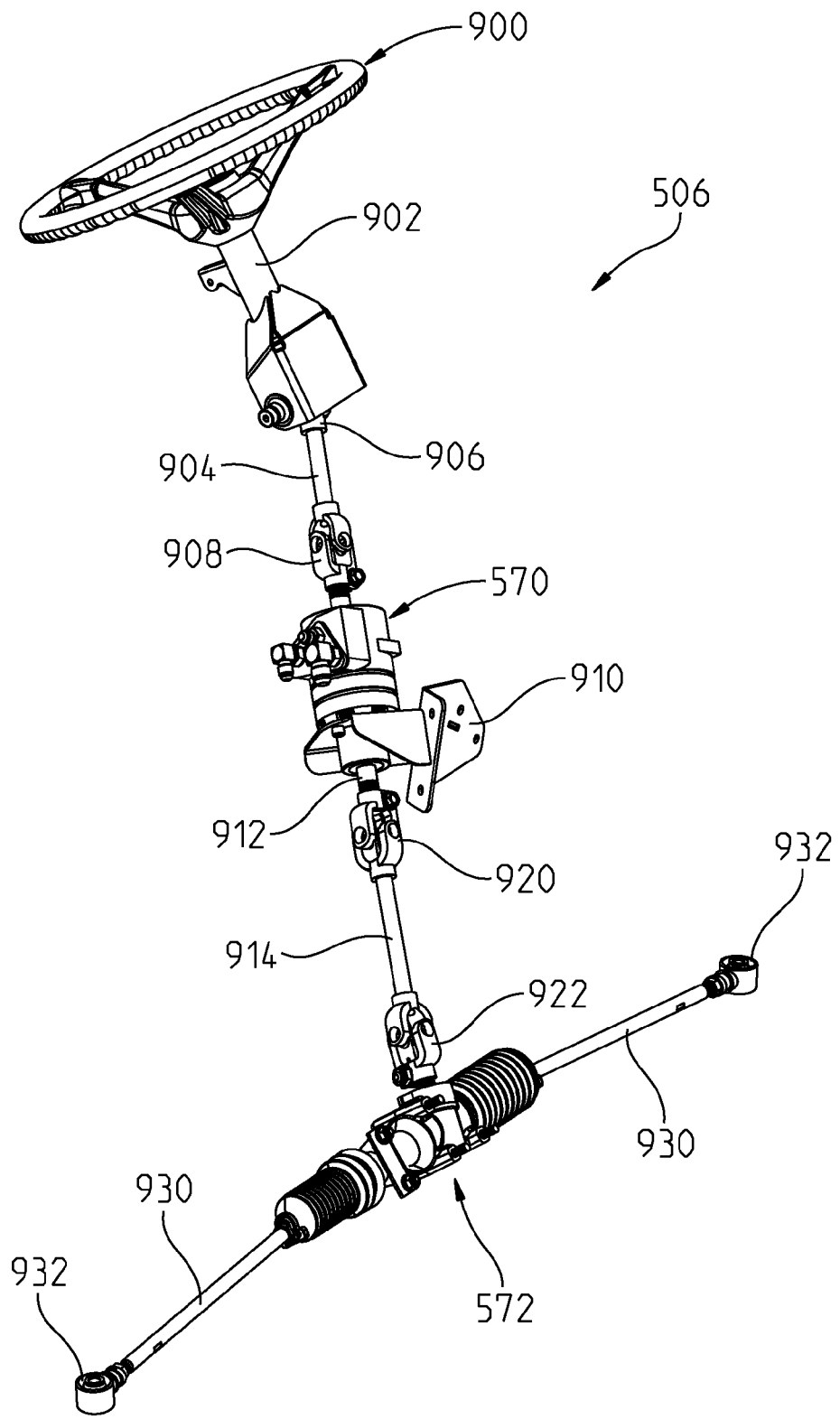
FIG. 45 shows a perspective view of the hydraulic steering system of the present disclosure.
Figure 46:
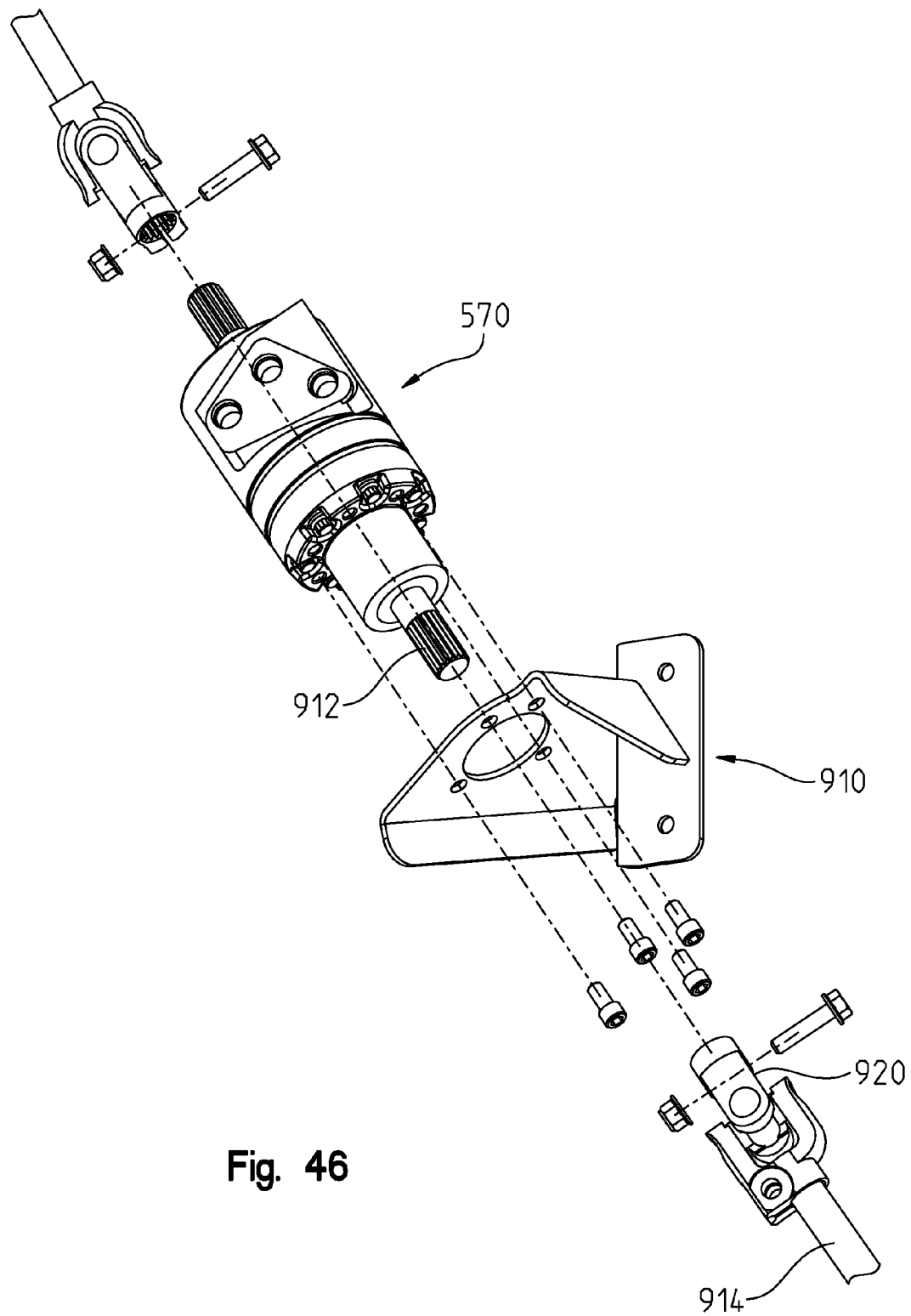
FIG. 46 shows an enlarged and exploded view of the hydraulic steering gear.

With reference now to FIGS. 45 and 46, steering system 506 will be shown in greater detail. As shown in FIG. 45, steering system 506 further includes a steering wheel 900 attached to a first shaft 902 coupled to second shaft 904 by way of universal joint 906, and which is coupled to hydraulic motor 570 by way of universal joint 908. Motor 570 is attached to frame by way of bracket 910 and output shaft 912 is fixed to steering gear 572 by way of shaft 914 through universal joints 920 and 922. Steering gear 572 includes steering arms 930 having ball joints 932 attached to complementary joints on front wheel spindles for steering as in known in the art. As mentioned previously, and with reference again to FIG. 31, hydraulic system 500 includes an electric hydraulic valve at 574, which can be operated to provide hydraulic fluid flow to hydraulic motor 570 by power steering system 506.

Figure 47:
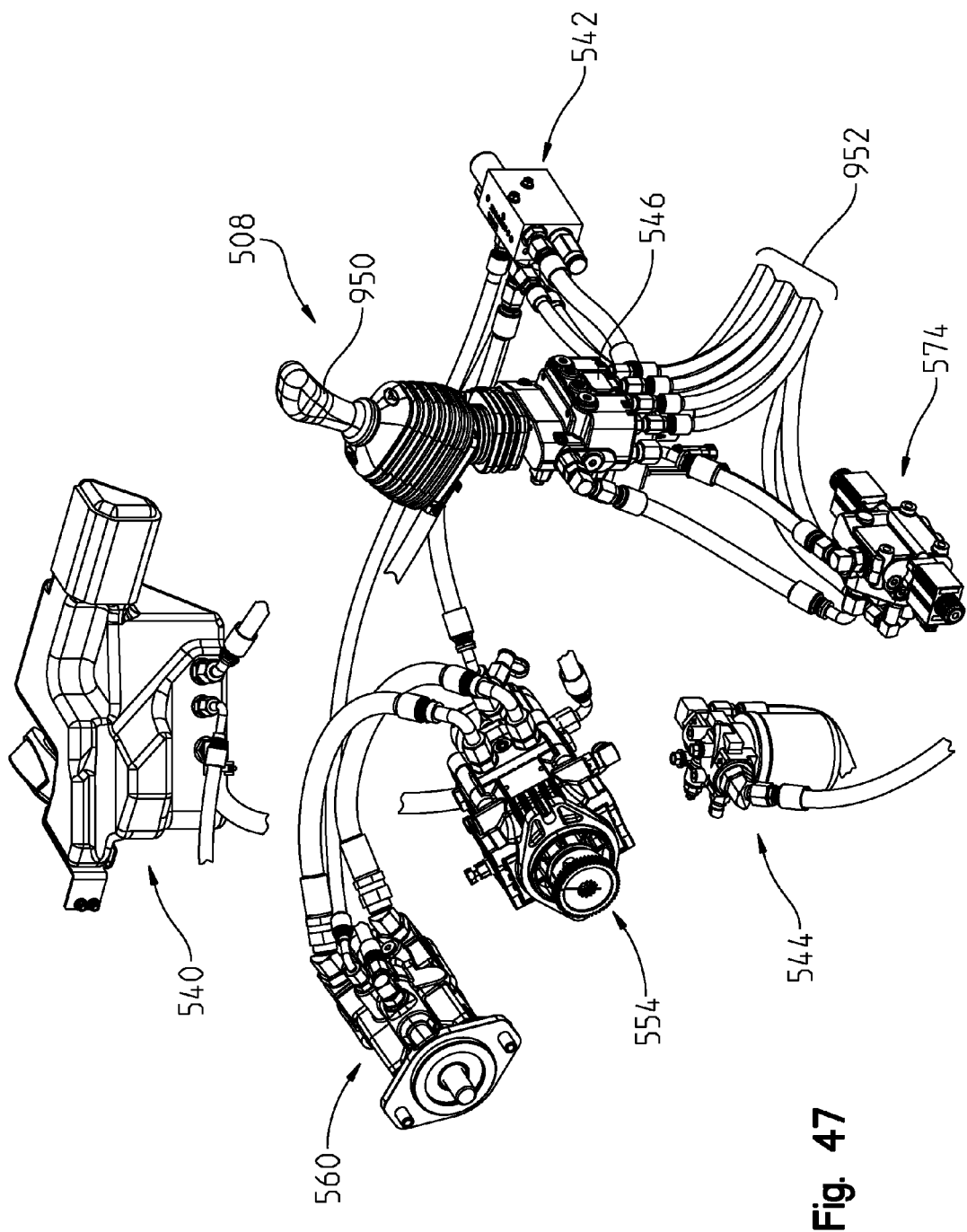
FIG. 47 shows a front right perspective view of the implement controls.

With respect now to FIG. 47, implement controls 508 may include a joy stick 950, which operates hydraulic pressure through lines 952 for operation of hydraulic cylinders such as 960 and 962 (FIGS. 30 and 31). Implement 502 (FIG. 30) may include uprights 970 fixed to frame 4 and to which hydraulic cylinder 960 is fixed at a top end thereof and to which link arm 980 is pinned at 982. Hydraulic cylinder 960 is also coupled to link arm 980 at 984. Link arm 980 is also coupled to bale 990 at 986. Thus, hydraulic cylinder 960 may control the lifting/lowering of link arm 980 while hydraulic cylinder 962 may control the rotation of the front bale 990. Thus, an implement attached to bale 990 may be lifted and rotated by cylinders 960, 962 under the influence of hydraulic pressure and as controlled by joy stick 950. In one embodiment, joystick 950 includes one or more switches that are operative to adjust the engine speed. As such, an operator may manipulate implement 502 with a single joystick 950.

Figure 48:
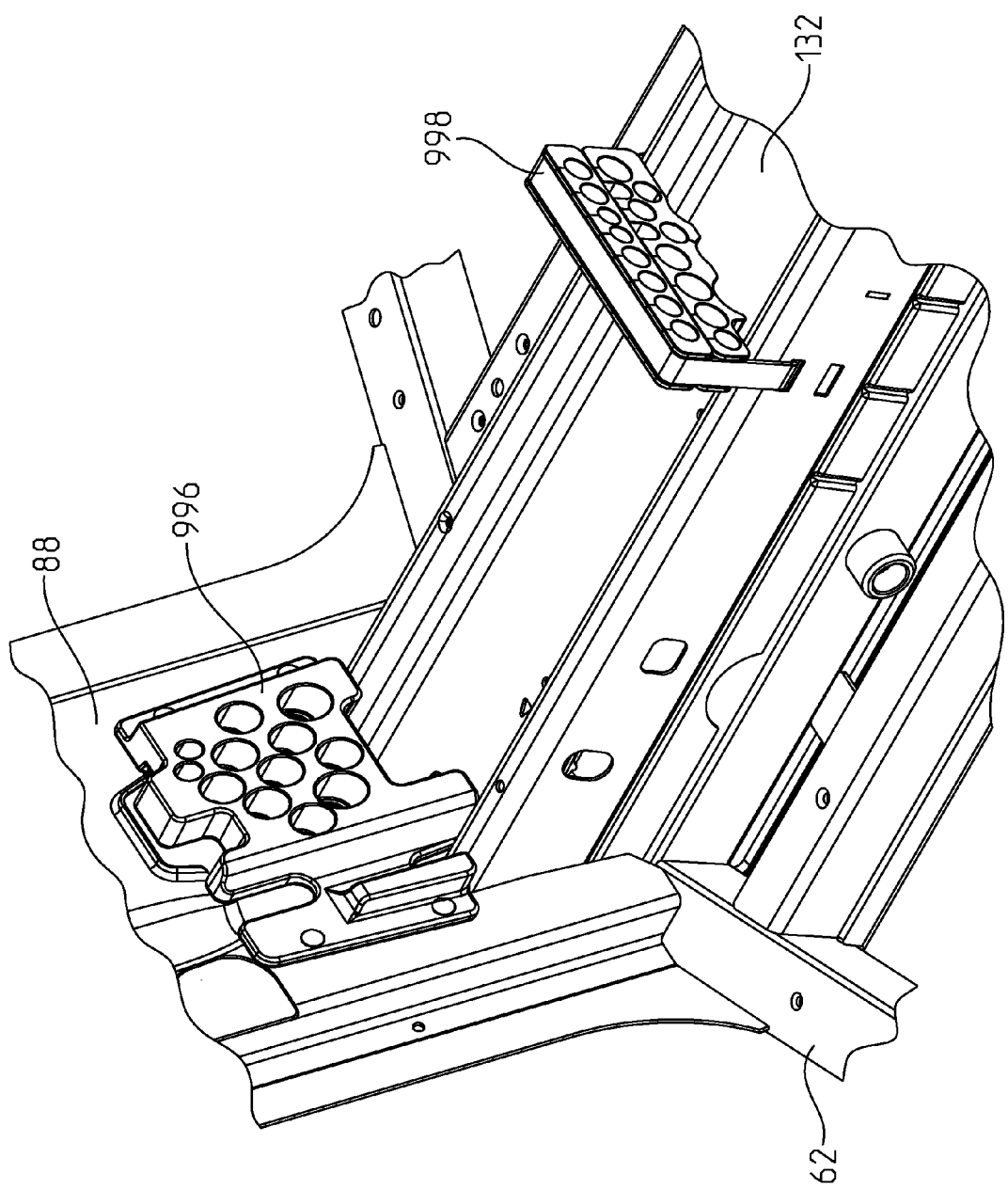
FIG. 48 shows hydraulic cable management grommets.

As shown in FIG. 48, a front grommet 996 is positioned adjacent to shear panel 88 and above tunnel member 132 and a rear grommet 998 is positioned on tunnel member 132 rearward of grommet 996 and forward of a seating area. These grommets provide positioning and vibration isolation of all hydraulic cables (FIG. 30) that were mentioned above.

Figure 49:
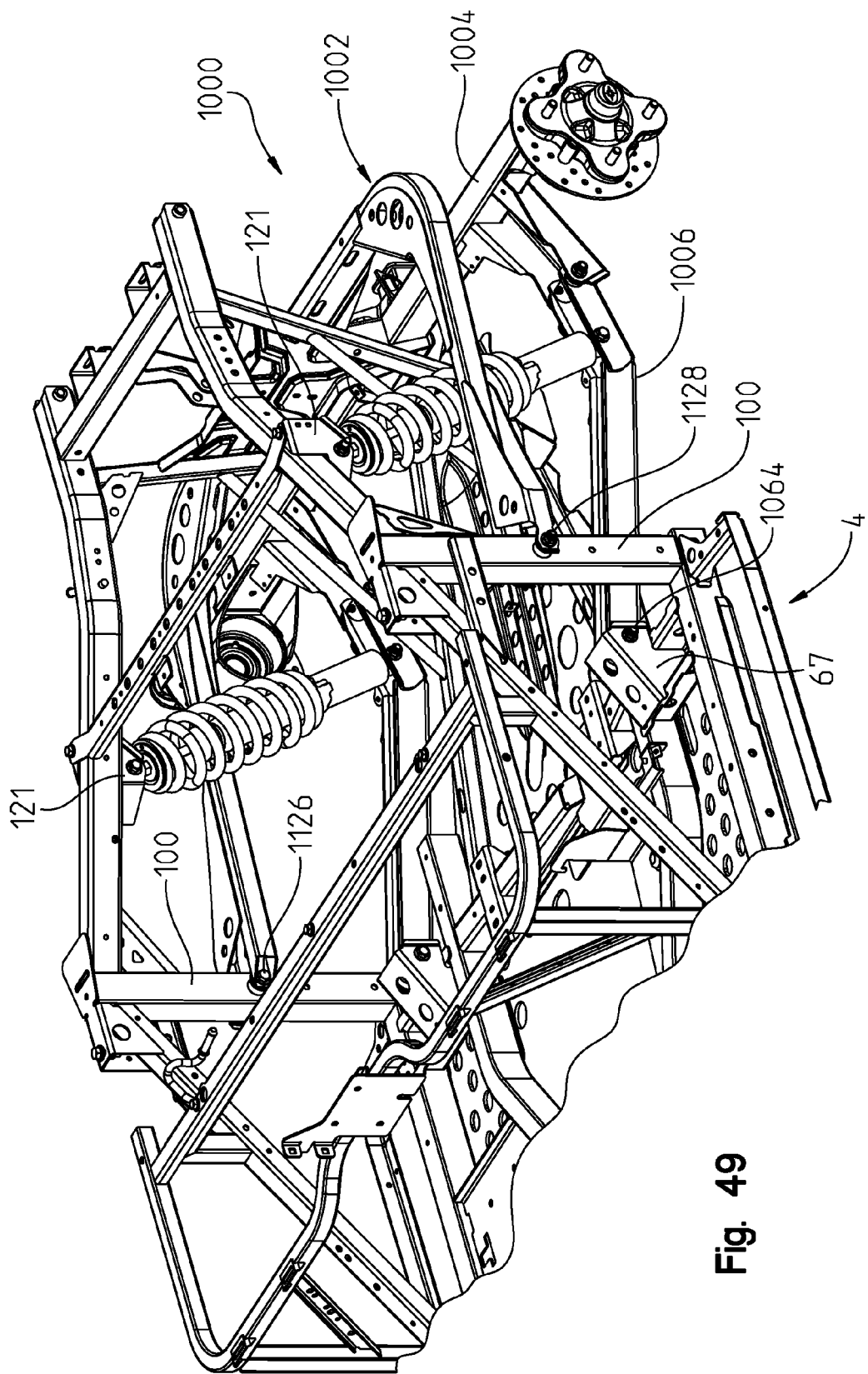
FIG. 49 shows a front left perspective view showing the vehicle rear suspension system.
Figure 50:
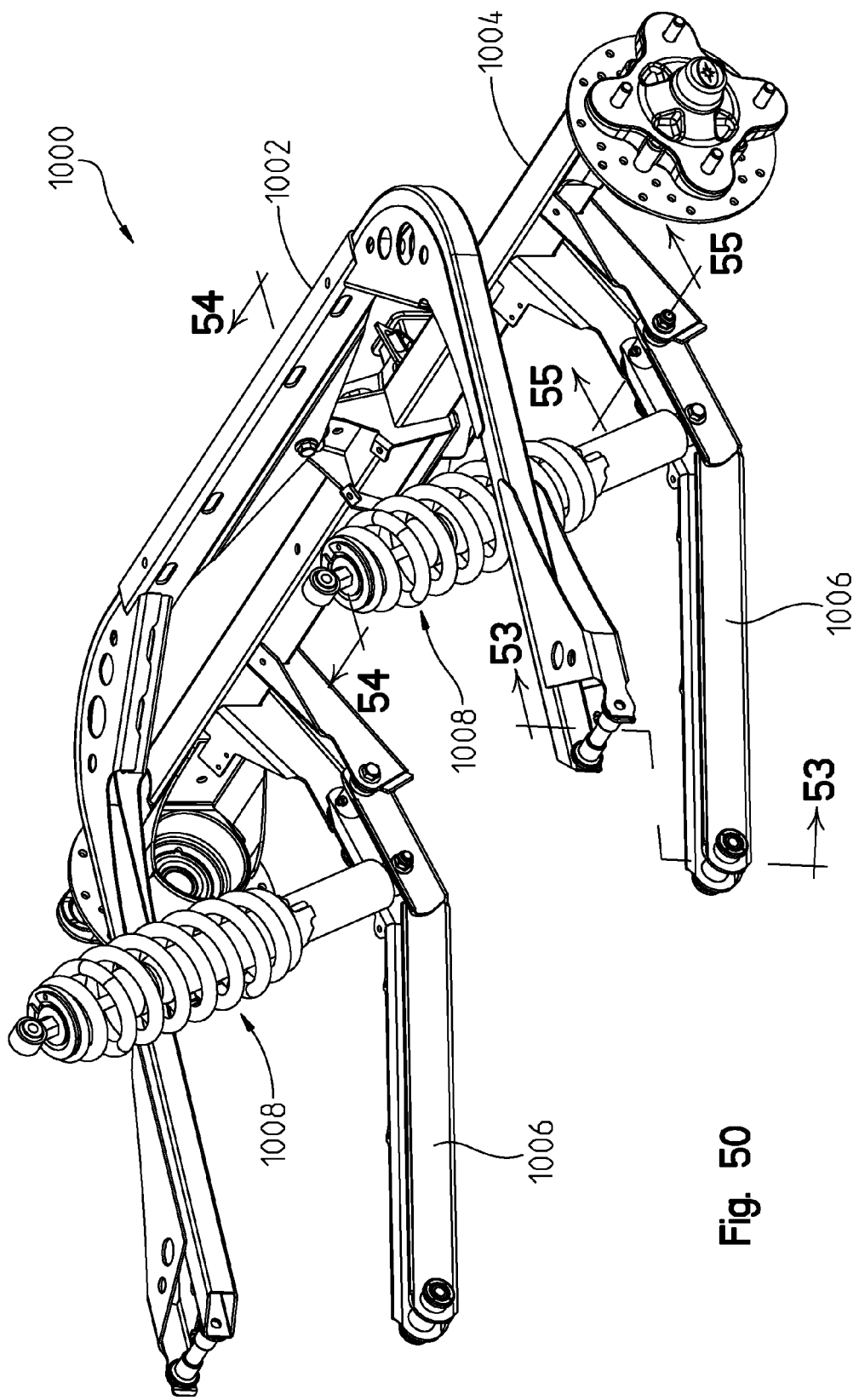
FIG. 50 shows a view similar to that of FIG. 49 showing the rear suspension system removed from the frame.
Figure 51:
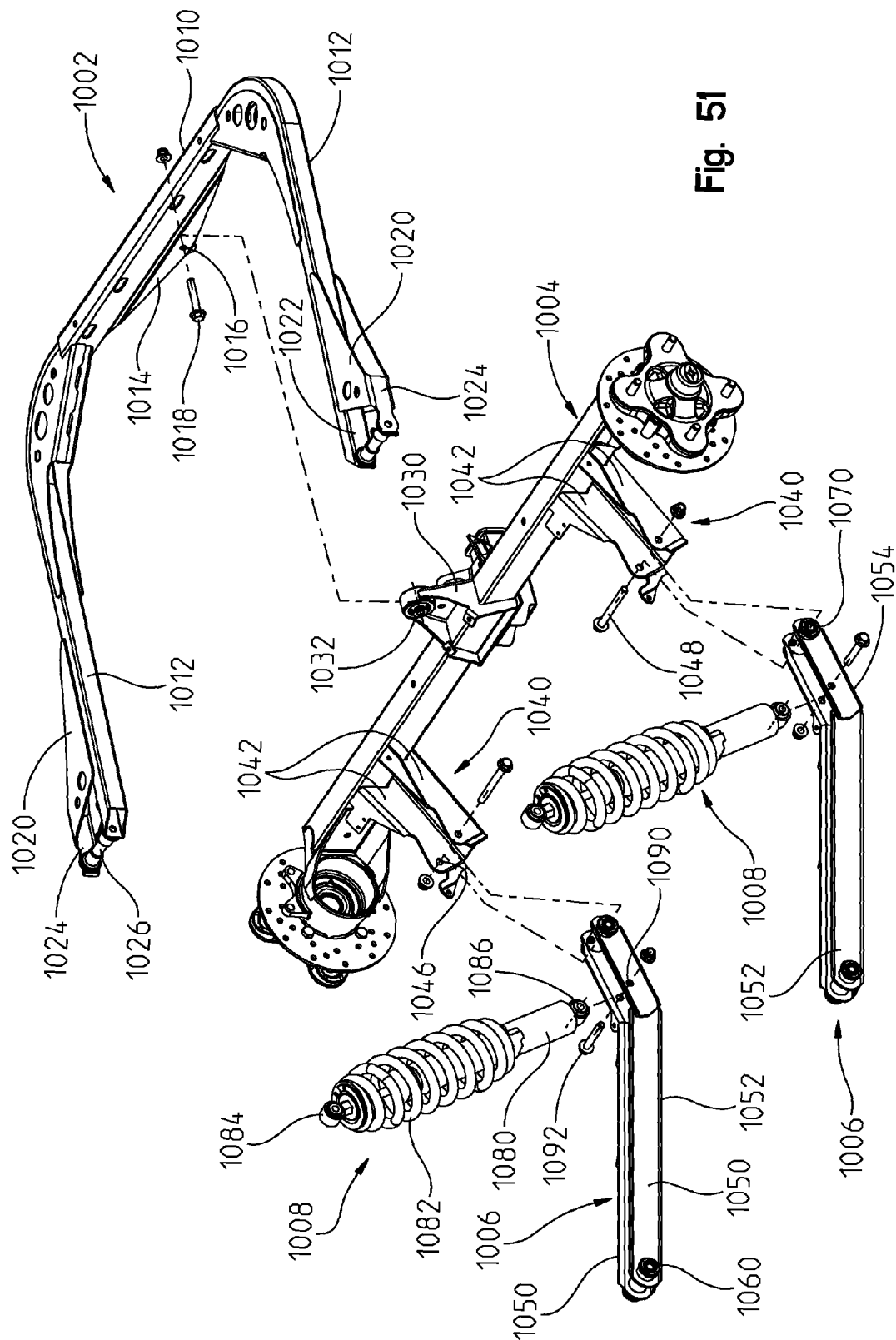
FIG. 51 shows an exploded view of the rear suspension system of FIG. 50.
Figure 52:
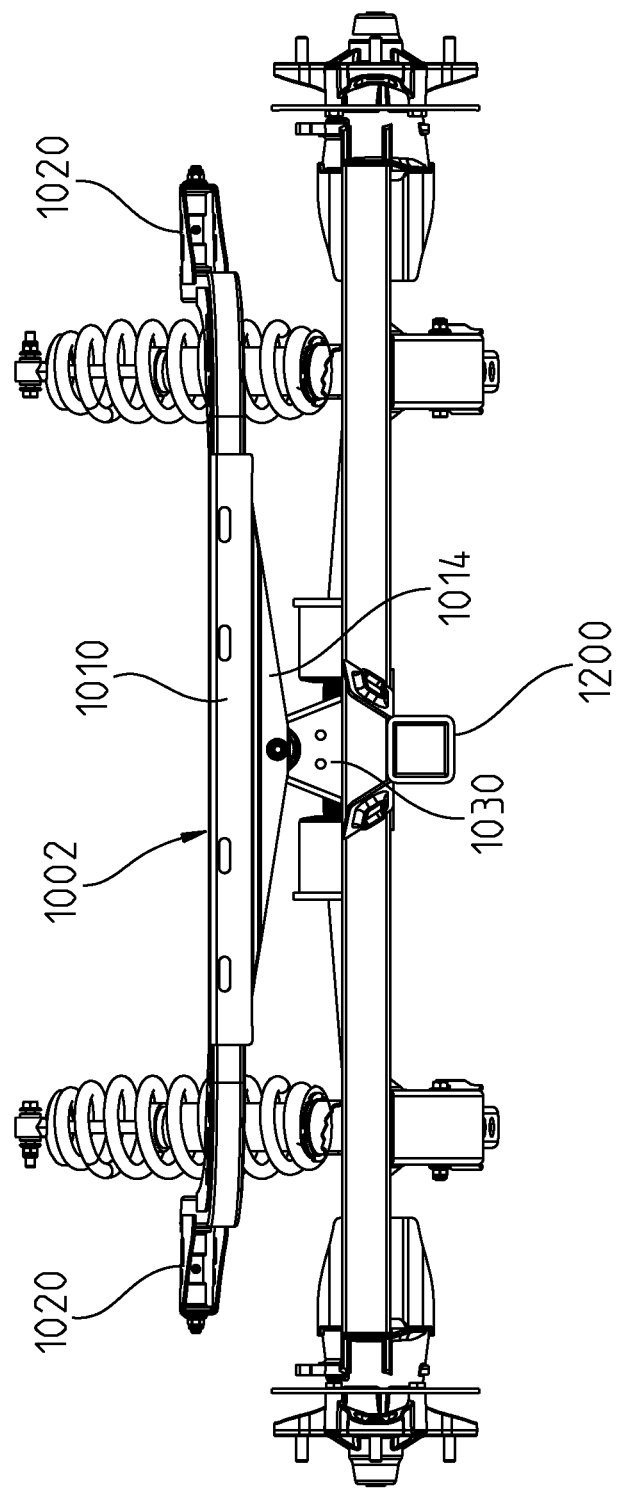
FIG. 52 shows a rear view of the rear suspension system of FIG. 50.

With reference now to FIG. 49, rear suspension is shown generally at 1000. As shown, suspension 1000 is attached to frame upright 100 and to frame brackets 67. With reference now FIG. 50, suspension 1000 is generally comprised of an upper U-shaped suspension member 1002, lower suspension member 1004, trailing arms 1006 and shock absorbers 1008. As shown in FIG. 51, U-shaped member 1002 includes a rear lateral extending portion 1010 and two forwardly extending arms 1012. Lateral portion 1010 includes lower extending pivot member 1014 having an aperture at 1016 profiled to receive fastener 1018 as described herein. Side arms 1012 include bracket arm portions 1020 thereby defining spaced apart arms 1022 and 1024 profiled to receive a sleeve assembly 1026 for attachment to frame uprights 100 as described above. FIG. 49 shows U-shaped suspension portion 1002 attached by fasteners 1126.

As shown in FIG. 51, lower rail 1004 includes a centrally located bracket 1030 having a bearing joint at 1032 positioned therein and profiled to be received within pivot member 1014 for pivotal attachment relative to U-shaped portion 1002. Lower suspension member 1004 further includes forwardly extending brackets 1040 defining a U-shaped channel having sidewalls 1042. Brackets 1040 include apertures at 1046 profiled to receive fasteners 1048 there through.

With reference still to FIG. 51, trailing arms 1006 are also defined in a U-shaped channel configuration defining sidewalls 1050 and further defining longitudinally extending portion 1052 and an angled portion 1054. Each of the trailing arms 1006 is provided with a sleeve assembly at 1060 for attachment to frame bracket 67 (FIG. 49) by way of fasteners at 1064. Trailing arms 1006 also include a sleeve assembly at 1070 profiled to be received through sidewalls 1042 of bracket 1040 and to receive fastener 1048 there through for attaching trailing arms 1006 to rear suspension member 1004. Meanwhile, shocks 1008 include a shock absorber portion 1080 and a coil spring at 1082 with an upper connection portion 1084 and a lower connection portion 1086. Upper connection portion 1084 may be attached to frame bracket 121 (FIG. 49) and lower attachment portion 1086 may be attached to apertures 1090 (FIG. 51) by way of fasteners 1092.

Figure 53:
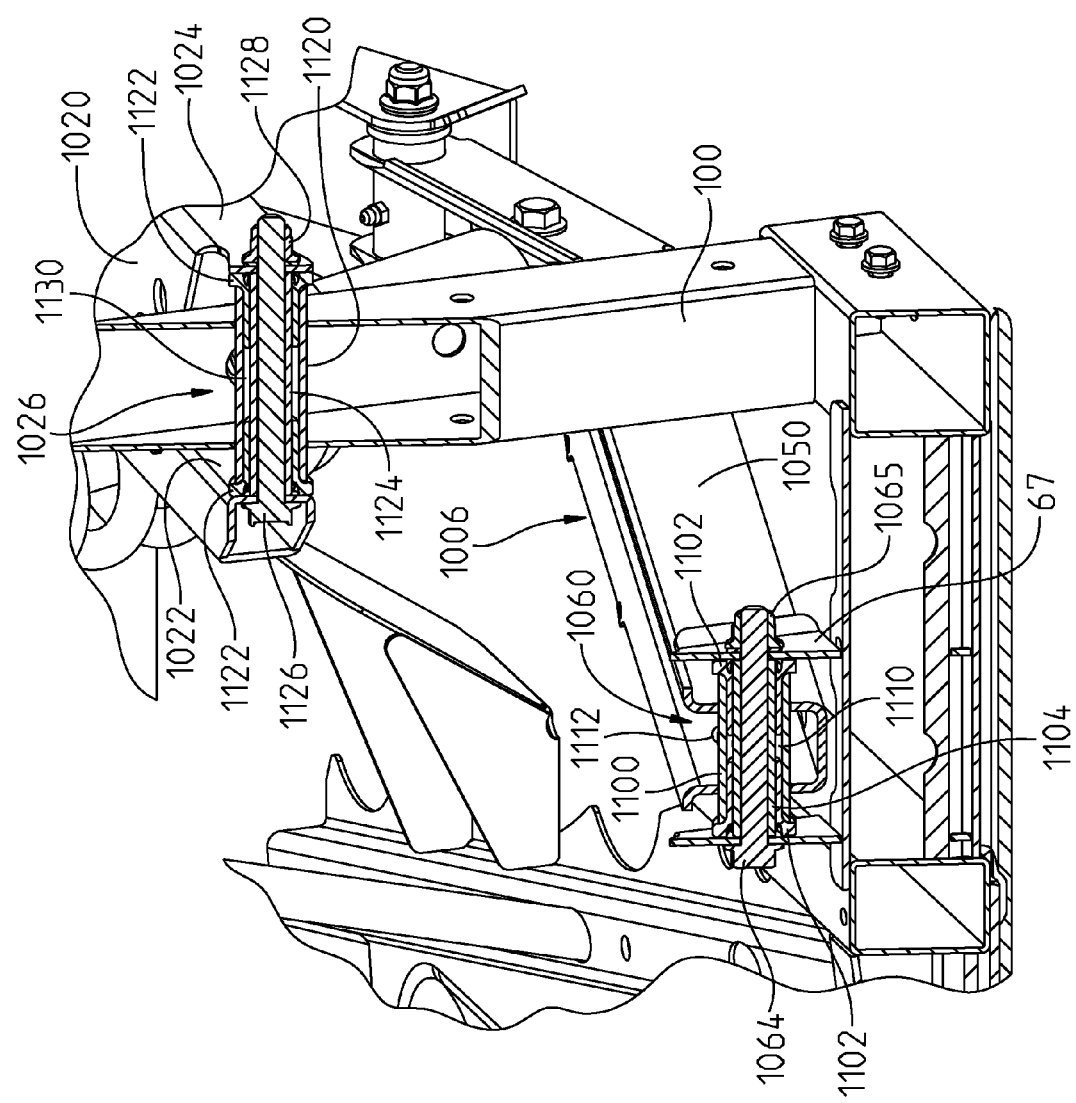
FIG. 53 is a cross-sectional view through lines 53-53 of FIG. 50.
Figure 54:
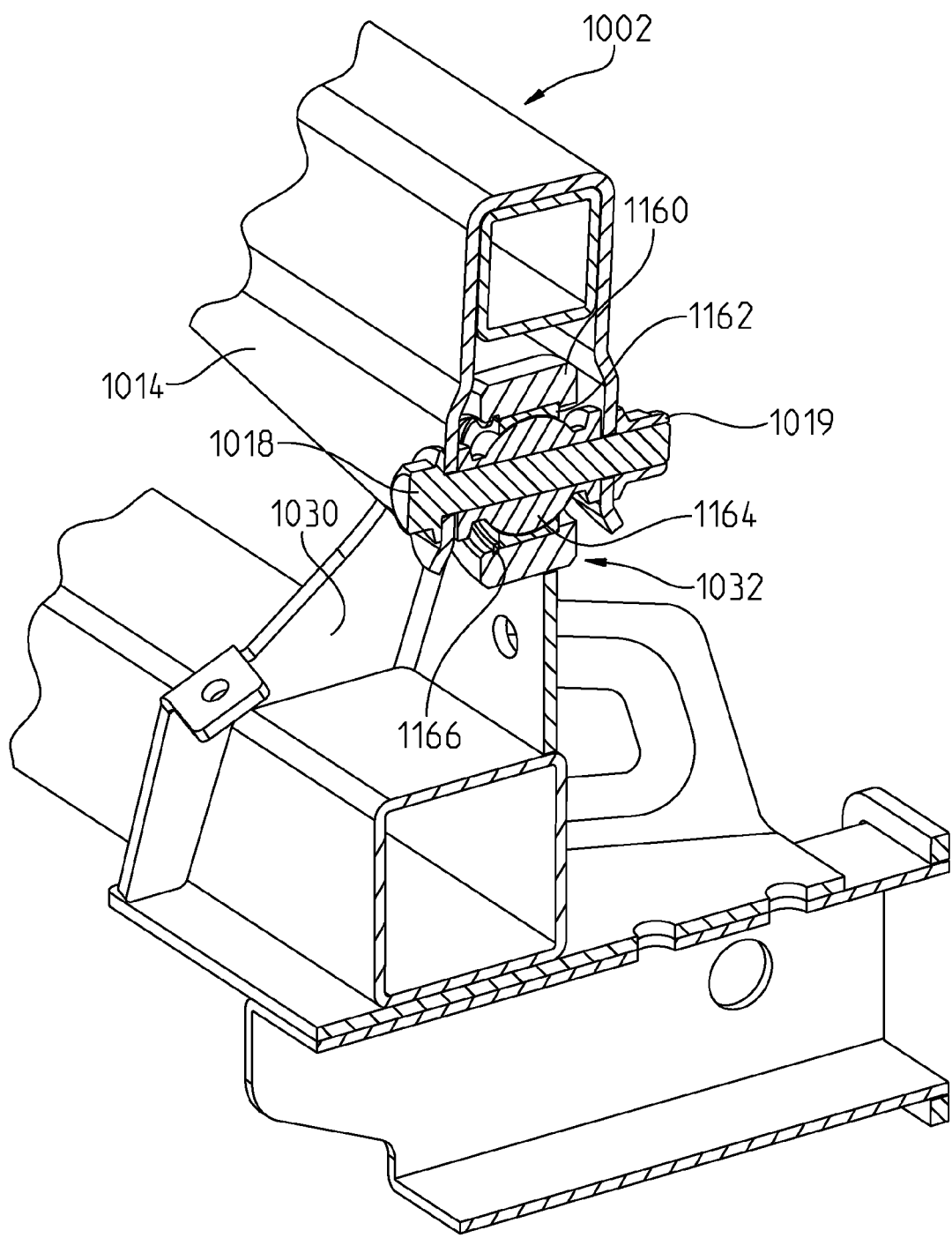
FIG. 54 is a cross-sectional view through lines 54-54 of FIG. 50.
Figure 55:
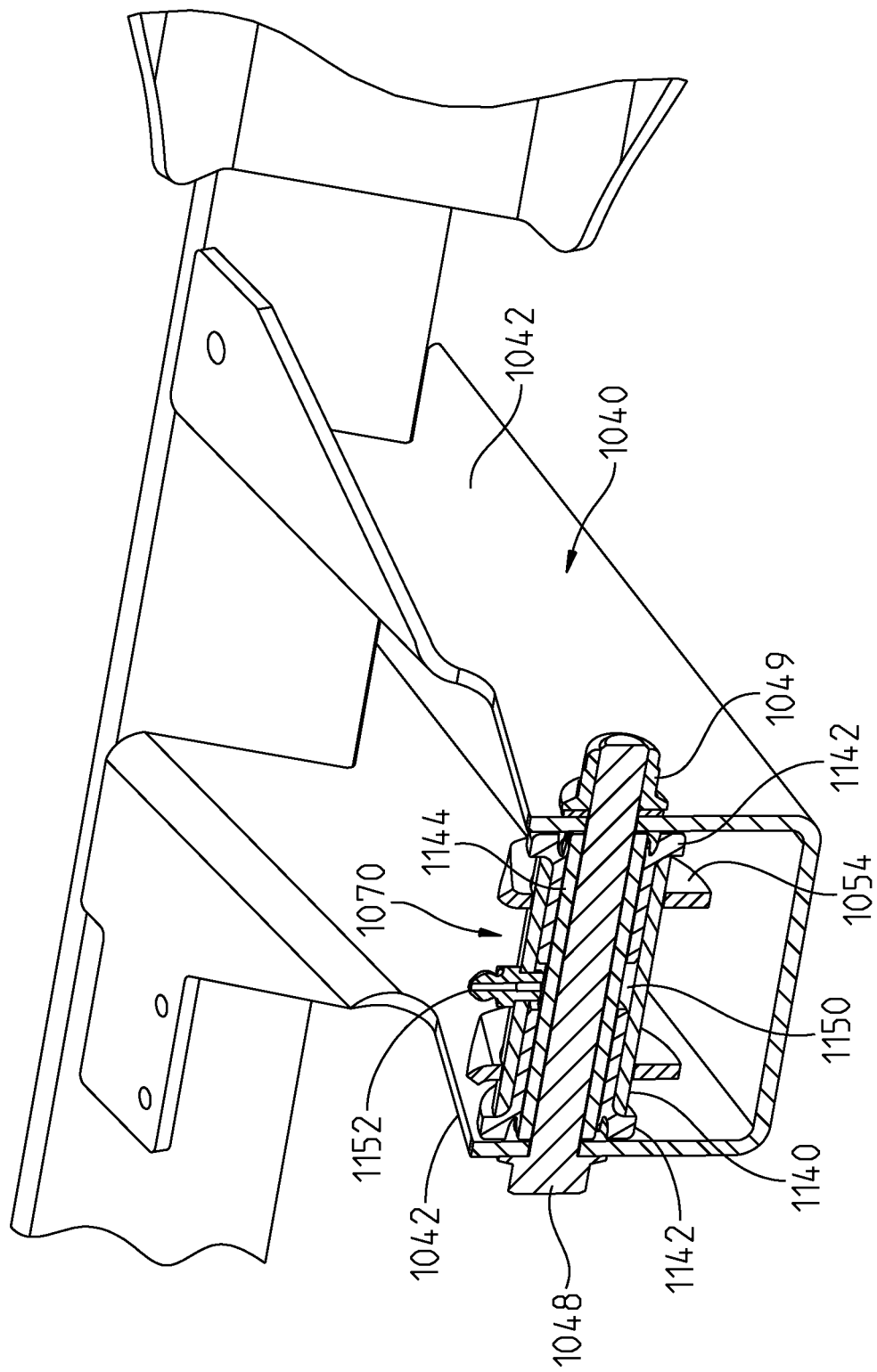
FIG. 55 is a cross-sectional view through lines 55-55 of FIG. 50.

With reference now to FIGS. 53-55, the attachment of suspension 1000 to frame 4 will be described. With reference first to FIG. 53, trailing arm 1006 is shown in a coupled fashion to frame bracket 67 by way of sleeve assembly 1060. As shown, sleeve assembly 1060 includes a first sleeve 1100, two inner sleeves 1102 and an inner sleeve 1104. In the embodiment shown, outer sleeve 1100 is fixedly attached to sidewalls 1050 of trailing arm 1006. Thus to assemble the trailing arm 1006 to bracket 67, the two sleeves 1102 are positioned internally of outer sleeve 1100 and inner sleeve 1104 is positioned inside sleeves 1102. Trailing arms are then positioned in brackets 67 and fastener 1064 is positioned through inner sleeve 1104 to receive a complimentary fastener 1065 (FIG. 53). In the embodiment shown, the sleeves 1102 are formed of a plastic material. It should also be noted that a gap 1110 is formed between ends of the sleeves 1102 and between the diameters of inner and outer sleeves 1100, 1104 and a Zerk fitting is positioned in the outer sleeve 1100 in a position corresponding to spacing 1110. Thus, the annular opening defined by gap 1110 may be filled with grease for lubrication of the joint.

With reference still FIG. 53, the U-shaped arm 1010 is attached to frame 4 in a similar manner by way of sleeve assembly 1026. As shown in FIG. 53, sleeve assembly 1026 includes an outer sleeve 1120, two intermediate sleeves 1122 and an inner sleeve at 1124. In a similar manner as with sleeve assembly 1060, outer sleeve 1120 may be fixed to frame upright 100. Thus to attach U-shaped frame member 1010 to the upright, two of the sleeves 1122 are positioned internally of outer sleeve 1120 and an inner sleeve 1124 is slidably received through sleeves 1122. Sidewalls 1022 and 1024 of frame member 1010 may then be slidably received over inserts 1122 to receive a fastener 1126 and counterpart fastener 1128. Also in a like manner a spacing 1130 is defined and a Zerk fitting (not shown) is included in outer sleeve 1120.

As shown in FIG. 55, the opposite end of trailing arm 1006 is shown attached to brackets 1040. Sleeve assemblies 1070 include an outer sleeve 1140, two sleeves 1142 and an inner sleeve at 1144. As shown, inner sleeve 1144 may be attached to trailing arm 1006. As shown, a gap 1150 is defined and a Zerk fitting 1152 is positioned in outer sleeve 1140 at a position corresponding to gap 1150. As shown fastener 1048 may be received through inner sleeve 1144 and counterpart fastener 1049 may be coupled to fastener 1048 to retain trailing arm 1006 to bracket 1040.

With reference now to FIG. 54, U-shaped arm 1010 is shown attached to lower arm 1004, and more particularly to bearing assembly 1032. As shown in FIG. 54, bearing assembly 1032 includes an outer ring at 1160, a bearing race 1162, and ball bearing 1164. In the embodiments shown, outer ring 1160 is fixed to bracket portion 1030. Thus, to assemble the components in FIG. 54, ball bearing 1164 and race 1162 are positioned in outer ring 1160, snap ring 1166 is positioned in place to trap bearing 1164 and race 1162 therein, and upper arm 1002 is lowered over bearing 1164 and fastener 1018 is positioned through bearing portion 1164 and counterpart fastener 1019 is coupled to fastener 1018.

Thus it should be understood that suspension allows a substantial amount of vertical displacement. The U-shaped member 1002 may move upwardly and downwardly, pivoting at sleeve assembles 1026, while at the same time trailing arms 1006 pivot upwardly and downwardly by way of pivot assemblies 1060. Furthermore the member 1002 may pivot relative to the U-shaped member 1002 by way of bearing assembly 1032. Due to the channel shapes of the trailing arms and brackets 67, 1040, an appropriate amount of flexure is allowed to accommodate the torsional movement of the trailing arms 1006. In addition, trailer hitch 1200 is supported by the suspension, preventing all the weight of a towed vehicle from being supported by the vehicle tires.

Referring to FIG. 56, an exemplary electrical system 1300 of utility vehicle 2 is illustrated. Electrical system 1300 includes a vehicle controller 1302, illustratively a vehicle control module 1302, having vehicle control logic 1306 that controls various electrical components and subsystems of utility vehicle 2. Controller 1302 includes one or more processors that execute software and/or firmware code stored in an internal or external memory 1304 of controller 1302. The software/firmware code contains instructions that, when executed by the one or more processors of controller 1302, causes controller 1302 to perform the functions described herein. Controller 1302 may alternatively include one or more application-specific integrated circuits (ASICs), field-programmable gate arrays (FPGAs), digital signal processors (DSPs), hardwired logic, or combinations thereof. Electrical system 1300 further includes at least one vehicle battery 1320 (e.g., 12 VDC) for providing power to the electrical components of electrical system 1300, such as controller 1302, sensors, switches, lighting, ignition, accessory outlets, and other powered components. One or more speed sensors 1308 provide speed feedback to controller 1302, such as the engine speed, vehicle speed, PTO shaft speed, or other drive line speeds.

Figure 57:
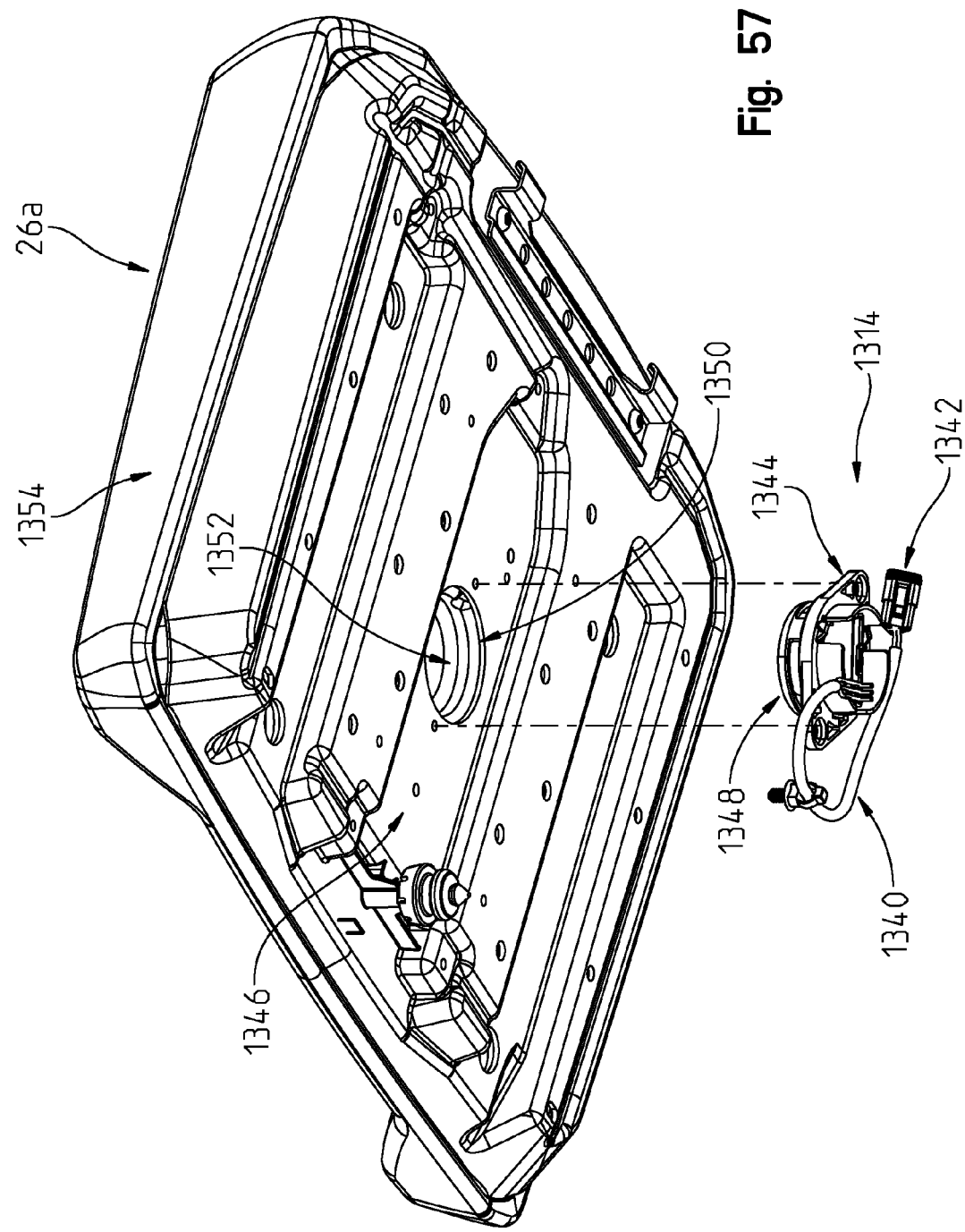
FIG. 57 is a bottom perspective view of a seat of the vehicle of FIG. 1 including a seat switch.

A seat switch 1314 coupled to and in communication with controller 1302 provides signal feedback to controller 1302 indicative of the presence or absence of a load (i.e., an operator) in a seat 26. Referring to FIG. 57, an exemplary seat switch 1314 is illustrated. Seat switch 1314 of FIG. 57 includes a wire harness 1340 including a plug connector 1342 configured to connect to a wiring harness routed to controller 1302. Seat switch 1314 further includes a mounting bracket 1344 that mounts to a base 1346 of seat 26. A sensor portion 1348 of seat switch 1314 is received within opening 1350 of base 1346 and is configured to engage an interior plate 1352 positioned within a seat cushion 1354 of seat bottom 26a. Interior plate 1352, also illustrated in phantom in FIG. 25, illustratively has a circular, flat shape, although other suitable shapes may be used. Plate 1352 transfers the downward force from the weight of the operator on seat cushion 1354 to seat switch 1314 such that sensor portion 1348 detects the operator's presence on the seat 26. In one embodiment, plate 1352 has a diameter that extends substantially to the edges of seat cushion 1354. As such, a downward force substantially anywhere on the top of seat cushion 1354, such as near an edge of seat cushion 1354, for example, is transferred to seat switch 1314 via plate 1352 and detected with sensor portion 1348. In one embodiment, seat switch 1314 comprises a non-contact switch or magnetic switch. In one embodiment, seat switch 1314 comprises a Hall Effect sensor or a reed switch that detects the presence of the operator based on a detected load on the seat, although another suitable sensor may be used. In one embodiment, passenger seat 28 also includes a seat switch 1314.

Figure 23:
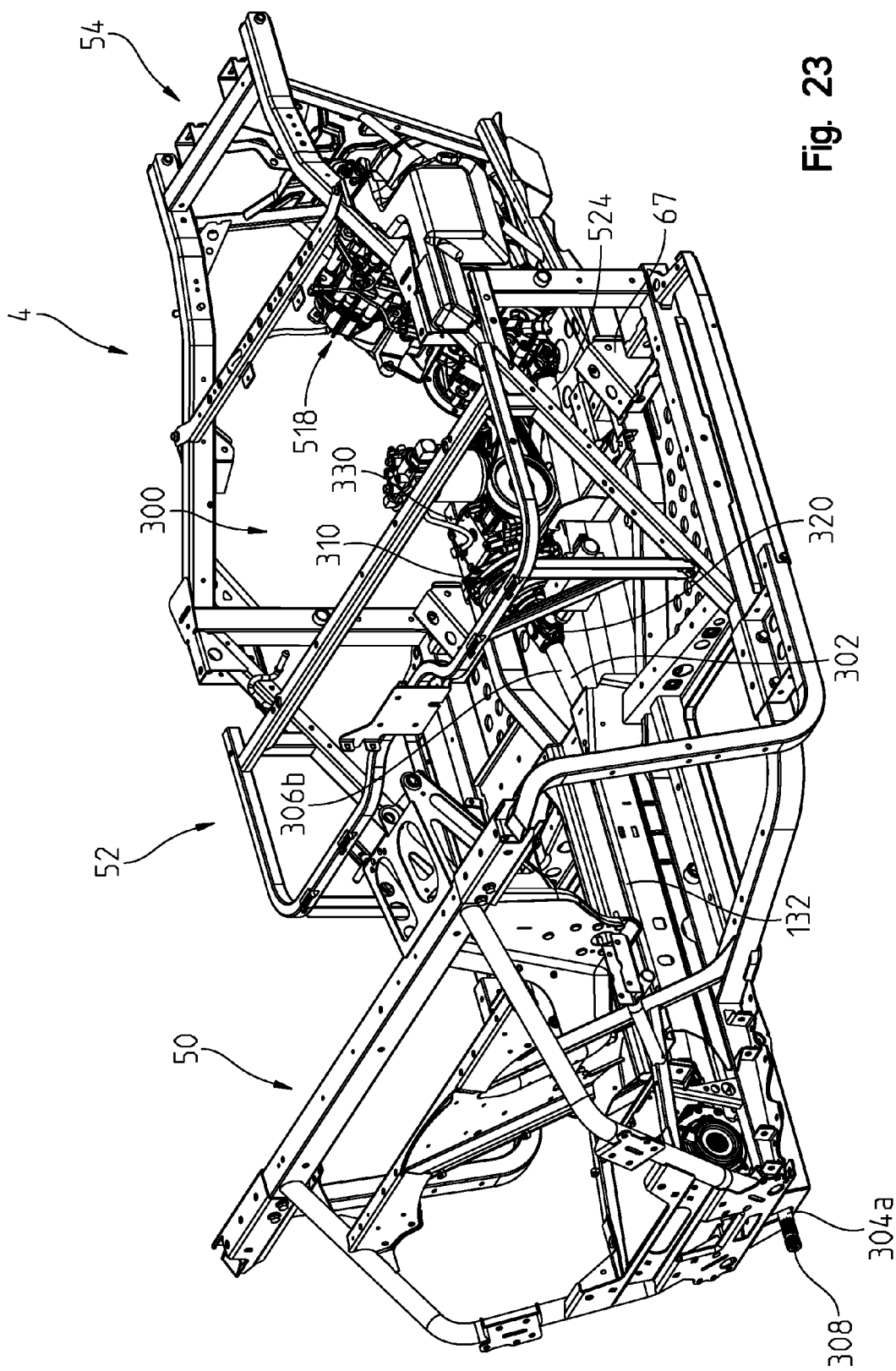
FIG. 23 is a front left perspective view of the frame assembly and the powertrain system of FIG. 7, and including an auxiliary power system operably coupled to a portion of the powertrain system.
Figure 24:
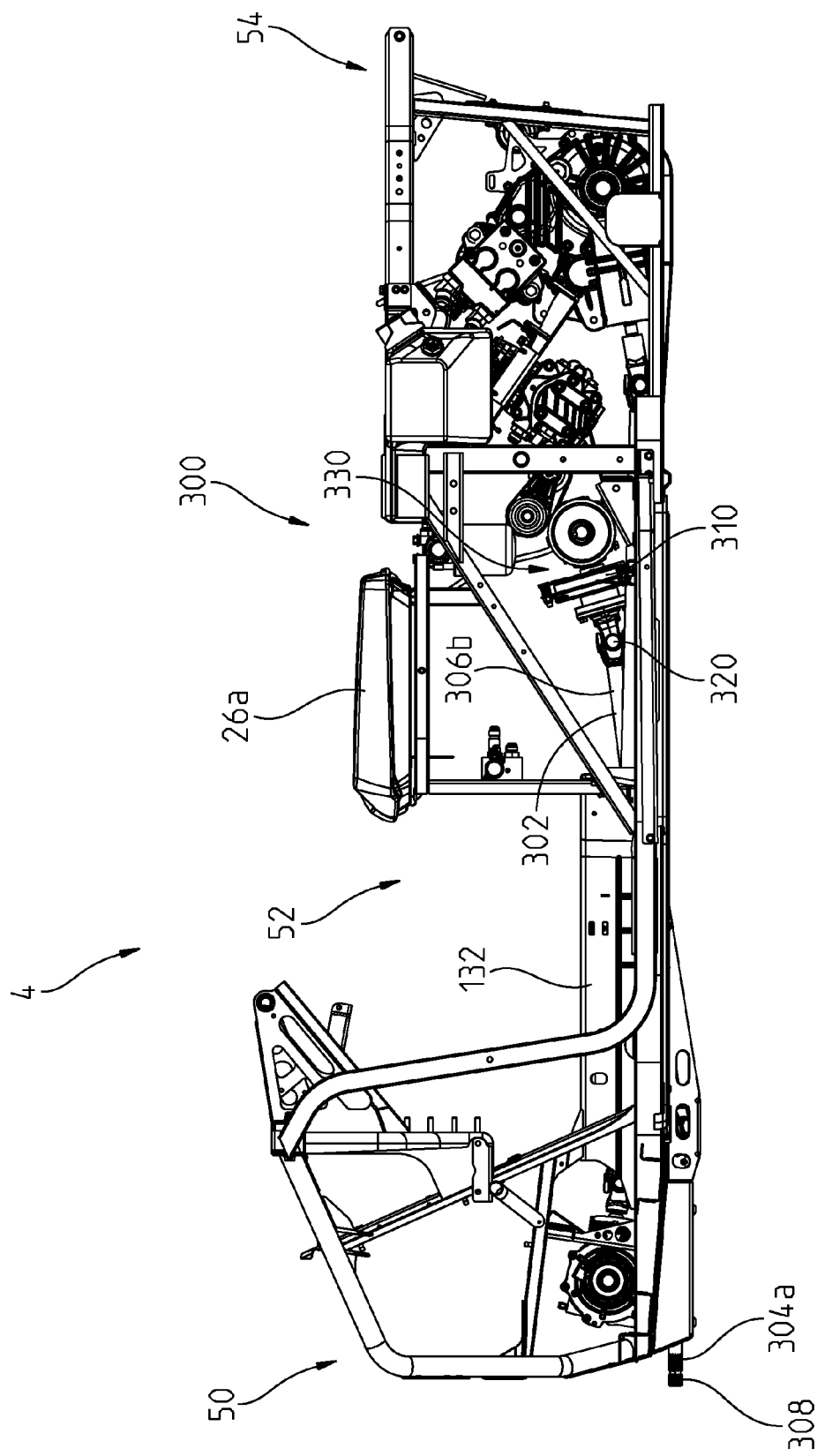
FIG. 24 is a left side view of a portion of the powertrain system and the auxiliary power system of FIG. 23.

Referring again to FIG. 56, vehicle control logic 1306 is operative to control the activation and deactivation of auxiliary power system 300 (see FIG. 23). In particular, vehicle control logic 1306 controls a clutch actuator 1307 of clutch assembly 310 (FIG. 23) to engage/disengage shaft 302 with gearbox assembly 330 of auxiliary power system 300. With an operator detected at seat 26 with seat switch 1314, vehicle control logic 1306 is operative to engage clutch assembly 310 upon request by the operator to thereby allow operation of auxiliary power system 300. When an operator is not detected at seat 26, vehicle control logic 1306 disengages clutch assembly 310 to stop and/or to prevent the delivery of power from auxiliary power system 300 to the attachment 16 (FIG. 1). As such, auxiliary power system 300 is controlled to provide power to attachment 16 when an operator is seated and not when an operator is off the seat.

In one embodiment, a threshold force is required to trigger seat switch 1314. For example, seat switch 1314 may be designed to detect a force of 50 pounds or greater. In one embodiment, controller 1302 is programmed to engage and disengage clutch assembly 330 based on detecting a force on seat bottom 26a with switch 1314 that is greater than the threshold force. In one embodiment, controller 1302 is programmed with a delay such that, upon detecting that the operator is not seated and the clutch assembly 310 is engaged, controller 1302 waits a predetermined threshold time before automatically disengaging clutch assembly 310. The threshold time may be any suitable delay time, such as a half second, one second, etc. As such, operation of auxiliary power system 300 is less likely to be stopped by controller 1302 when an operator inadvertently bounces on seat 26, such as when utility vehicle 2 traverses across rough or bumpy terrain, for example. In another embodiment, the data from seat switch 1314 is filtered to detect such an operating condition and to resume operation of auxiliary power system 300 during such a condition.

In one embodiment, switch 1314 is powered with voltage from battery 1320 (e.g., 4-20 VDC) and outputs a discrete five volts to controller 1302. Upon controller 1302 receiving a voltage that differs from zero or five volts, controller 1302 may be programmed to register an error and/or to prevent operation of auxiliary power system 300. Such a discrete output voltage level serves to reduce the likelihood of an operator bypassing the seat switch 1314 with the 12V battery power or with another power source.

In one embodiment, utility vehicle 2 further includes a work group lock and a tilt lock. The work group lock locks out at least a portion of the hydraulics of vehicle 2 by locking out hydraulic valves to prevent hydraulic fluid from flowing to the hydraulic cylinders. The tilt lock is operative to lock out hydraulic valves that control attachment 16 to lock the tilt angle of the front attachment 16 when the auxiliary power system 300 is active. Switch devices are engaged by the operator to activate the respective work group lock and tilt lock.

Referring again to FIG. 56, a pedal position sensor 1312 coupled to and in communication with controller 1302 provides signal feedback to controller 1302 indicative of the position of treadle pedal 720. In the illustrated embodiment, position sensor 1312 is operative to detect a neutral position of treadle pedal 720, i.e., the home position between the forward and reverse operational positions of pedal 720. In one embodiment, position sensor 1312 includes a limit switch coupled adjacent to pedal 720, although other suitable sensors operative to detect the position of treadle pedal 720 may be used.

When treadle pedal 720 passes through the neutral or home position and utility vehicle 2 is operating in four-wheel drive (4WD), controller 1302 is operative to disengage the 4WD for a predetermined amount of time. In particular, when operator manipulates treadle pedal 720 to change the driving direction of utility vehicle 2 from forward to reverse or from reverse to forward, treadle pedal 720 may quickly pass through the neutral position to change the vehicle direction. Controller 1302 detects that utility vehicle 2 is changing directions based on the vehicle speed sensor 1308 and the treadle position sensor 1312. When such a change of vehicle direction is demanded while utility vehicle 2 operates in 4WD, controller 1302 momentarily disengages 4WD such that utility vehicle 2 operates in 2WD, illustratively rear wheel drive. An exemplary time period for disengaging 4WD is two-tenths of one second, a half second, or another suitable time. In the illustrated embodiment, controller 1302 disengages 4WD by disengaging front differential 526 (FIG. 30) from drive shaft 524. In particular, front differential 526 includes a clutch that is actuated with an electromagnetic device. When energized, the electromagnetic device is operative to decouple drive shaft 524 from driving differential 526, thereby removing drive torque from front wheels 6. At the end of the predetermined time period, controller 1302 reengages front differential 526 with drive shaft 524 to resume 4WD operation. In one embodiment, disengagement of 4WD when the treadle pedal 720 passes through the neutral positions serves to reduce binding or "wedging" of the powertrain system 518 that may occur when utility vehicle 2 quickly changes between forward and reverse direction. An exemplary front differential clutch is described in U.S. Pat. No. 6,622,837, issued Sep. 23, 2003, the disclosure of which is incorporated by reference herein.

Vehicle control logic 1306 of FIG. 56 is further operative to adjust various functionalities of utility vehicle 2 based on a detected type of connected attachment 16 (FIG. 1). In particular, some attachments 16 are equipped with electronics that provide identification information and/or operational feedback to controller 1302. Referring to FIG. 56, an exemplary "smart" attachment or implement 1316 includes an electrical connector 1322 that is adapted to connect to a corresponding electrical connector 1324 mounted to utility vehicle 2 and routed to controller 1302. Connectors 1322, 1324 provide the main interface for routing power to the electronics of attachment 1316 and for providing network communications between controller 1302 and attachment 1316. In one embodiment, connector 1324 is mounted near front support plate 83 (see FIG. 12) or another suitable portion of front frame portion 50 such that connectors 1322, 1324 engage each other upon mounting the attachment 1316 to the front of utility vehicle 2. Attachment 1316 further includes electronics such as a memory device 1328 and sensors 1326. Exemplary sensors 1326 communicate performance information to controller 1302 and include, for example, knock/vibration sensors, rotational speed sensors, strain gauges, inclinometers, limit switches, optical sensors, GPS sensors, accelerometers, etc. In one embodiment, attachment 1316 and controller 1302 communicate over a controller area network (CAN) bus network, although another suitable communication network may be provided. In one embodiment, controller 1302 includes a communication device 1308 (e.g., CAN interface chip) that is operative to manage communication with attachment 1316.

Controller 1302 detects the type of attachment 1316 connected and configures vehicle settings based on the detected type, as described herein. Exemplary types of attachments 1316 include a mower, a winch, a blower, forks, a bucket, a plow, a snow blower, a sweeper, a digging device, or other implements and devices for ground maintenance and/or agricultural and construction uses, as discussed herein. Exemplary vehicle functions that are changed based on the detected attachment type include the maximum vehicle speed, the maximum engine speed, the number of driven wheels (e.g., AWD, 4WD, 2WD, etc.), electrical load shedding, power load shedding, and any other suitable vehicle function or setting. For example, for a lawn mower attachment 1316, control logic 1306 may limit the engine speed, and therefore the PTO speed, and the vehicle speed to provide optimal or improved cutting conditions. As such, vehicle control logic 1306 may be programmed to improve or maximize vehicle operation based on the type of attachment 1316. In addition, vehicle control logic 1306 may be programmed with vehicle settings to improve the safety or durability during operations with the attachment 1316.

In one embodiment, an operator may program controller 1302 with custom vehicle settings for implementation with an attachment 1316. For example, an operator may configure the vehicle settings for a particular attachment 1316 via a user interface and then save the configuration for future use with that attachment 1316.

In the illustrated embodiment, operational feedback provided with sensors 1326 allow controller 1302 to monitor implement operation. Controller 1302 may perform diagnostics on the attachment 1316 to verify proper operation. For example, based on feedback from knock/vibration sensors, controller 1302 may detect a critical bearing with excessive vibration and alert the operator via a warning message. In another example, controller 1302 may detect a stuck or broken part based on a detected implement speed, i.e. by comparing the implement speed to the PTO speed. Controller 1302 may be configured to issue an audio or visual warning to alert the operator or may in some cases prevent or limit operation of the attachment 1316.

Figure 58:
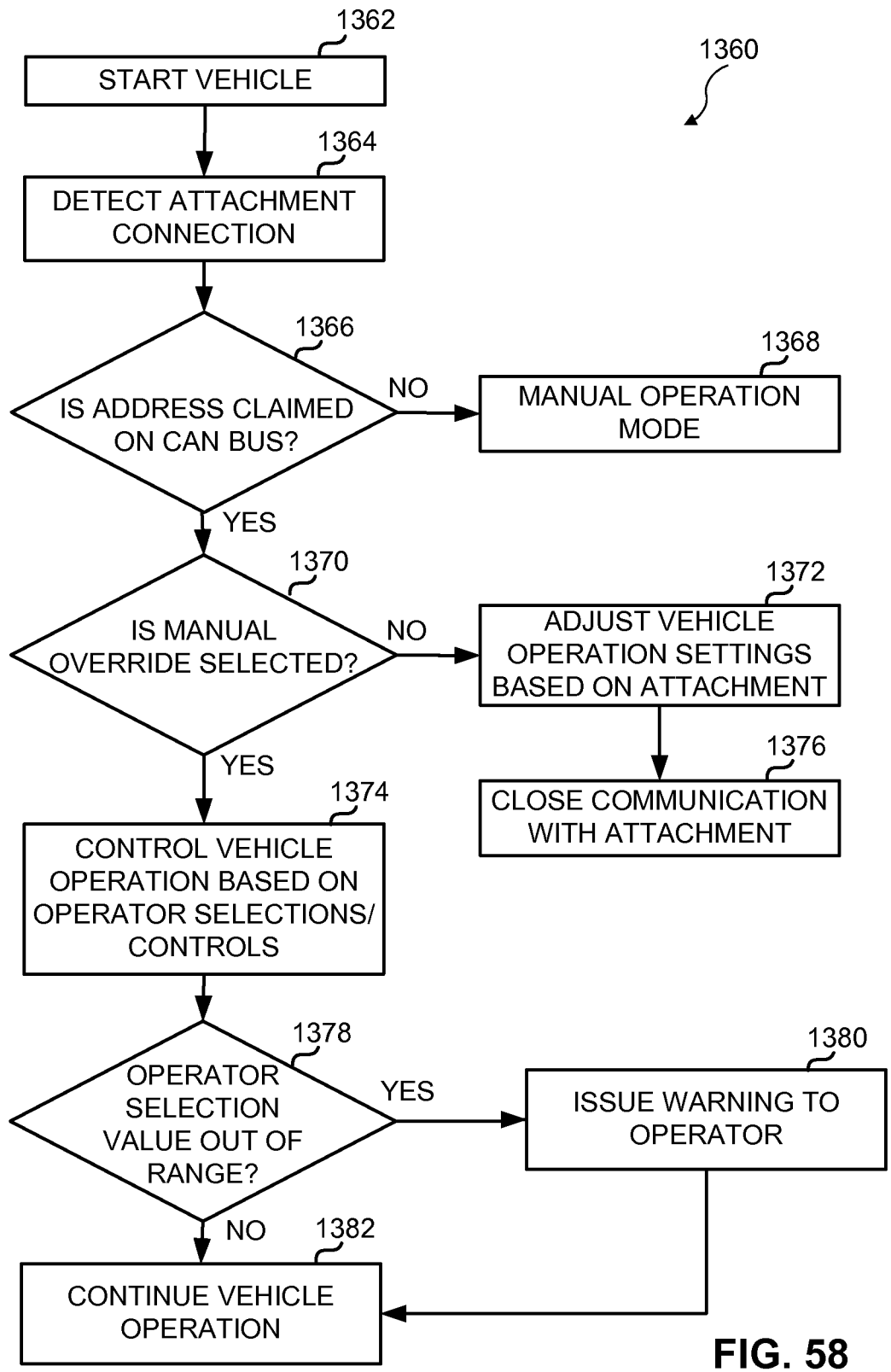
FIG. 58 is a flow chart of an exemplary operation of the vehicle controller of FIG. 56 for configuring vehicle settings based on a detected attachment.

FIG. 58 is a flow diagram 1360 illustrating an exemplary operation performed by vehicle control logic 1306 of FIG. 56 for configuring vehicle settings based on the detected type of attachment 1316. At block 1362, utility vehicle 2 is started. At block 1364, vehicle control logic 1306 detects the connection of the attachment 1316 to connector 1324. Logic 1306 detects the attachment 1316 upon the utility vehicle 2 being started with the attachment 1316 connected or upon the attachment 1316 being connected while the utility vehicle 2 is running. At block 1366, control logic 1306 determines if an address is claimed on the CAN bus by the attachment 1316. In one embodiment, memory device 1328 of attachment 1316 stores a CAN address that is retrieved by controller 1302 upon connection of attachment 1316. If a CAN address is not claimed at block 1366, controller 1302 operates vehicle in manual operation mode at block 1368. In manual operation mode, the attachment 1316 is controlled by controller 1302 based on operator's controls and settings. If a CAN address is claimed at block 1366, vehicle control logic 1306 determines if manual override is selected at block 1370. If manual override is not selected, vehicle control logic 1306 adjusts the vehicle operation settings at block 1372 based on the type of attachment 1316 detected. For example, control logic 1306 retrieves and implements vehicle configuration settings from memory 1304 that correspond to the detected type of attachment 1316. The type of attachment 1316 may be determined based on the CAN address claimed or based on another suitable identifier provided with attachment 1316. At block 1376, vehicle control logic 1306 optionally closes communication with attachment 1316. Alternatively, vehicle control logic 1306 may leave communication open and monitors sensor feedback during operation of attachment 1316.

If manual override is selected at block 1370, vehicle control unit 1306 adjusts the vehicle operation settings based on operator selections. For example, an operator may enter a desired maximum engine and/or vehicle speed, a two-wheel or four-wheel drive mode, or another vehicle setting via a user interface, and control logic 1306 then implements these settings at block 1374. Similarly, an operator may demand a particular engine or vehicle speed (e.g., with respective manual throttle 530 and pedal 720) that overrides the stored vehicle setting normally associated with the detected attachment 1316. Upon an operator selection or demand being out of a predetermined range at block 1378, vehicle control unit 1380 issues a warning to the operator at block 1380. For example, an operator may request a vehicle setting or operation (e.g., an engine/vehicle speed) that exceeds a permitted threshold value stored at controller 1302. In one embodiment, controller 102 overrides the operator's out of range demand by implementing the allowed threshold value rather than the requested vehicle setting/demand. At block 1382, the operation of utility vehicle 2 is continued.

Vehicle control logic 1306 of FIG. 56 is further operative to provide cruise control for utility vehicle 2 such that utility vehicle 2 operates at a substantially constant vehicle speed. Referring to FIG. 56, a cruise request switch 1310 coupled to and in communication with controller 1302 is actuated or engaged by an operator to initiate the cruise control function of utility vehicle 2. Cruise request switch 1310, which includes a pushbutton, lever, or any other suitable input device, may be provided with the operator controls on dashboard 49 (FIG. 3) of utility vehicle 2. Upon detection of cruise request switch 1310 being engaged, controller 1302 is operative to activate a treadle lock device 1318 that is included with swashplate controller 750 (FIG. 43). In one embodiment, treadle lock device 1318 includes a magnet that is positioned adjacent to control lever 763 (FIG. 43) such that, when powered, treadle lock device 1318 fixes itself to lever 763 and holds lever 763 substantially at the current position. As such, treadle lock device 1318 fixes the position of the internal swashplate of pump 554 to maintain the current vehicle speed. In one embodiment, upon the lock device 1318 being fixed to lever 763, an operator may move lever 763 with treadle pedal 720 to a new position, and treadle lock device 1318 holds lever 763 at the new position until cruise is deactivated or until lever 763 is again moved by the operator.

In one embodiment, the engagement of cruise request switch 1310 grounds an output pin coupled to controller 1302 to thereby route power to the electronic magnet of treadle lock device 1318. Grounding the output pin again with switch 1310 deactivates the magnet. If the output pin is grounded for longer than a threshold time, cruise request switch 1310 is determined by controller 1302 to be stuck, and the cruise function is deactivated.

Figure 59:
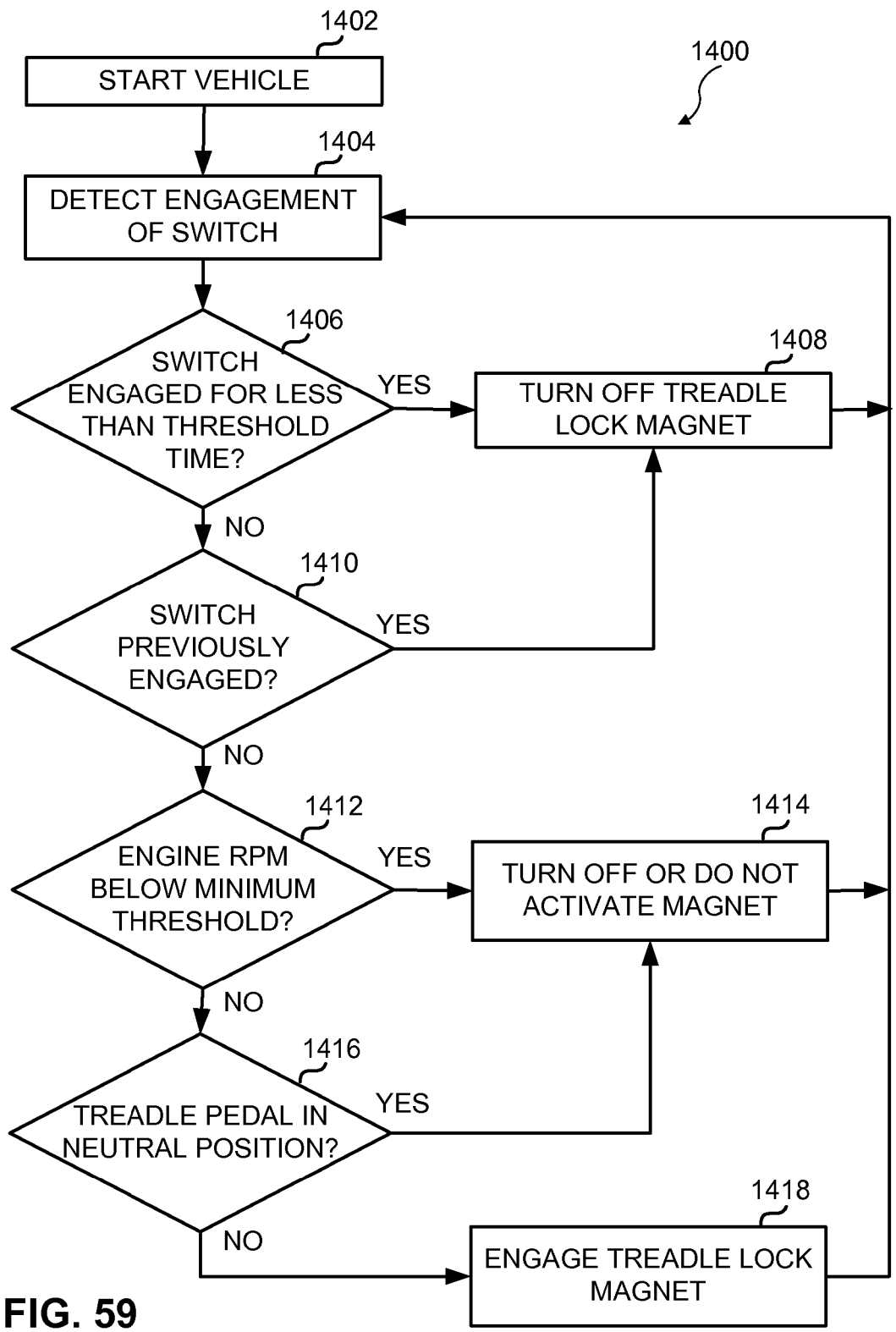
FIG. 59 is a flow chart of an exemplary cruise control operation of the vehicle controller of FIG. 56.

FIG. 59 is a flow diagram 1400 illustrating an exemplary cruise control operation performed by vehicle control logic 1306 of FIG. 56. At block 1402, utility vehicle 2 is started. At block 1404, vehicle control logic 1306 detects the actuation or engagement of cruise request switch 1310. At block 1406, vehicle control logic 1306 determines the length of time that the switch 1310 is engaged. If switch 1310 is engaged for less than a predetermined threshold time at block 1406, vehicle control logic 1306 turns off or keeps off the magnet of treadle lock device 1318 at block 1408. The threshold time may be programmed as any suitable time, such as a half second, one second, etc. If switch 1310 is engaged for greater than the threshold time, vehicle control logic 1306 determines if the switch 1310 had been previously engaged to turn on the cruise function. For example, vehicle control logic 1306 may examine the current engaged or disengaged state of treadle lock device 1318. If switch 1310 was previously engaged at block 1410, vehicle control logic 1306 deactivates the treadle lock device 1318 at block 1408. If switch 1310 was not previously engaged at block 1410, vehicle control logic 1306 determines if the current engine speed is below a minimum threshold at block 1412. If the engine speed is below the threshold, vehicle control logic 1306 turns off or does not activate the treadle lock magnet at block 1414. As such, the cruise control function is only activated at engine speeds greater than a threshold. If the engine speed is above the minimum threshold at block 1412, vehicle control logic 1306 determines if the treadle pedal 720 is in the neutral or home position at block 1416. If pedal 720 is in the neutral/home position, vehicle control logic 1306 turns off or does not activate the treadle lock magnet at block 1414. If pedal 720 is not in the neutral/home position, i.e., if vehicle is being driven, vehicle control logic 1306 activates the magnet of treadle lock device 1318 at block 1418 to activate the cruise control function. The flow diagram 1400 returns to block 1404 following each of blocks 1408, 1414, and 1418.

The term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A utility vehicle, comprising:
a plurality of ground engaging members;
a frame supported by the ground engaging members and including a front frame portion and a rear frame portion;
an engine supported by the frame;
an operator area supported by the frame and including an operator seat and a passenger seat each having a seat bottom;
a shear panel positioned forward of the operator area and being coupled to the front frame portion, the coupling of the shear panel to the front frame portion increases a torsional stiffness of the frame of the vehicle, the shear panel extending below the seat bottom of the operator seat, wherein an upper portion of the shear panel is positioned forward of a lower portion of the shear panel; and
a heating, ventilation, and air condition ("HVAC") system supported by the frame and positioned rearward of the shear panel.

2. The utility vehicle of claim 1, wherein the HVAC system includes at least a condenser and an evaporator, and the evaporator is coupled to the shear panel.

3. The utility vehicle of claim 2, wherein the condenser is positioned below the operator seat.

4. The utility vehicle of claim 1, wherein the shear panel is angled in a downward direction.

5. The utility vehicle of claim 1, wherein the frame includes a tunnel member defining a lower portion of the frame and extending rearwardly from the shear panel, the tunnel member including an upper channel and a lower channel.

6. The utility vehicle of claim 5, wherein the upper channel is configured to receive a plurality of conduits selected from the group consisting of electrical wires, cooling lines, and hydraulic hoses.

7. The utility vehicle of claim 5, further comprising an auxiliary power assembly operably coupled to the engine and including a shaft, the shaft is positioned within the lower channel of the tunnel member.

8. The utility vehicle of claim 1, further comprising at least one heat exchanger positioned forward of the shear panel.

9. The utility vehicle of claim 1, wherein the frame includes an upper frame assembly and a lower frame assembly coupled to the upper frame assembly and defining the front frame portion and the rear frame portion, and the shear panel is coupled to the lower frame assembly.

10. The utility vehicle of claim 9, further comprising a windshield coupled to the upper frame assembly.

11. The utility vehicle of claim 9, wherein the lower frame assembly includes a plurality of lowermost longitudinally-extending frame members and a longitudinally-extending skid plate coupled to the plurality of lowermost longitudinally-extending frame members, and the shear panel is coupled to at least one of the lowermost longitudinally-extending frame members.

12. The utility vehicle of claim 1, wherein the shear panel includes an opening.

13. The utility vehicle of claim 1, wherein the shear panel extends at a linear angle between the upper portion and the lower portion.

14. The utility vehicle of claim 1, wherein the operator seat further includes a seat back, wherein at least a portion of the HVAC system is positioned forward of the operator seat and above the seat bottom.

15. A utility vehicle, comprising:
a plurality of ground engaging members; and
a frame supported by the ground engaging members and having an upper frame assembly and a lower frame assembly, the lower frame assembly defining a front end of the utility vehicle and a rear end of the utility vehicle, and the lower frame assembly including at least:
a front portion;
an intermediate portion rearward of the front portion;
a rear portion rearward of the intermediate portion; and
a shear panel supported by the front portion and including an upper portion having an upper end and a lower portion having a lower end which is angled downwardly and rearward from the upper end, the shear panel being configured to deflect heat from the front portion of the lower frame assembly away from the intermediate portion of the lower frame assembly, and the front portion including a plurality of upper front frame members extending between the front end and the intermediate portion and a plurality of lower front frame members extending from the front portion toward the rear portion, the shear panel being coupled to the upper and lower front frame members and being configured to increase the stiffness of the frame.

16. The utility vehicle of claim 15, further comprising a cooling assembly and a heating, ventilation, and air conditioning ("HVAC") assembly, and the shear panel is positioned intermediate the cooling assembly and the HVAC assembly.

17. The utility vehicle of claim 16, wherein the shear panel is coupled to a portion of the HVAC assembly.

18. The utility vehicle of claim 16, wherein the cooling assembly includes a radiator positioned at the front portion of the lower frame assembly, and the shear panel is positioned longitudinally intermediate the radiator and the HVAC assembly.

19. The utility vehicle of claim 15, wherein the lower frame assembly further comprises a tunnel member extending rearward from the front portion of the lower frame assembly, the tunnel member is coupled to the shear panel.

20. The utility vehicle of claim 19, wherein the tunnel member is configured to support a plurality of conduits configured to transmit at least one of a fluid and an electrical signal between the front portion and the rear portion of the lower frame assembly, and the shear panel includes an opening for receiving a portion of the tunnel member and the plurality of conduits.

21. A utility vehicle, comprising:
a plurality of ground engaging members;
a frame supported by the ground engaging members and including a front frame portion and a rear frame portion, and the frame includes an upper frame assembly and a lower frame assembly coupled to the upper frame assembly and defining the front frame portion and the rear frame portion;
an engine supported by the frame;
an operator area supported by the frame and including an operator seat and a passenger seat;
a shear panel positioned forward of the operator area and being coupled to the front frame portion, and the shear panel is coupled to the lower frame assembly, and the lower frame assembly includes a plurality of lowermost longitudinally-extending frame members and a longitudinally-extending skid plate coupled to the plurality of lowermost longitudinally-extending frame members, and the shear panel is coupled to at least one of the lowermost longitudinally-extending frame members; and
a heating, ventilation, and air condition ("HVAC") system supported by the frame and positioned rearward of the shear panel.

22. A utility vehicle, comprising:
a plurality of ground engaging members; and
a frame supported by the ground engaging members and having an upper frame assembly and a lower frame assembly, the lower frame assembly defining a front end of the utility vehicle and a rear end of the utility vehicle, and the lower frame assembly including at least:
a front portion;
an intermediate portion rearward of the front portion;
a rear portion rearward of the intermediate portion;
a tunnel member extending rearward from the front portion of the lower frame assembly and is configured to support a plurality of conduits configured to transmit at least one of a fluid and an electrical signal between the front portion and the rear portion of the lower frame assembly, and the shear panel includes an opening for receiving a portion of the tunnel member and the plurality of conduits; and
a shear panel supported by the front portion and the tunnel member is coupled to the shear panel, the front portion including a plurality of upper front frame members extending between the front end and the intermediate portion and a plurality of lower front frame members extending from the front portion toward the rear portion, the shear panel being coupled to the upper and lower front frame members and being configured to increase the stiffness of the frame.

23. A utility vehicle, comprising:
a plurality of ground engaging members;
a frame supported by the ground engaging members and including an upper frame assembly and a lower frame assembly coupled to the upper frame assembly and defining a front frame portion and a rear frame portion;
an engine supported by the frame;
an operator area supported by the frame and including an operator seat and a passenger seat;
a shear panel positioned forward of the operator area and being coupled to the front frame portion of the lower frame assembly; and
a heating, ventilation, and air condition ("HVAC") system supported by the frame and positioned rearward of the shear panel, wherein the lower frame assembly includes a plurality of lowermost longitudinally-extending frame members and a longitudinally-extending skid plate coupled to the plurality of lowermost longitudinally-extending frame members, and the shear panel is coupled to at least one of the lowermost longitudinally-extending frame members.

24. A utility vehicle, comprising:
a plurality of ground engaging members; and
a frame supported by the ground engaging members and having an upper frame assembly and a lower frame assembly, the lower frame assembly defining a front end of the utility vehicle and a rear end of the utility vehicle, and the lower frame assembly including at least:
a front portion;
an intermediate portion rearward of the front portion;
a rear portion rearward of the intermediate portion; and
a shear panel supported by the front portion, the front portion including a plurality of upper front frame members extending between the front end and the intermediate portion and a plurality of lower front frame members extending from the front portion toward the rear portion, the shear panel being coupled to the upper and lower front frame members and being configured to increase the stiffness of the frame, and the shear panel is angled downwardly and deflects heat from the front portion of the lower frame assembly away from the intermediate portion of the lower frame assembly, wherein a lower end of the shear panel is angled downwardly and rearwardly from an upper end of the shear panel.

25. A utility vehicle, comprising:
a plurality of ground engaging members;

a frame supported by the ground engaging members and including a front frame portion and a rear frame portion;

an engine supported by the frame;

an operator area supported by the frame and including an operator seat and a passenger seat each having a seat bottom;

a shear panel positioned forward of the operator area and being coupled to the front frame portion, and the shear panel extending below the seat bottom of the operator seat; and a heating, ventilation, and air condition ("HVAC") system supported by the frame and positioned rearward of the shear panel, wherein the frame includes a tunnel member defining a lower portion of the frame and extending rearwardly from the shear panel, the tunnel member including an upper channel and a lower channel.

26. A utility vehicle, comprising:

a plurality of ground engaging members; and a frame supported by the ground engaging members and having an upper frame assembly and a lower frame assembly, the lower frame assembly defining a front end of the utility vehicle and a rear end of the utility vehicle, and the lower frame assembly including at least:

a front portion;

an intermediate portion rearward of the front portion;

a rear portion rearward of the intermediate portion;

a shear panel supported by the front portion and including an upper portion and a lower portion which is positioned rearward of the upper portion, the front portion including a plurality of upper front frame members extending between the front end and the intermediate portion and a plurality of lower front frame members extending from the front portion toward the rear portion, the shear panel being coupled to the upper and lower front frame members and being configured to increase the stiffness of the frame; and a tunnel member extending rearward from the front portion of the lower frame assembly, the tunnel member being coupled to the shear panel.

27. A utility vehicle, comprising:

a plurality of ground engaging members;

a frame supported by the ground engaging members and including a front frame portion, a rear frame portion, an upper frame assembly, and a lower frame assembly coupled to the upper frame assembly and defining the front frame portion and the rear frame portion, and the lower frame assembly includes a plurality of lowermost longitudinally-extending frame members and a longitudinally-extending skid plate coupled to the plurality of lowermost longitudinally-extending frame members;

an engine supported by the frame;

an operator area supported by the frame and including an operator seat and a passenger seat each having a seat bottom;

a shear panel positioned forward of the operator area and being coupled to the front frame portion, and the shear panel extending below the seat bottom of the operator seat; and a heating, ventilation, and air condition ("HVAC") system supported by the frame and positioned rearward of the shear panel, wherein the shear panel is coupled to at least one of the lowermost longitudinally-extending frame members of the lower frame assembly.

* * * * *